United States Patent
Cooper et al.

(10) Patent No.: US 11,838,034 B2
(45) Date of Patent: Dec. 5, 2023

(54) SYSTEM AND METHOD FOR BLOCKCHAIN DATA COMPACTION

(71) Applicant: AtomBeam Technologies Inc., Moraga, CA (US)

(72) Inventors: Joshua Cooper, Columbia, SC (US); Aliasghar Riahi, Orinda, CA (US); Mojgan Haddad, Orinda, CA (US); Razmin Riahi, Orinda, CA (US); Ryan Kourosh Riahi, Orinda, CA (US); Charles Yeomans, Orinda, CA (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 18/303,399

(22) Filed: Apr. 19, 2023

(65) Prior Publication Data
US 2023/0253980 A1    Aug. 10, 2023

Related U.S. Application Data

(63) Continuation-in-part of application No. 17/875,201, filed on Jul. 27, 2022, now Pat. No. 11,700,013, which is a continuation of application No. 17/514,913, filed on Oct. 29, 2021, now Pat. No. 11,424,760, which is a continuation-in-part of application No. 17/404,699, filed on Aug. 17, 2021, now Pat. No. 11,385,794, which is a
(Continued)

(51) Int. Cl.
*H03M 7/30* (2006.01)
*G06N 20/00* (2019.01)
*H04L 9/00* (2022.01)

(52) U.S. Cl.
CPC .......... *H03M 7/3059* (2013.01); *G06N 20/00* (2019.01); *H03M 7/6005* (2013.01); *H04L 9/50* (2022.05)

(58) Field of Classification Search
CPC ...... H03M 7/3059; H03M 7/6005; H04L 9/50
See application file for complete search history.

(56) References Cited

U.S. PATENT DOCUMENTS 10,873,456 B1 * 12/2020 Dods .......................... H04L 9/50
10,963,786 B1    3/2021 Taylor et al.
(Continued)

*Primary Examiner* — Lam T Mai
(74) *Attorney, Agent, or Firm* — Galvin Patent Law LLC; Brian R. Galvin

(57) ABSTRACT

A system and method for faster communication between blockchain mining nodes and faster block validation. The system uses machine learning on data chunks to generate codebooks which compact the data to be stored, processed, or sent with a smaller data profile than uncompacted data. The system uses a data compaction in an existing blockchain fork or implemented in a new blockchain protocol from which nodes that wish to or need to use the blockchain can do so with a reduced storage requirement. The system uses network data compaction across all nodes to increase the speed of and decrease the size of a blockchain's data packets. The system uses data compaction firmware to increase the efficiency at which mining rigs can computationally validate new blocks on the blockchain. The system can be implemented using any combination of the three data compaction services to meet the needs of the desired blockchain technology.

20 Claims, 41 Drawing Sheets

Related U.S. Application Data continuation-in-part of application No. 16/455,655, filed on Jun. 27, 2019, now Pat. No. 10,509,771, which is a continuation-in-part of application No. 16/200,466, filed on Nov. 26, 2018, now Pat. No. 10,476,519, which is a continuation-in-part of application No. 15/975,741, filed on May 9, 2018, now Pat. No. 10,303,391, said application No. 17/875,201 is a continuation of application No. 17/458,747, filed on Aug. 27, 2021, now Pat. No. 11,422,978, which is a continuation-in-part of application No. 16/923,039, filed on Jul. 7, 2020, now Pat. No. 11,232,076, which is a continuation-in-part of application No. 16/716,098, filed on Dec. 16, 2019, now Pat. No. 10,706,018, which is a continuation of application No. 16/455,655, filed on Jun. 27, 2019, now Pat. No. 10,509,771.

(60) Provisional application No. 62/578,824, filed on Oct. 30, 2017, provisional application No. 63/027,166, filed on May 19, 2020, provisional application No. 62/926,723, filed on Oct. 28, 2019, provisional application No. 63/332,533, filed on Apr. 19, 2022.

(56) References Cited

U.S. PATENT DOCUMENTS

| | | | | |
|---|---|---|---|---|
| 11,081,219 B1* | 8/2021 | Dods | | G06N 20/00 |
| 11,245,691 B1* | 2/2022 | Dods | | H04L 63/0853 |
| 11,443,178 B2* | 9/2022 | Edwards | | H04L 63/1441 |
| 11,700,013 B2* | 7/2023 | Cooper | | G06N 20/00 |
| | | | | 707/693 |
| 2004/0202322 A1 | 10/2004 | Chavanne et al. | | |
| 2019/0188562 A1* | 6/2019 | Edwards | | G06N 5/045 |
| 2020/0293887 A1* | 9/2020 | De Brouwer | | G16H 50/20 |
| 2021/0056079 A1* | 2/2021 | Cooper | | G06F 21/606 |
| 2021/0165766 A1* | 6/2021 | Riahi | | G06F 3/0641 |
| 2021/0192346 A1* | 6/2021 | Taylor | | H04L 9/3239 |
| 2021/0225463 A1* | 7/2021 | Knighton, Jr. | | G06N 3/045 |
| 2021/0232543 A1* | 7/2021 | Cooper | | G06F 3/067 |
| 2021/0350891 A1* | 11/2021 | Dods | | G06F 17/18 |
| 2021/0373776 A1* | 12/2021 | Cooper | | G06F 3/0679 |
| 2022/0043778 A1* | 2/2022 | Cooper | | G06N 5/01 |
| 2022/0129421 A1* | 4/2022 | Cooper | | G06F 3/0608 |
| 2022/0147492 A1* | 5/2022 | Cooper | | G06F 3/067 |
| 2023/0043546 A1* | 2/2023 | Cooper | | G06F 3/0608 |
| 2023/0106736 A1* | 4/2023 | Cooper | | G06F 3/0659 |
| | | | | 711/114 |
| 2023/0107760 A1* | 4/2023 | Cooper | | H03M 7/4031 |
| | | | | 711/114 |
| 2023/0177013 A1* | 6/2023 | Cooper | | G06F 16/1752 |
| | | | | 711/114 |
| 2023/0195311 A1* | 6/2023 | Cooper | | H03M 7/6011 |
| | | | | 711/114 |
| 2023/0216520 A1* | 7/2023 | Cooper | | G06N 20/00 |
| | | | | 707/693 |

* cited by examiner

SYSTEM AND METHOD FOR BLOCKCHAIN DATA COMPACTION

CROSS-REFERENCE TO RELATED APPLICATIONS

Priority is claimed in the application data sheet to the following patents or patent applications, each of which is expressly incorporated herein by reference in its entirety:
Ser. No. 17/875,201
Ser. No. 17/514,913
Ser. No. 17/404,699
Ser. No. 16/455,655
Ser. No. 16/200,466
Ser. No. 15/975,741
62/578,824
Ser. No. 17/458,747
Ser. No. 16/923,039
63/027,166
Ser. No. 16/716,098
62/926,723
63/332,533

BACKGROUND OF THE INVENTION

Field of the Invention

The present invention is in the field of computer data processing, storage, and transmission, and in particular to the field of blockchains.

Discussion of the State of the Art

Blockchain technology and the cryptocurrencies it supports are undoubtably here to stay. However, adoption is slow, in part because of the energy consumption and network congestion it creates. While a few iterations and forks have attempted to lower the barriers to adoption, the energy consumption and congestion remain. Thus, blockchain still has a core problem: it requires a large throughput of network data and a large volume of storage capacity.

Data compression does not solve these problems with blockchain because speed and timing are everything in most of the incentivized proof systems, e.g., proof-of-work. Crypto-mining is a race to be first and anything that slows the mining process down is seen as undesirable.

What is needed is a fundamentally new approach to blockchain data transmission and proof validation systems, that allows for dramatically faster transfer rates and validation computations.

SUMMARY OF THE INVENTION

A system and method for fast communication between blockchain mining nodes on a peer-to-peer network and faster block validation for the blockchain mining nodes on that peer-to-peer network. The system uses machine learning on data chunks to generate codebooks which is then used to compact the data. The data can then be stored, processed, or sent with a smaller data profile than that of uncompacted data. The system uses a data compaction layer on an existing blockchain fork or in a new blockchain protocol from which nodes that wish to or need to store the blockchain can do so with a significantly smaller storage requirement. The system uses data compaction across all nodes in the consensus pool to increase the speed of and decrease the size of a blockchain's data packets. The system uses data compaction firmware to increase the efficiency at which mining rigs can computationally validate new blocks on the blockchain. The system can be implemented using any combination of the three data compaction services to meet the needs of the desired blockchain technology.

According to a first preferred embodiment, a blockchain data compaction system is disclosed, comprising: a blockchain computing node communicatively coupled to a plurality of other blockchain computing nodes, each blockchain computing node comprising a memory and at least one multi-core processor (or a single core), and wherein the sum of blockchain computing nodes creates a consensus pool for a blockchain; a network compaction service, comprising a first plurality of programming instructions stored in the memory and operating on the multi-core processor (or a single core) on each of the blockchain computing nodes, wherein the first plurality of programming instructions, when operating on each of the multi-core processors, cause each of the multi-core processors to: store a first reference codebook in the memory of each of the blockchain computing nodes, the first reference codebook pretrained by machine learning to determine sourceblocks and to associate codewords to each sourceblock; store a first deconstruction algorithm in the memory of each of the blockchain computing nodes, wherein the first deconstruction algorithm, when operating on each of the multi-core processors, cause the multi-core processors to: receive network data intended for the consensus pool; deconstruct the network data intended for the consensus pool into a plurality of sourceblocks; encode the first plurality of sourceblocks into a first codeword using the first reference codebook; and send the first codeword to the consensus pool; and store a first reconstruction algorithm in the memory of each of the blockchain computing nodes, wherein the first reconstruction algorithm, when operating on each of the multi-core processors, causes the multi-core processors to: receive the first codeword; and reconstruct the network data by decoding the first plurality of sourceblocks using the first reference codebook; and a blockchain compaction module, comprising a second plurality of programming instructions stored in the memory and operating on the multi-core processor on each of the blockchain computing nodes, wherein the second plurality of programming instructions, when operating on each of the multi-core processors, cause each of the multi-core processors to: store a second reference codebook in the memory of each of the blockchain computing nodes, the second reference codebook pretrained by machine learning to determine sourceblocks and associated codewords of the blockchain; and store a second deconstruction algorithm in the memory of each of the blockchain computing nodes, wherein the first deconstruction algorithm, when operating on each of the multi-core processors, cause the multi-core processors to: receive a blockchain block; deconstruct the blockchain block into a second plurality of sourceblocks; encode the second plurality of sourceblocks into a second codeword using the second reference codebook; and append the second codeword to a compacted blockchain, the compacted blockchain comprising codewords for each block on the blockchain.

According to a second preferred embodiment, a method for blockchain data compaction is disclosed, comprising the steps of: A method for blockchain data compaction, comprising the steps of: storing a first reference codebook in the memory of a blockchain computing node communicatively coupled to a plurality of other blockchain computing nodes, each blockchain computing node comprising a memory and at least one multi-core processor (or a single core), and wherein the sum of blockchain computing nodes creates a consensus pool for a blockchain, and wherein the first reference codebook is pretrained by machine learning to determine sourceblocks and to associate codewords to each sourceblock; storing a first deconstruction algorithm in the memory of each of the blockchain computing nodes, wherein the first deconstruction algorithm, when operating on each of the multi-core processors, cause the multi-core processors to: receive network data intended for the consensus pool; deconstruct the network data intended for the consensus pool into a plurality of sourceblocks; encode the first plurality of sourceblocks into a first codeword using the first reference codebook; and send the first codeword to the consensus pool; storing a first reconstruction algorithm in the memory of each of the blockchain computing nodes, wherein the first reconstruction algorithm, when operating on each of the multi-core processors, causes the multi-core processors to: receive the first codeword; and reconstruct the network data by decoding the first plurality of sourceblocks using the first reference codebook; storing a second reference codebook in the memory of each of the blockchain computing nodes, the second reference codebook pretrained by machine learning to determine sourceblocks and associated codewords of the blockchain; and storing a second deconstruction algorithm in the memory of each of the blockchain computing nodes, wherein the first deconstruction algorithm, when operating on each of the multi-core processors, cause the multi-core processors to: receive a blockchain block; deconstruct the blockchain block into a second plurality of sourceblocks; encode the second plurality of sourceblocks into a second codeword using the second reference codebook; and append the second codeword to a compacted blockchain, the compacted blockchain comprising codewords for each block on the blockchain.

According to one aspect, the deconstruction of the network data intended for the consensus pool generates a sourceblock and association not in the first reference codebook, attach the sourceblock and association to the first codeword, the first reconstruction algorithm updating the first reference codebook.

According to one aspect, the deconstruction of the blockchain block generates a sourceblock and association not in the second reference codebook, add the sourceblock and association to the second reference codebook.

According to one aspect, the blockchain compaction module further causes each of the multi-core processors to store a second reconstruction algorithm in the memory of each of the blockchain computing nodes, wherein the second reconstruction algorithm, when operating on each of the multi-core processors, causes the multi-core processors to reconstruct the blockchain block by decoding the second plurality of sourceblocks using the second reference codebook.

According to one aspect, the system further comprises a proof system compaction firmware, comprising a third plurality of programming instructions stored in the memory and operating on the multi-core processor on each of the blockchain computing nodes, wherein the third plurality of programming instructions, when operating on each of the multi-core processors, cause each of the multi-core processors to: store a third reference codebook embedded as firmware in the memory of each core in each of the multi-core processors, the third reference codebook pretrained by machine learning to determine sourceblocks and to associate codewords to each sourceblock; store a third deconstruction algorithm embedded as firmware in the memory of each core in each of the multi-core processors, wherein the third deconstruction algorithm, when operating on each core, cause the multi-core processors to: receive data intended for a different core; deconstruct the data intended for a different core into a third plurality of sourceblocks; encode the third plurality of sourceblocks into a third codeword using the third reference codebook; and send the third codeword to the intended core; and store a third reconstruction algorithm embedded as firmware in the memory of each core in each of the multi-core processors, wherein the third reconstruction algorithm, when operating on each core, cause the multi-core processors to: receive the third codeword at the intended core; and reconstruct the data intended for a different core by decoding the third plurality of sourceblocks using the third reference codebook.

According to one aspect, the deconstruction of data intended for a different core generates a sourceblock and association not in the third reference codebook, attach the sourceblock and association to the third codeword, the third reconstruction algorithm updating the third reference codebook.

According to one aspect, each reference codebook is stored as a blockchain.

According to one aspect, the blockchain data compaction system is implemented as a unique blockchain protocol.

According to one aspect, the blockchain data compaction system is implemented in a fork of an existing blockchain protocol.

According to one aspect, the blockchain compaction module permanently deletes a portion from one or more reference codebooks to redact information on the blockchain.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION OF THE DRAWING FIGURES

Figure 1:
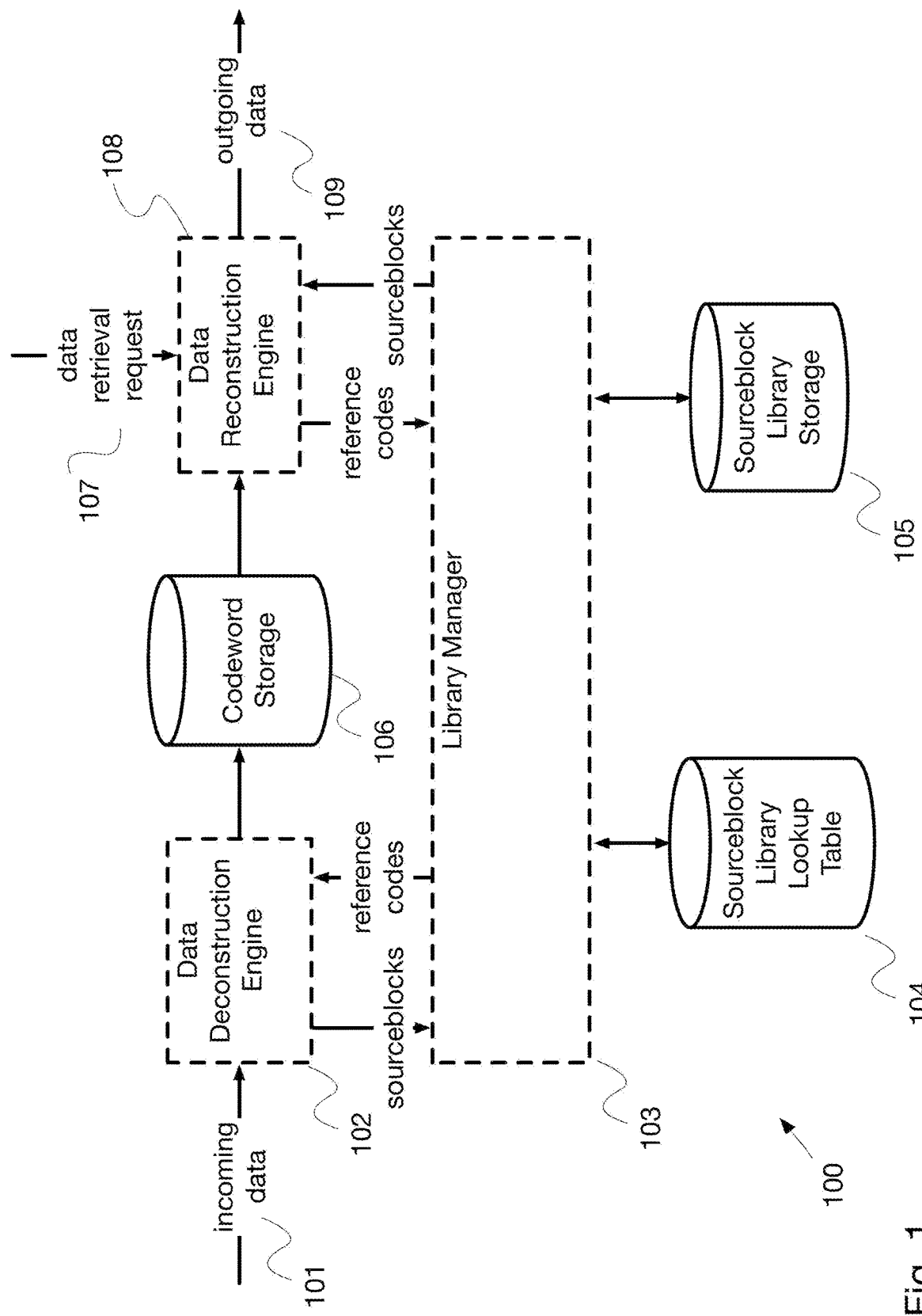
FIG. 1 is a diagram showing an embodiment of the system in which all components of the system are operated locally.

The inventor has conceived, and reduced to practice, a system and method for fast communication between blockchain mining nodes on a peer-to-peer network and faster block validation for the blockchain mining nodes on that peer-to-peer network. The system uses machine learning on data chunks to generate codebooks which is then used to compact the data. The data can then be stored, processed, or sent with a smaller data profile than that of uncompacted data. The system uses a data compaction layer on an existing blockchain fork or in a new blockchain protocol from which nodes that wish to or need to store the blockchain can do so with a significantly smaller storage requirement. The system uses data compaction across all nodes in the consensus pool to increase the speed of and decrease the size of a blockchain's data packets. The system uses data compaction firmware to increase the efficiency at which mining rigs can computationally validate new blocks on the blockchain. The system can be implemented using any combination of the three data compaction services to meet the needs of the desired blockchain technology.

By using extremely low latency artificial intelligence-(AI-) driven encoding techniques, one may achieve large decreases in the number of bits that need to be transported in order to move the same data. The economic effect is greatest when encoding data that needs to move outside of a processor component onto other boards or racks, but even within a component, between die, or within the chip itself the economic effects are appreciable. According to various aspects, machine learning/AI data compaction technology provides a radically new way to reduce the size of data dramatically and securely; its architecture, lightweight code, speed, and high efficiency make it potentially useful for application to semiconductors. In some applications, the latency bound may be 400× faster than the speed of the fastest compression algorithms, and encoded machine-generated data may be 60-80% smaller than the original. Unlike traditional data compression, the invention according to an aspect may operate on very small data units of a few bytes, and the technology is instant-on; data files generated by the source are virtually simultaneously encoded, transported and regenerated at the destination.

According to an aspect, training data is used to identify patterns in data prior to embedding code or programming firmware in a semiconductor. These patterns and their associated, smaller indices, or codewords, are stored in a codebook that is replicated on both the sending and receiving bus, along with a light code according to an aspect. In processing live data, only codewords, much smaller than the original data, are transferred between buses. Compaction is a stepless process that operates as fast as the data is created, a key component of its extreme low latency performance. As source data is generated, it is encoded and the codewords are sent; at the destination, codewords are decoded and the original data is instantaneously rebuilt, even as the file is still being generated at the source. The computationally-intensive tasks of searching for patterns in data is performed in advance of embedding; in live semiconductor operation, the tasks involved consist primarily of lookups, which are light and fast.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods, and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

The term "bit" refers to the smallest unit of information that can be stored or transmitted. It is in the form of a binary digit (either 0 or 1). In terms of hardware, the bit is represented as an electrical signal that is either off (representing 0) or on (representing 1).

The term "byte" refers to a series of bits exactly eight bits in length.

The term "codebook" refers to a database containing sourceblocks each with a pattern of bits and reference code unique within that library. The terms "library" and "encoding/decoding library" are synonymous with the term codebook.

The terms "compression" and "deflation" as used herein mean the representation of data in a more compact form than the original dataset. Compression and/or deflation may be either "lossless", in which the data can be reconstructed in its original form without any loss of the original data, or "lossy" in which the data can be reconstructed in its original form, but with some loss of the original data.

The terms "compression factor" and "deflation factor" as used herein mean the net reduction in size of the compressed data relative to the original data (e.g., if the new data is 70% of the size of the original, then the deflation/compression factor is 30% or 0.3.)

The terms "compression ratio" and "deflation ratio", and as used herein all mean the size of the original data relative to the size of the compressed data (e.g., if the new data is 70% of the size of the original, then the deflation/compression ratio is 70% or 0.7.)

The term "data" means information in any computer-readable form.

The term "data set" refers to a grouping of data for a particular purpose. One example of a data set might be a word processing file containing text and formatting information.

The term "effective compression" or "effective compression ratio" refers to the additional amount data that can be stored using the method herein described versus conventional data storage methods. Although the method herein described is not data compression, per se, expressing the additional capacity in terms of compression is a useful comparison.

The term "sourcepacket" as used herein means a packet of data received for encoding or decoding. A sourcepacket may be a portion of a data set.

The term "sourceblock" as used herein means a defined number of bits or bytes used as the block size for encoding or decoding. A sourcepacket may be divisible into a number of sourceblocks. As one non-limiting example, a 1 megabyte sourcepacket of data may be encoded using 512 byte sourceblocks. The number of bits in a sourceblock may be dynamically optimized by the system during operation. In one aspect, a sourceblock may be of the same length as the block size used by a particular file system, typically 512 bytes or 4,096 bytes.

The term "codeword" refers to the reference code form in which data is stored or transmitted in an aspect of the system. A codeword consists of a reference code to a sourceblock in the library plus an indication of that sourceblock's location in a particular data set.

Conceptual Architecture

FIG. 1 is a diagram showing an embodiment 100 of the system in which all components of the system are operated locally. As incoming data 101 is received by data deconstruction engine 102. Data deconstruction engine 102 breaks the incoming data into sourceblocks, which are then sent to library manager 103. Using the information contained in sourceblock library lookup table 104 and sourceblock library storage 105, library manager 103 returns reference codes to data deconstruction engine 102 for processing into codewords, which are stored in codeword storage 106. When a data retrieval request 107 is received, data reconstruction engine 108 obtains the codewords associated with the data from codeword storage 106, and sends them to library manager 103. Library manager 103 returns the appropriate sourceblocks to data reconstruction engine 108, which assembles them into the proper order and sends out the data in its original form 109.

Figure 2:
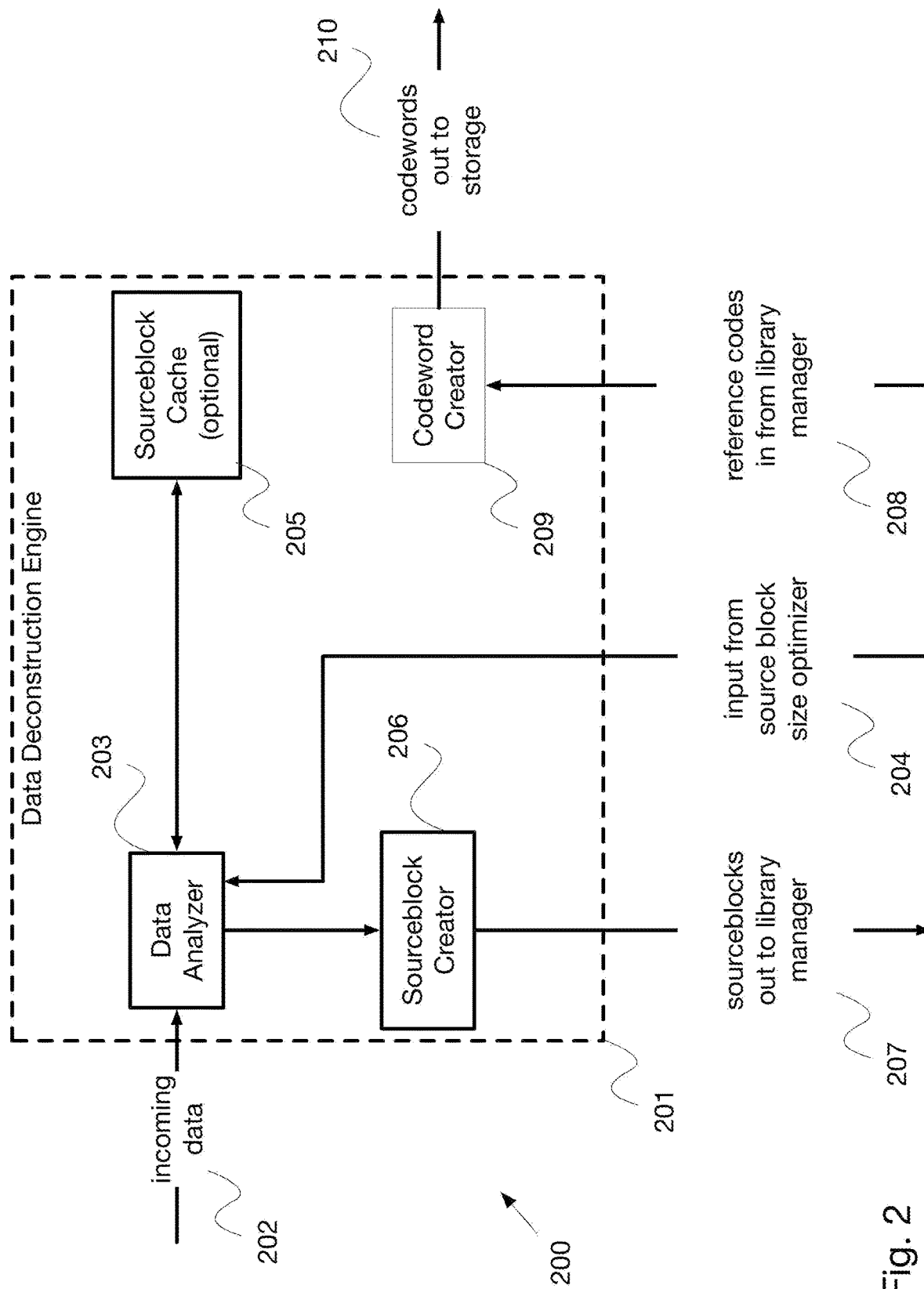
FIG. 2 is a diagram showing an embodiment of one aspect of the system, the data deconstruction engine.

FIG. 2 is a diagram showing an embodiment of one aspect 200 of the system, specifically data deconstruction engine 201. Incoming data 202 is received by data analyzer 203, which optimally analyzes the data based on machine learning algorithms and input 204 from a sourceblock size optimizer, which is disclosed below. Data analyzer may optionally have access to a sourceblock cache 205 of recently-processed sourceblocks, which can increase the speed of the system by avoiding processing in library manager 103. Based on information from data analyzer 203, the data is broken into sourceblocks by sourceblock creator 206, which sends sourceblocks 207 to library manager 203 for additional processing. Data deconstruction engine 201 receives reference codes 208 from library manager 103, corresponding to the sourceblocks in the library that match the sourceblocks sent by sourceblock creator 206, and codeword creator 209 processes the reference codes into codewords comprising a reference code to a sourceblock and a location of that sourceblock within the data set. The original data may be discarded, and the codewords representing the data are sent out to storage 210.

Figure 3:
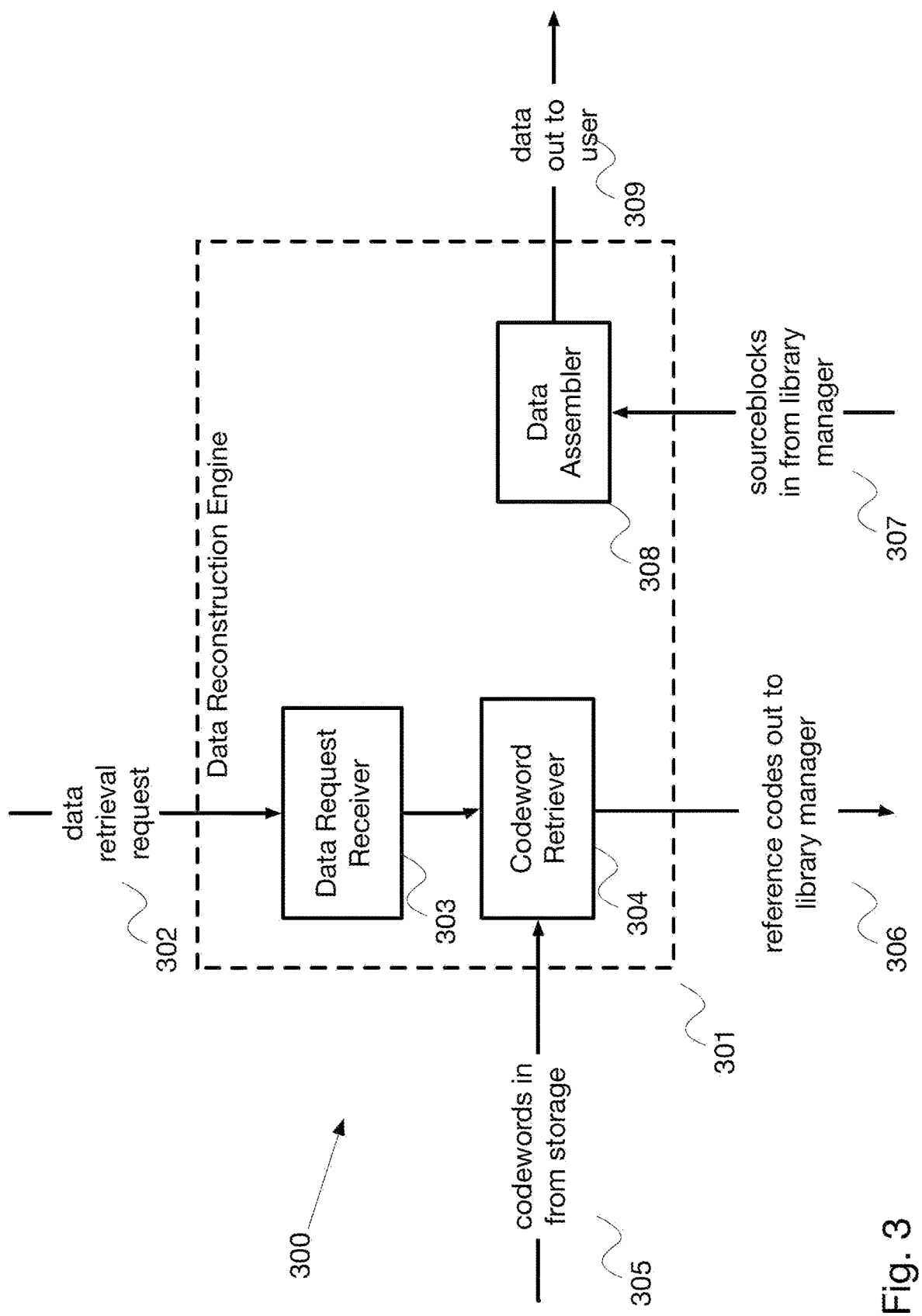
FIG. 3 is a diagram showing an embodiment of one aspect of the system, the data reconstruction engine.

FIG. 3 is a diagram showing an embodiment of another aspect of system 300, specifically data reconstruction engine 301. When a data retrieval request 302 is received by data request receiver 303 (in the form of a plurality of codewords corresponding to a desired final data set), it passes the information to data retriever 304, which obtains the requested data 305 from storage. Data retriever 304 sends, for each codeword received, a reference codes from the codeword 306 to library manager 103 for retrieval of the specific sourceblock associated with the reference code. Data assembler 308 receives the sourceblock 307 from library manager 103 and, after receiving a plurality of sourceblocks corresponding to a plurality of codewords, assembles them into the proper order based on the location information contained in each codeword (recall each codeword comprises a sourceblock reference code and a location identifier that specifies where in the resulting data set the specific sourceblock should be restored to. The requested data is then sent to user 309 in its original form.

Figure 4:
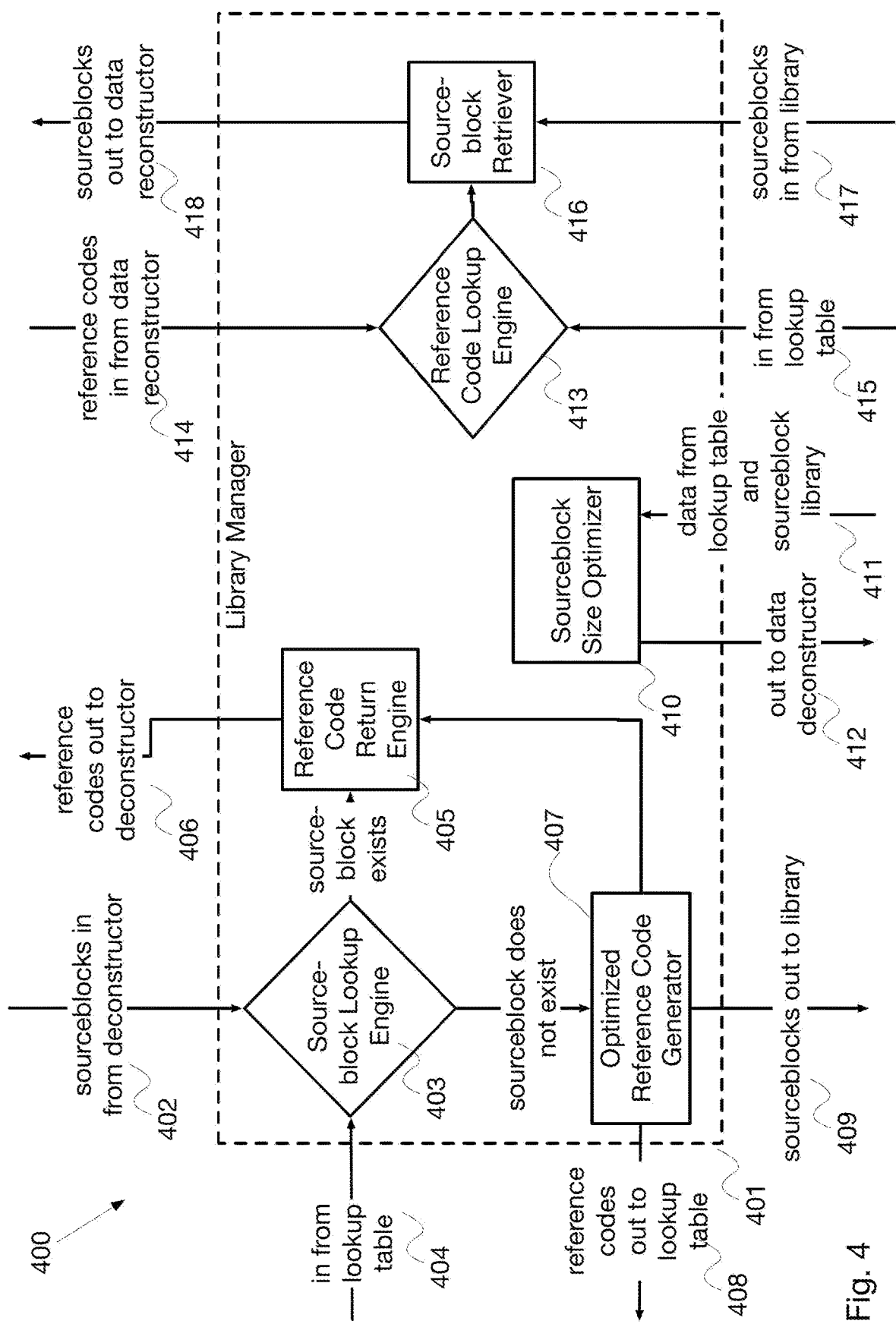
FIG. 4 is a diagram showing an embodiment of one aspect of the system, the library management module.

FIG. 4 is a diagram showing an embodiment of another aspect of the system 400, specifically library manager 401. One function of library manager 401 is to generate reference codes from sourceblocks received from data deconstruction engine 301. As sourceblocks are received 402 from data deconstruction engine 301, sourceblock lookup engine 403 checks sourceblock library lookup table 404 to determine whether those sourceblocks already exist in sourceblock library storage 105. If a particular sourceblock exists in sourceblock library storage 105, reference code return engine 405 sends the appropriate reference code 406 to data deconstruction engine 301. If the sourceblock does not exist in sourceblock library storage 105, optimized reference code generator 407 generates a new, optimized reference code based on machine learning algorithms. Optimized reference code generator 407 then saves the reference code 408 to sourceblock library lookup table 104; saves the associated sourceblock 409 to sourceblock library storage 105; and passes the reference code to reference code return engine 405 for sending 406 to data deconstruction engine 301. Another function of library manager 401 is to optimize the size of sourceblocks in the system. Based on information 411 contained in sourceblock library lookup table 104, sourceblock size optimizer 410 dynamically adjusts the size of sourceblocks in the system based on machine learning algorithms and outputs that information 412 to data analyzer 203. Another function of library manager 401 is to return sourceblocks associated with reference codes received from data reconstruction engine 301. As reference codes are received 414 from data reconstruction engine 301, reference code lookup engine 413 checks sourceblock library lookup table 415 to identify the associated sourceblocks; passes that information to sourceblock retriever 416, which obtains the sourceblocks 417 from sourceblock library storage 105; and passes them 418 to data reconstruction engine 301.

Figure 5:
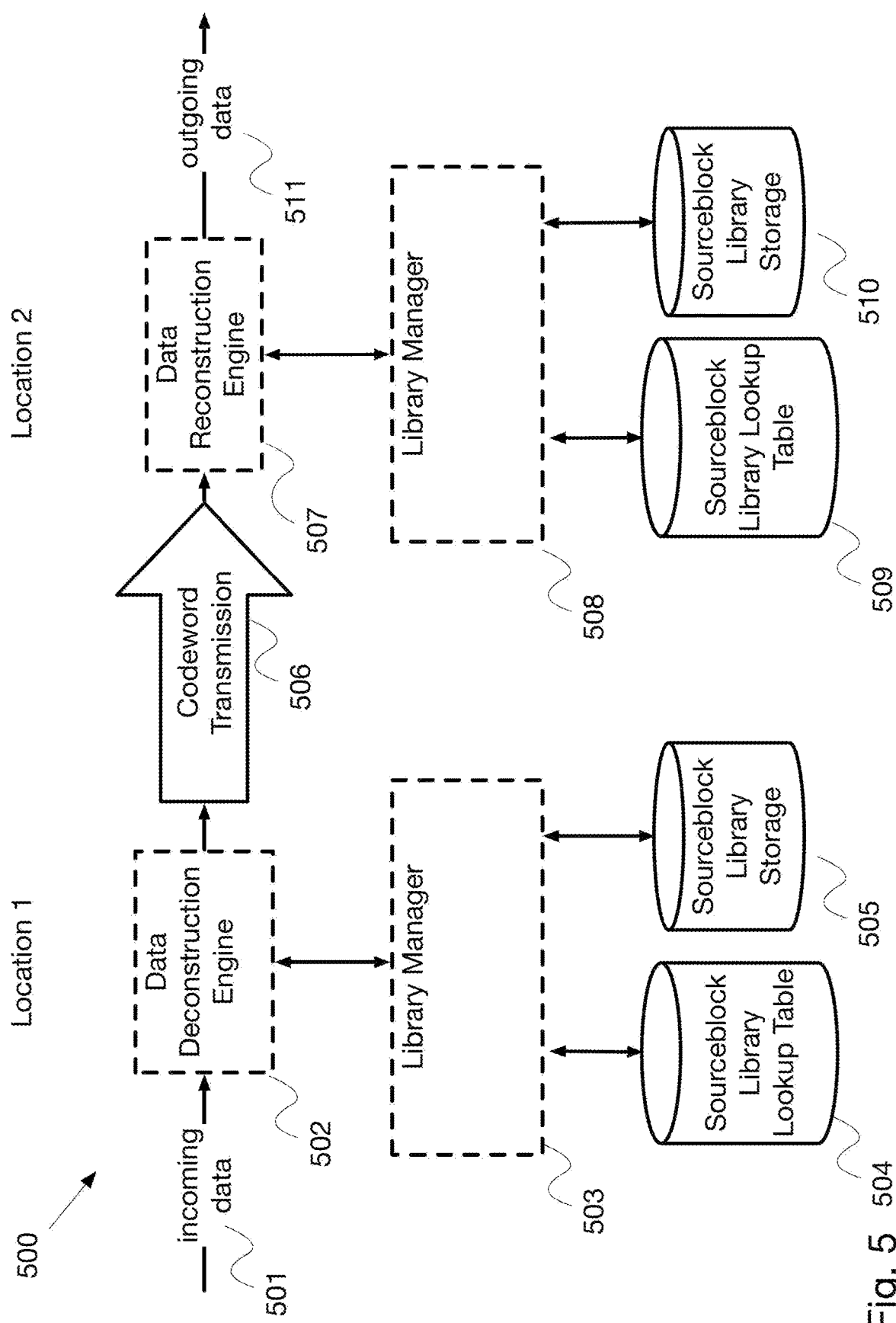
FIG. 5 is a diagram showing another embodiment of the system in which data is transferred between remote locations.

FIG. 5 is a diagram showing another embodiment of system 500, in which data is transferred between remote locations. As incoming data 501 is received by data deconstruction engine 502 at Location 1, data deconstruction engine 301 breaks the incoming data into sourceblocks, which are then sent to library manager 503 at Location 1. Using the information contained in sourceblock library lookup table 504 at Location 1 and sourceblock library storage 505 at Location 1, library manager 503 returns reference codes to data deconstruction engine 301 for processing into codewords, which are transmitted 506 to data reconstruction engine 507 at Location 2. In the case where the reference codes contained in a particular codeword have been newly generated by library manager 503 at Location 1, the codeword is transmitted along with a copy of the associated sourceblock. As data reconstruction engine 507 at Location 2 receives the codewords, it passes them to library manager module 508 at Location 2, which looks up the sourceblock in sourceblock library lookup table 509 at Location 2, and retrieves the associated from sourceblock library storage 510. Where a sourceblock has been transmitted along with a codeword, the sourceblock is stored in sourceblock library storage 510 and sourceblock library lookup table 504 is updated. Library manager 503 returns the appropriate sourceblocks to data reconstruction engine 507, which assembles them into the proper order and sends the data in its original form 511.

Figure 6:
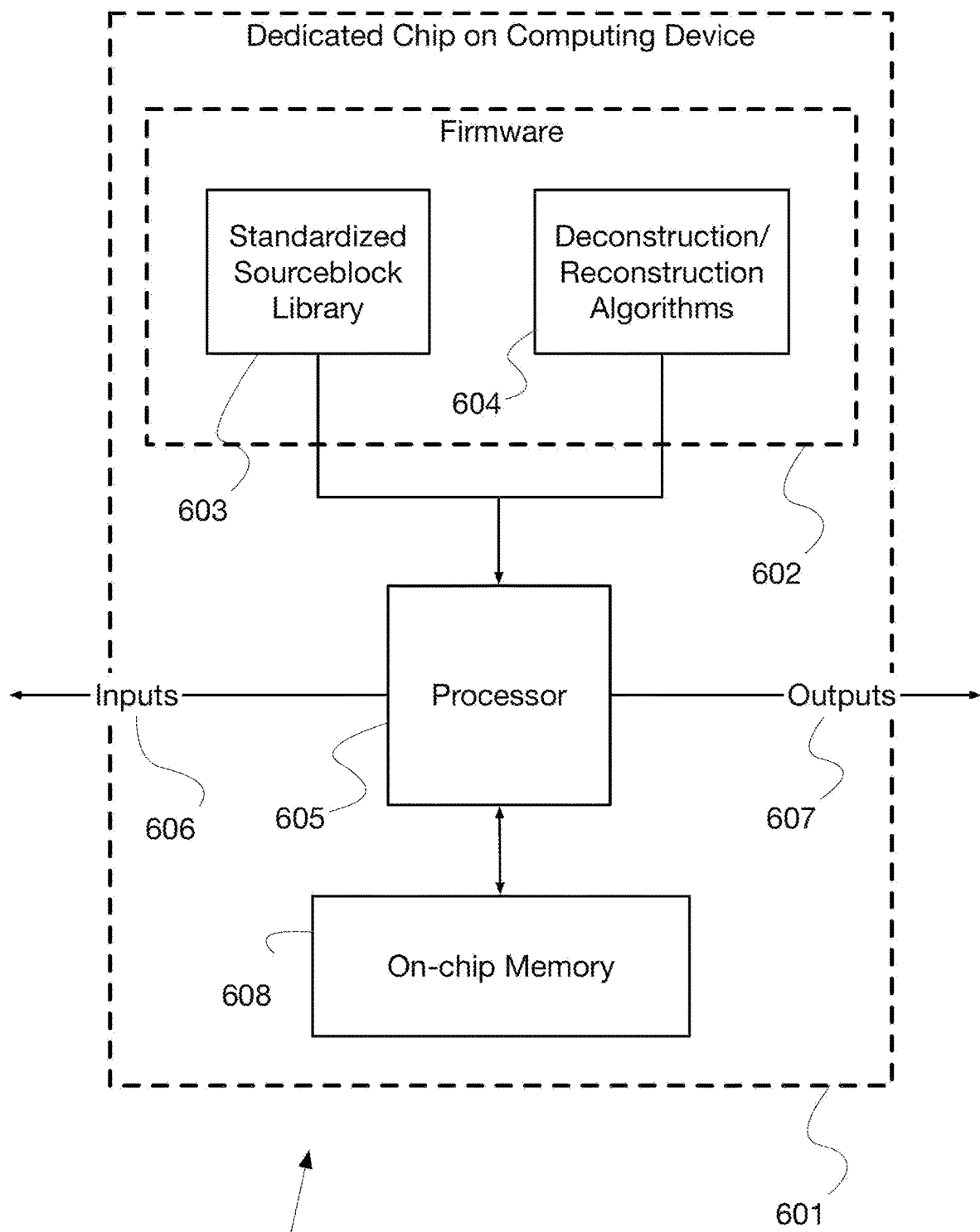
FIG. 6 is a diagram showing an embodiment in which a standardized version of the sourceblock library and associated algorithms would be encoded as firmware on a dedicated processing chip included as part of the hardware of a plurality of devices.

FIG. 6 is a diagram showing an embodiment 600 in which a standardized version of a sourceblock library 603 and associated algorithms 604 would be encoded as firmware 602 on a dedicated processing chip 601 included as part of the hardware of a plurality of devices 600. Contained on dedicated chip 601 would be a firmware area 602, on which would be stored a copy of a standardized sourceblock library 603 and deconstruction/reconstruction algorithms 604 for processing the data. Processor 605 would have both inputs 606 and outputs 607 to other hardware on the device 600. Processor 605 would store incoming data for processing on on-chip memory 608, process the data using standardized sourceblock library 603 and deconstruction/reconstruction algorithms 604, and send the processed data to other hardware on device 600. Using this embodiment, the encoding and decoding of data would be handled by dedicated chip 601, keeping the burden of data processing off device's 600 primary processors. Any device equipped with this embodiment would be able to store and transmit data in a highly optimized, bandwidth-efficient format with any other device equipped with this embodiment.

Figure 12:
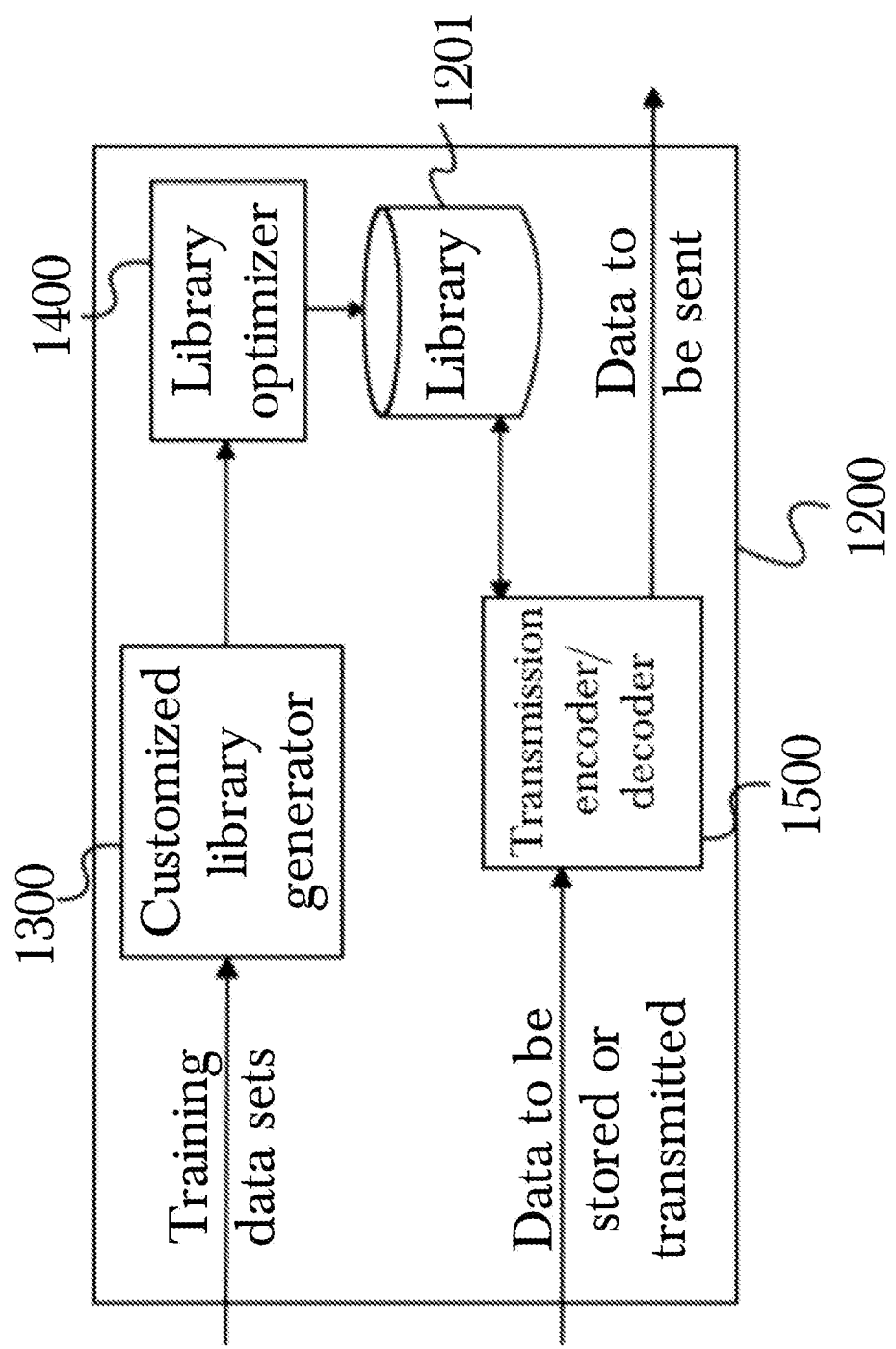
FIG. 12 is a diagram showing an exemplary data transmission system architecture, according to an embodiment.

FIG. 12 is a diagram showing an exemplary data transmission system architecture 1200, according to an embodiment. Incoming training data sets may be received at a customized library generator 1300 that processes training data to produce a customized word library 1201 comprising key-value pairs of data words (each comprising a string of bits) and their corresponding calculated binary Huffman codewords. The resultant word library 1201 may then be processed by a library optimizer 1400 to reduce size and improve efficiency, for example by pruning low-occurrence data entries or calculating approximate codewords that may be used to match more than one data word. A transmission encoder/decoder 1500 may be used to receive incoming data intended for storage or transmission, process the data using a word library 1201 to retrieve codewords for the words in the incoming data, and then append the codewords (rather than the original data) to an outbound data stream. Each of these components is described in greater detail below, illustrating the particulars of their respective processing and other functions, referring to FIGS. 2-4.

System 1200 provides near-instantaneous source coding that is dictionary-based and learned in advance from sample training data, so that encoding and decoding may happen concurrently with data transmission. This results in computational latency that is near zero but the data size reduction is comparable to classical compression. For example, if N bits are to be transmitted from sender to receiver, the compression ratio of classical compression is C, the ratio between the deflation factor of system 1200 and that of multi-pass source coding is p, the classical compression encoding rate is $R_C$ bit/s and the decoding rate is $R_D$ bit/s, and the transmission speed is S bit/s, the compress-send-decompress time will be $$T_{old} = \frac{N}{R_C} + \frac{N}{CS} + \frac{N}{CR_D}$$

while the transmit-while-coding time for system 1200 will be (assuming that encoding and decoding happen at least as quickly as network latency):

$$T_{new} = \frac{N_p}{CS}$$

so that the total data transit time improvement factor is $$\frac{T_{old}}{T_{new}} = \frac{\frac{CS}{R_C} + 1 + \frac{S}{R_D}}{p}$$

which presents a savings whenever $$\frac{CS}{R_C} + \frac{S}{R_D} > p - 1$$

This is a reasonable scenario given that typical values in real-world practice are C=0.32, $R_C$=1.1·10$^{12}$, $R_D$=4.2·10$^{12}$, S=10$^{11}$, giving $$\frac{CS}{R_C} + \frac{S}{R_D} = 0.053\ldots,$$

such that system 1200 will outperform the total transit time of the best compression technology available as long as its deflation factor is no more than 5% worse than compression. Such customized dictionary-based encoding will also sometimes exceed the deflation ratio of classical compression, particularly when network speeds increase beyond 100 Gb/s.

The delay between data creation and its readiness for use at a receiving end will be equal to only the source word length t (typically 5-15 bytes), divided by the deflation factor C/p and the network speed S, i.e.

$$\text{delay}_{invention} = \frac{tp}{CS}$$

since encoding and decoding occur concurrently with data transmission. On the other hand, the latency associated with classical compression is $$\text{delay}_{priorart} = \frac{N}{R_C} + \frac{N}{CS} + \frac{N}{CR_D}$$

where N is the packet/file size. Even with the generous values chosen above as well as N=512K, t=10, and p=1.05, this results in $\text{delay}_{invention} \approx 3.3 \cdot 10^{-10}$ while $\text{delay}_{priorart} \approx 1.3 \cdot 10^{-7}$, a more than 400-fold reduction in latency.

A key factor in the efficiency of Huffman coding used by system 1200 is that key-value pairs be chosen carefully to minimize expected coding length, so that the average deflation/compression ratio is minimized. It is possible to achieve the best possible expected code length among all instantaneous codes using Huffman codes if one has access to the exact probability distribution of source words of a given desired length from the random variable generating them. In practice this is impossible, as data is received in a wide variety of formats and the random processes underlying the source data are a mixture of human input, unpredictable (though in principle, deterministic) physical events, and noise. System 1200 addresses this by restriction of data types and density estimation; training data is provided that is representative of the type of data anticipated in "real-world" use of system 1200, which is then used to model the distribution of binary strings in the data in order to build a Huffman code word library 1200.

Figure 13:
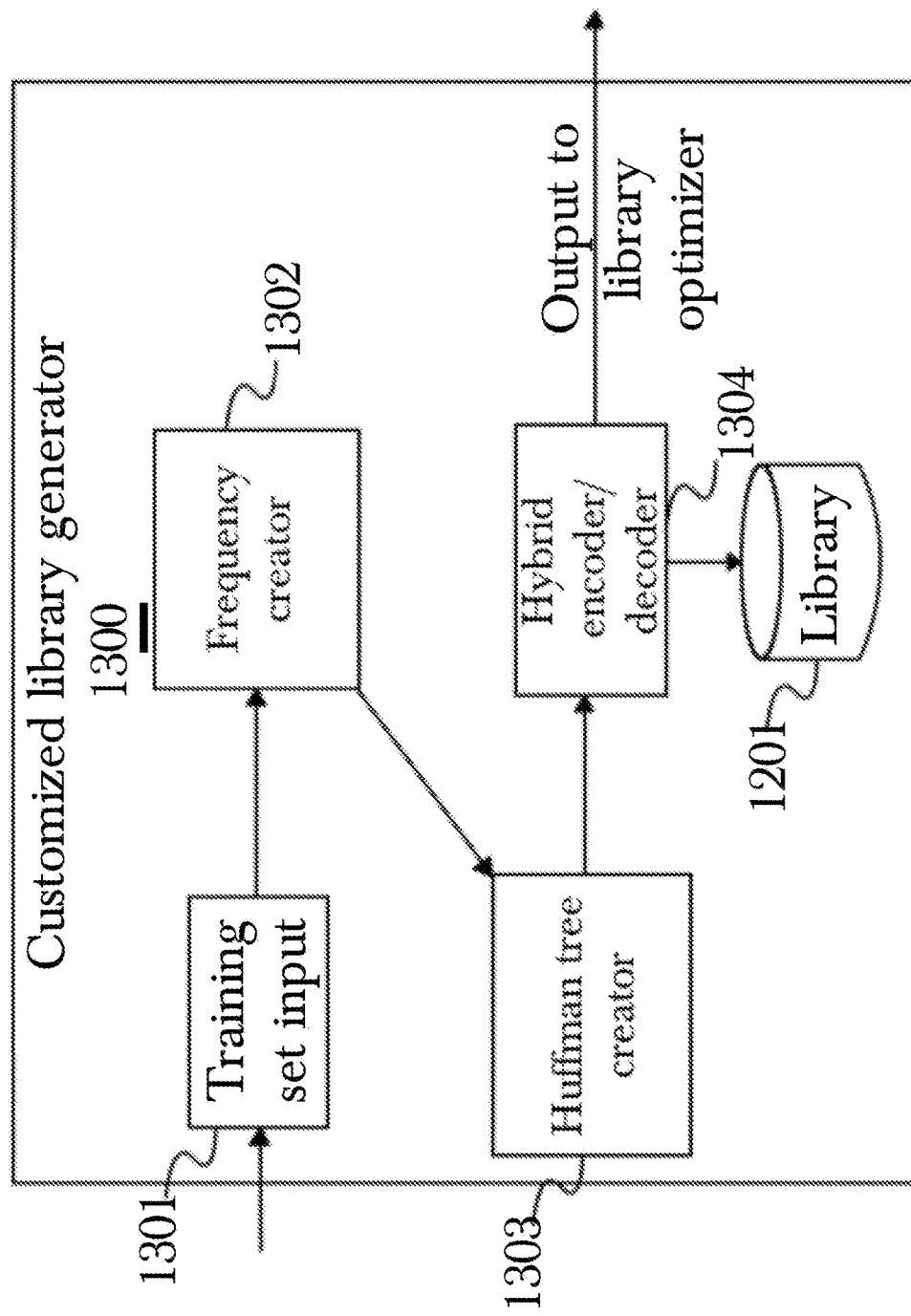
FIG. 13 is a diagram showing a more detailed architecture for a customized library generator.

FIG. 13 is a diagram showing a more detailed architecture for a customized library generator 1300. When an incoming training data set 1301 is received, it may be analyzed using a frequency creator 1302 to analyze for word frequency (that is, the frequency with which a given word occurs in the training data set). Word frequency may be analyzed by scanning all substrings of bits and directly calculating the frequency of each substring by iterating over the data set to produce an occurrence frequency, which may then be used to estimate the rate of word occurrence in non-training data. A first Huffman binary tree is created based on the frequency of occurrences of each word in the first dataset, and a Huffman codeword is assigned to each observed word in the first dataset according to the first Huffman binary tree. Machine learning may be utilized to improve results by processing a number of training data sets and using the results of each training set to refine the frequency estimations for non-training data, so that the estimation yield better results when used with real-world data (rather than, for example, being only based on a single training data set that may not be very similar to a received non-training data set). A second Huffman tree creator 1303 may be utilized to identify words that do not match any existing entries in a word library 1201 and pass them to a hybrid encoder/decoder 1304, that then calculates a binary Huffman codeword for the mismatched word and adds the codeword and original data to the word library 1201 as a new key-value pair. In this manner, customized library generator 1300 may be used both to establish an initial word library 1201 from a first training set, as well as expand the word library 1201 using additional training data to improve operation.

Figure 14:
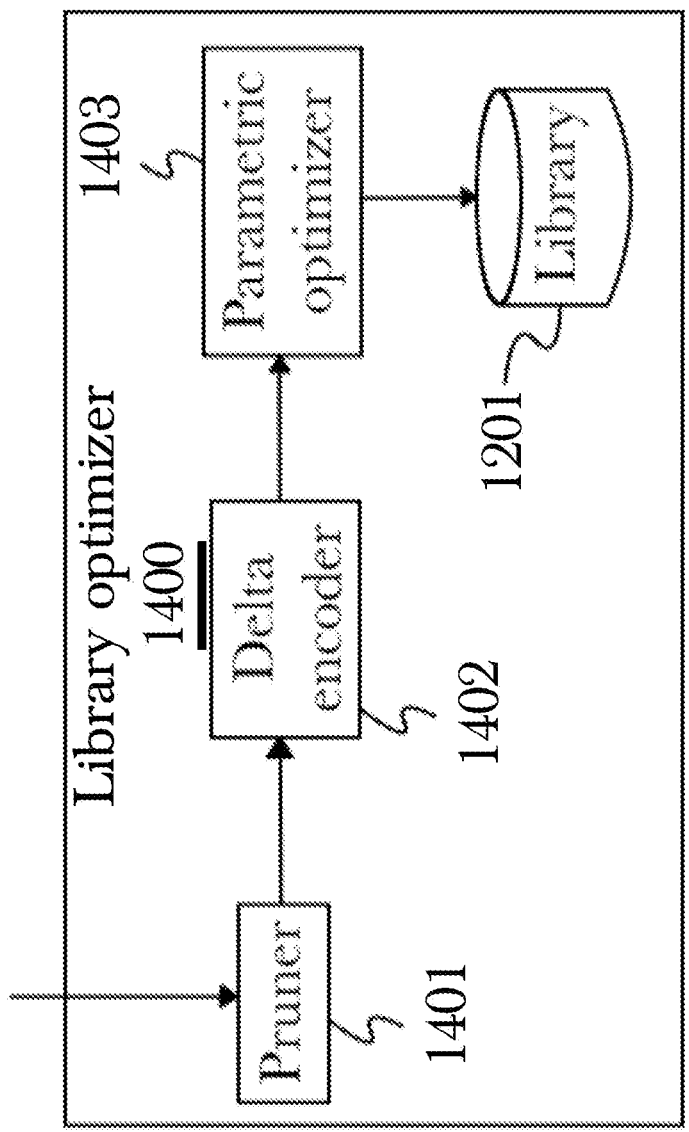
FIG. 14 is a diagram showing a more detailed architecture for a library optimizer.

FIG. 14 is a diagram showing a more detailed architecture for a library optimizer 1400. A pruner 1401 may be used to load a word library 1201 and reduce its size for efficient operation, for example by sorting the word library 1201 based on the known occurrence probability of each key-value pair and removing low-probability key-value pairs based on a loaded threshold parameter. This prunes low-value data from the word library to trim the size, eliminating large quantities of very-low-frequency key-value pairs such as single-occurrence words that are unlikely to be encountered again in a data set. Pruning eliminates the least-probable entries from word library 1201 up to a given threshold, which will have a negligible impact on the deflation factor since the removed entries are only the least-common ones, while the impact on word library size will be larger because samples drawn from asymptotically normal distributions (such as the log-probabilities of words generated by a probabilistic finite state machine, a model well-suited to a wide variety of real-world data) which occur in tails of the distribution are disproportionately large in counting measure. A delta encoder 1402 may be utilized to apply delta encoding to a plurality of words to store an approximate codeword as a value in the word library, for which each of the plurality of source words is a valid corresponding key. This may be used to reduce library size by replacing numerous key-value pairs with a single entry for the approximate codeword and then represent actual codewords using the approximate codeword plus a delta value representing the difference between the approximate codeword and the actual codeword. Approximate coding is optimized for low-weight sources such as Golomb coding, run-length coding, and similar techniques. The approximate source words may be chosen by locality-sensitive hashing, so as to approximate Hamming distance without incurring the intractability of nearest-neighbor-search in Hamming space. A parametric optimizer 1403 may load configuration parameters for operation to optimize the use of the word library 1201 during operation. Best-practice parameter/hyperparameter optimization strategies such as stochastic gradient descent, quasi-random grid search, and evolutionary search may be used to make optimal choices for all inter-dependent settings playing a role in the functionality of system 1200. In cases where lossless compression is not required, the delta value may be discarded at the expense of introducing some limited errors into any decoded (reconstructed) data.

Figure 15:
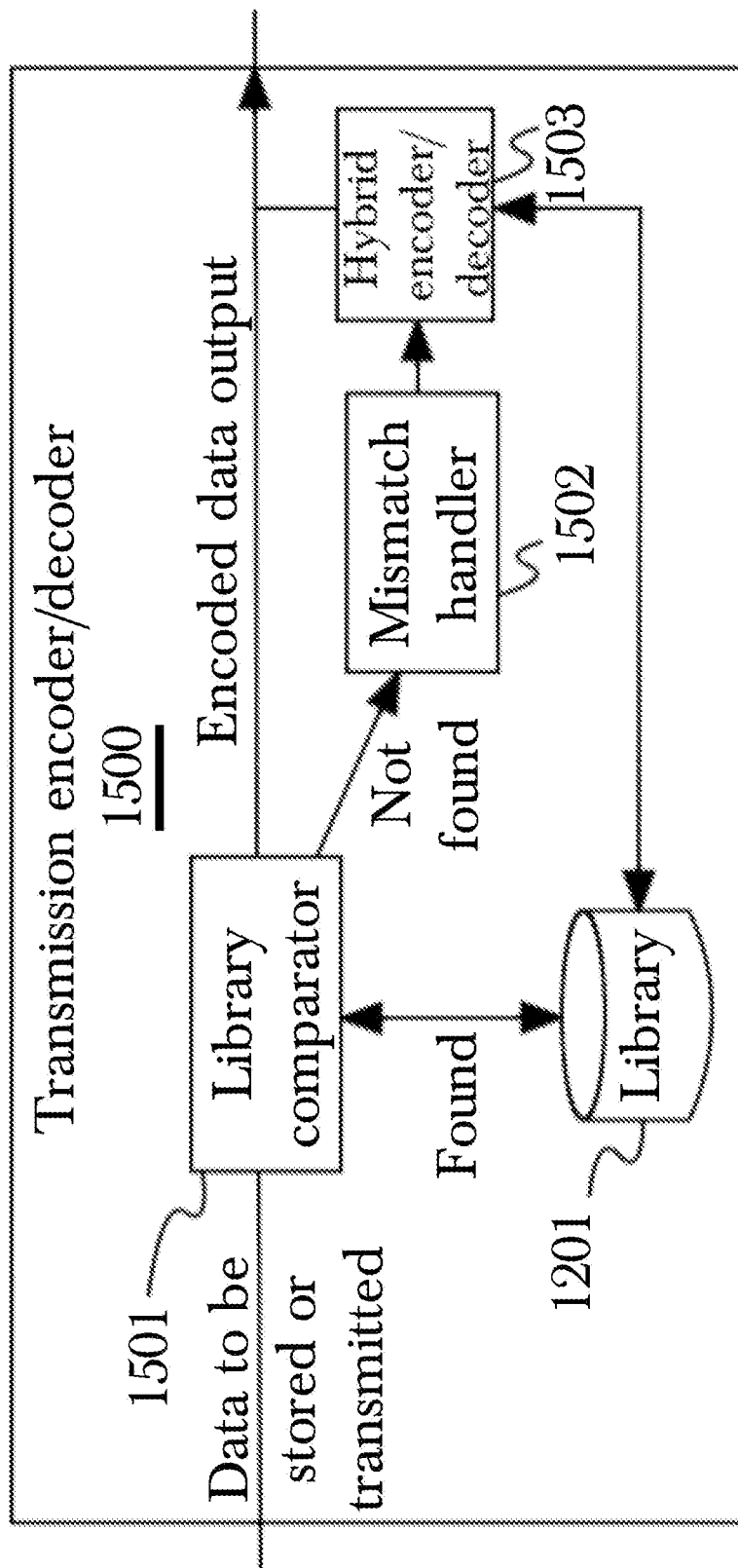
FIG. 15 is a diagram showing a more detailed architecture for a transmission and storage engine.

FIG. 15 is a diagram showing a more detailed architecture for a transmission encoder/decoder 1500. According to various arrangements, transmission encoder/decoder 1500 may be used to deconstruct data for storage or transmission, or to reconstruct data that has been received, using a word library 1201. A library comparator 1501 may be used to receive data comprising words or codewords, and compare against a word library 1201 by dividing the incoming stream into substrings of length t and using a fast hash to check word library 1201 for each substring. If a substring is found in word library 1201, the corresponding key/value (that is, the corresponding source word or codeword, according to whether the substring used in comparison was itself a word or codeword) is returned and appended to an output stream. If a given substring is not found in word library 1201, a mismatch handler 1502 and hybrid encoder/decoder 1503 may be used to handle the mismatch similarly to operation during the construction or expansion of word library 1201. A mismatch handler 1502 may be utilized to identify words that do not match any existing entries in a word library 1201 and pass them to a hybrid encoder/decoder 1503, that then calculates a binary Huffman codeword for the mismatched word and adds the codeword and original data to the word library 1201 as a new key-value pair. The newly-produced codeword may then be appended to the output stream. In arrangements where a mismatch indicator is included in a received data stream, this may be used to preemptively identify a substring that is not in word library 1201 (for example, if it was identified as a mismatch on the transmission end), and handled accordingly without the need for a library lookup.

Figure 19:
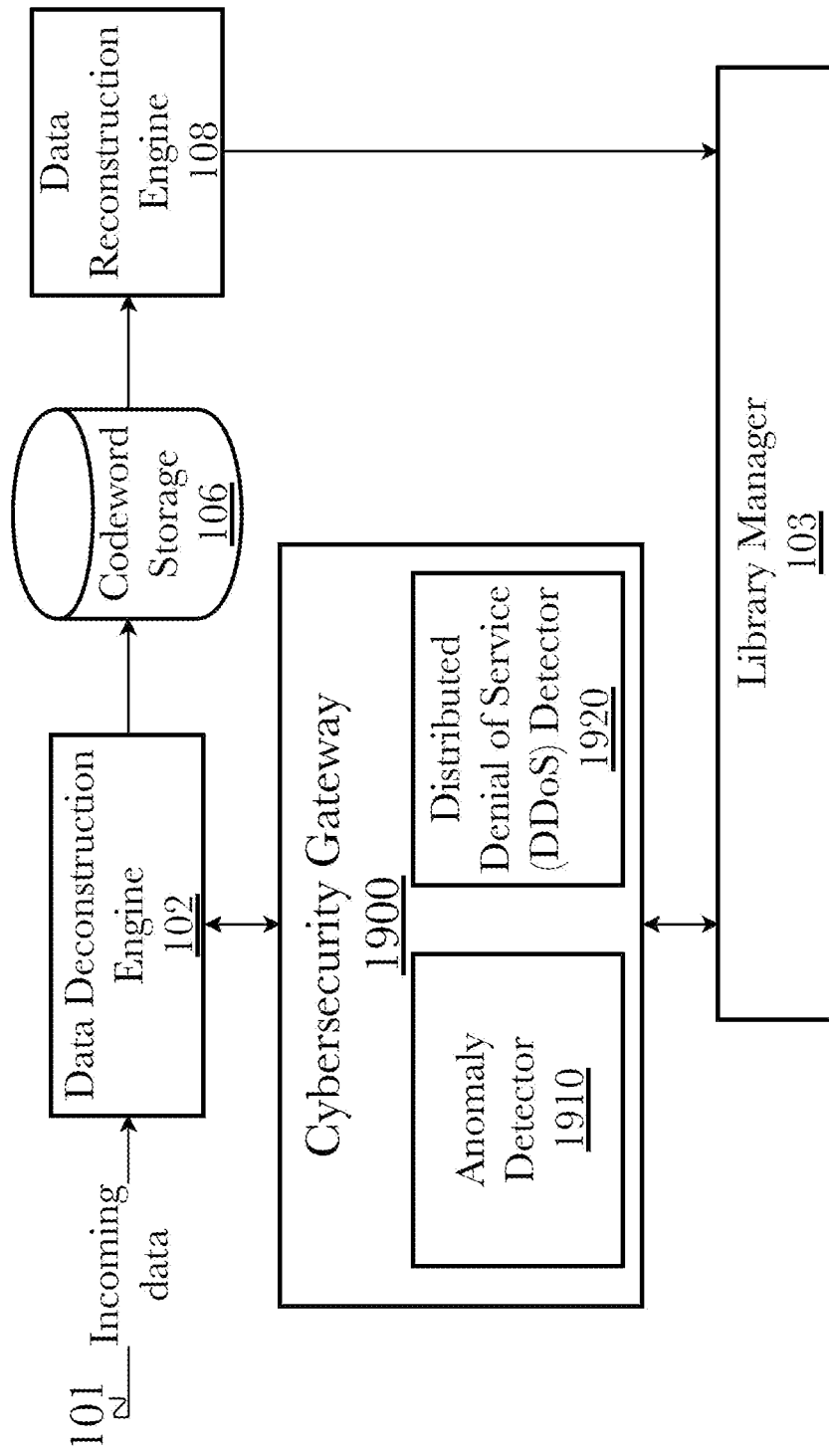
FIG. 19 is an exemplary system architecture of a data encoding system used for cyber security purposes.

FIG. 19 is an exemplary system architecture of a data encoding system used for cyber security purposes. Much like in FIG. 1, incoming data 101 to be deconstructed is sent to a data deconstruction engine 102, which may attempt to deconstruct the data and turn it into a collection of codewords using a library manager 103. Warplet storage 106 serves to store unique codewords from this process, and may be queried by a data reconstruction engine 108 which may reconstruct the original data from the codewords, using a library manager 103. However, a cybersecurity gateway 1900 is present, communicating in-between a library manager 103 and a deconstruction engine 102, and containing an anomaly detector 1910 and distributed denial of service (DDoS) detector 1920. The anomaly detector examines incoming data to determine whether there is a disproportionate number of incoming reference codes that do not match reference codes in the existing library. A disproportionate number of non-matching reference codes may indicate that data is being received from an unknown source, of an unknown type, or contains unexpected (possibly malicious) data. If the disproportionate number of non-matching reference codes exceeds an established threshold or persists for a certain length of time, the anomaly detector 1910 raises a warning to a system administrator. Likewise, the DDoS detector 1920 examines incoming data to determine whether there is a disproportionate amount of repetitive data. A disproportionate amount of repetitive data may indicate that a DDoS attack is in progress. If the disproportionate amount of repetitive data exceeds an established threshold or persists for a certain length of time, the DDoS detector 1910 raises a warning to a system administrator. In this way, a data encoding system may detect and warn users of, or help mitigate, common cyber-attacks that result from a flow of unexpected and potentially harmful data, or attacks that result from a flow of too much irrelevant data meant to slow down a network or system, as in the case of a DDoS attack.

Figure 22:
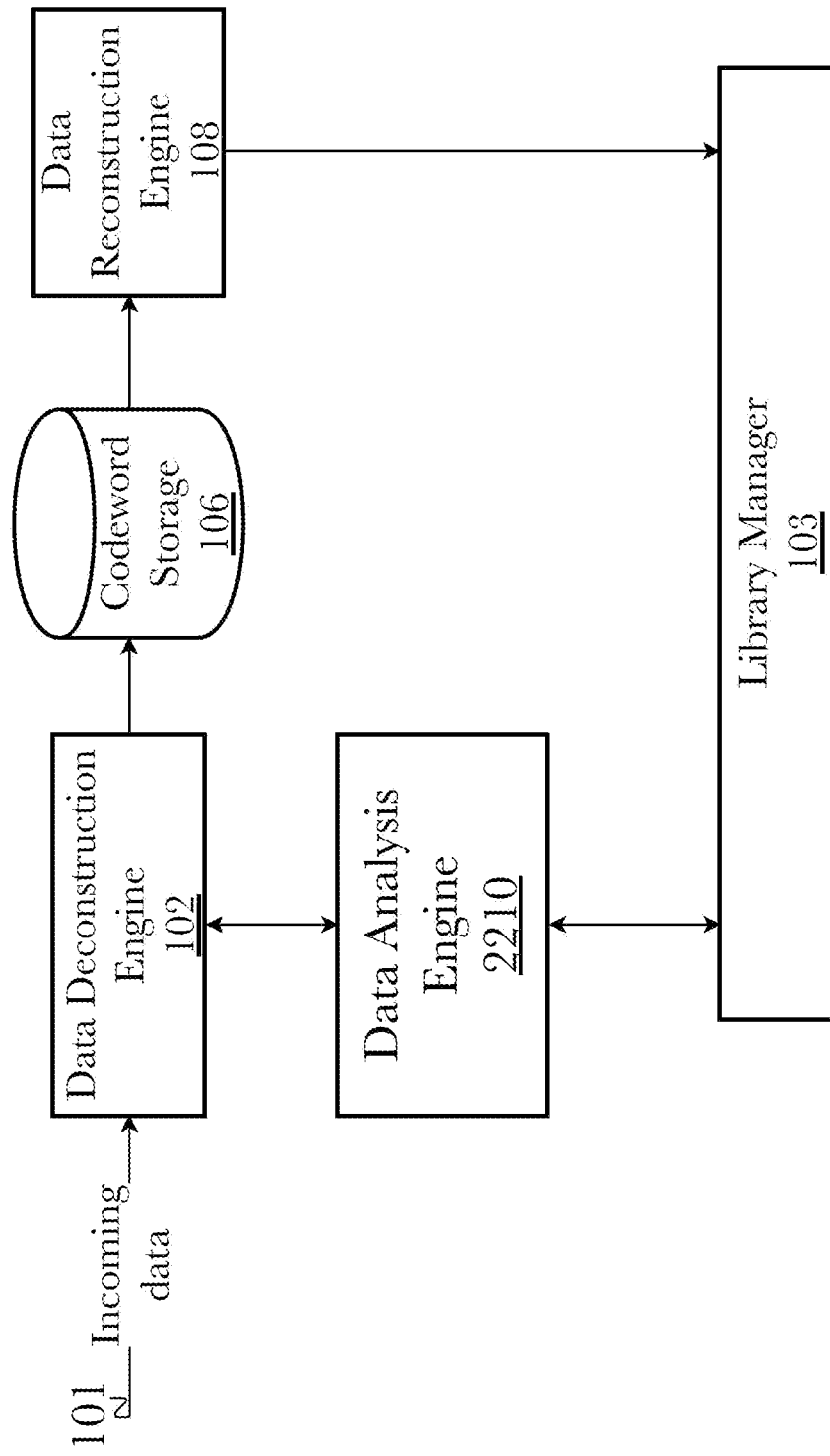
FIG. 22 is an exemplary system architecture of a data encoding system used for data mining and analysis purposes.

FIG. 22 is an exemplary system architecture of a data encoding system used for data mining and analysis purposes. Much like in FIG. 1, incoming data 101 to be deconstructed is sent to a data deconstruction engine 102, which may attempt to deconstruct the data and turn it into a collection of codewords using a library manager 103. Warplet storage 106 serves to store unique codewords from this process, and may be queried by a data reconstruction engine 108 which may reconstruct the original data from the codewords, using a library manager 103. A data analysis engine 2210, typically operating while the system is otherwise idle, sends requests for data to the data reconstruction engine 108, which retrieves the codewords representing the requested data from codeword storage 106, reconstructs them into the data represented by the codewords, and send the reconstructed data to the data analysis engine 2210 for analysis and extraction of useful data (i.e., data mining). Because the speed of reconstruction is significantly faster than decompression using traditional compression technologies (i.e., significantly less decompression latency), this approach makes data mining feasible. Very often, data stored using traditional compression is not mined precisely because decompression lag makes it unfeasible, especially during shorter periods of system idleness. Increasing the speed of data reconstruction broadens the circumstances under which data mining of stored data is feasible.

Figure 24:
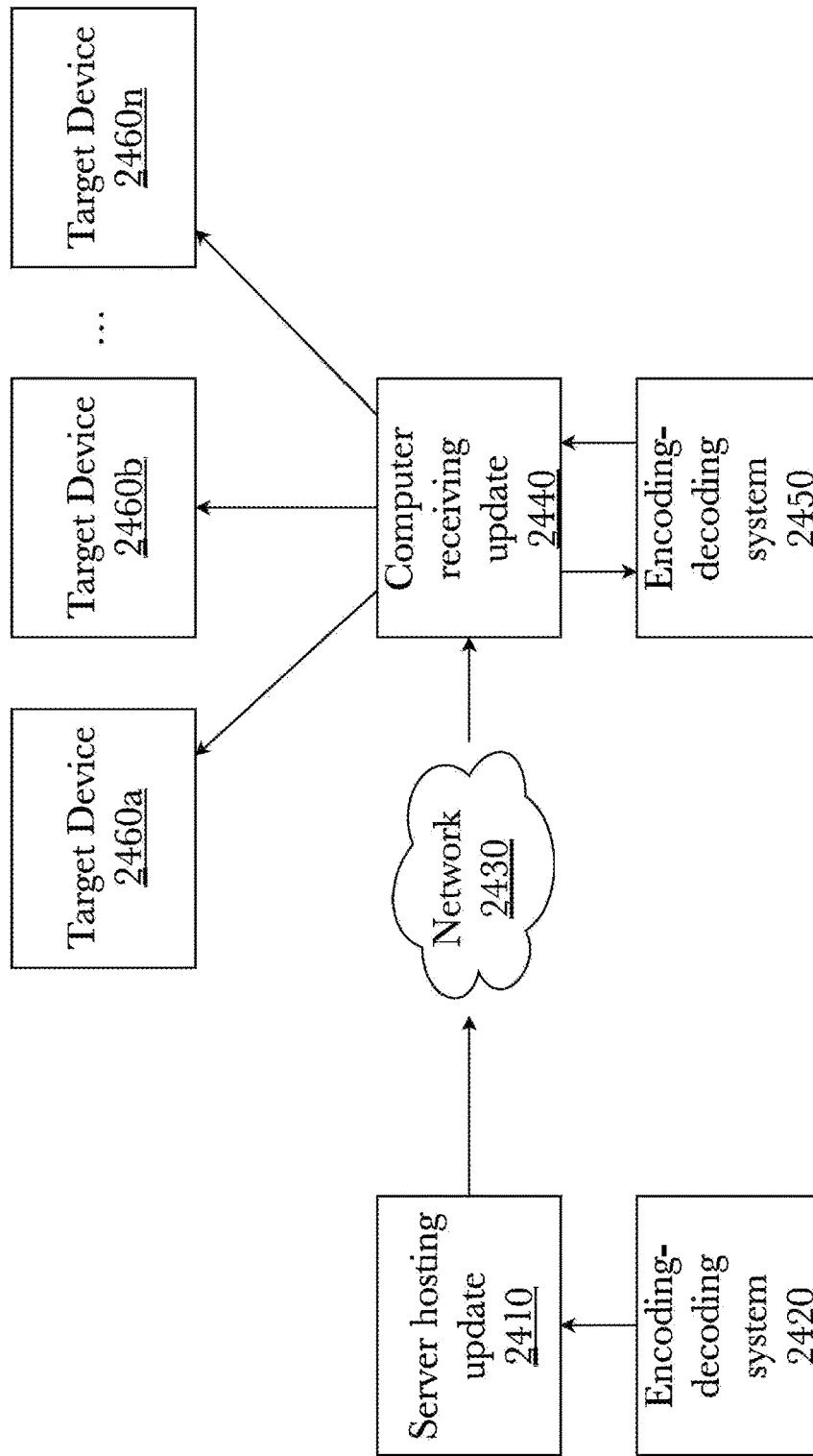
FIG. 24 is an exemplary system architecture of a data encoding system used for remote software and firmware updates.

FIG. 24 is an exemplary system architecture of a data encoding system used for remote software and firmware updates. Software and firmware updates typically require smaller, but more frequent, file transfers. A server which hosts a software or firmware update 2410 may host an encoding-decoding system 2420, allowing for data to be encoded into, and decoded from, sourceblocks or codewords, as disclosed in previous figures. Such a server may possess a software update, operating system update, firmware update, device driver update, or any other form of software update, which in some cases may be minor changes to a file, but nevertheless necessitate sending the new, completed file to the recipient. Such a server is connected over a network 2430, which is further connected to a recipient computer 2440, which may be connected to a server 2410 for receiving such an update to its system. In this instance, the recipient device 2440 also hosts the encoding and decoding system 2450, along with a codebook or library of reference codes that the hosting server 2410 also shares. The updates are retrieved from storage at the hosting server 2410 in the form of codewords, transferred over the network 2430 in the form of codewords, and reconstructed on the receiving computer 2440. In this way, a far smaller file size, and smaller total update size, may be sent over a network. The receiving computer 2440 may then install the updates on any number of target computing devices 2460*a*-*n*, using a local network or other high-bandwidth connection.

Figure 26:
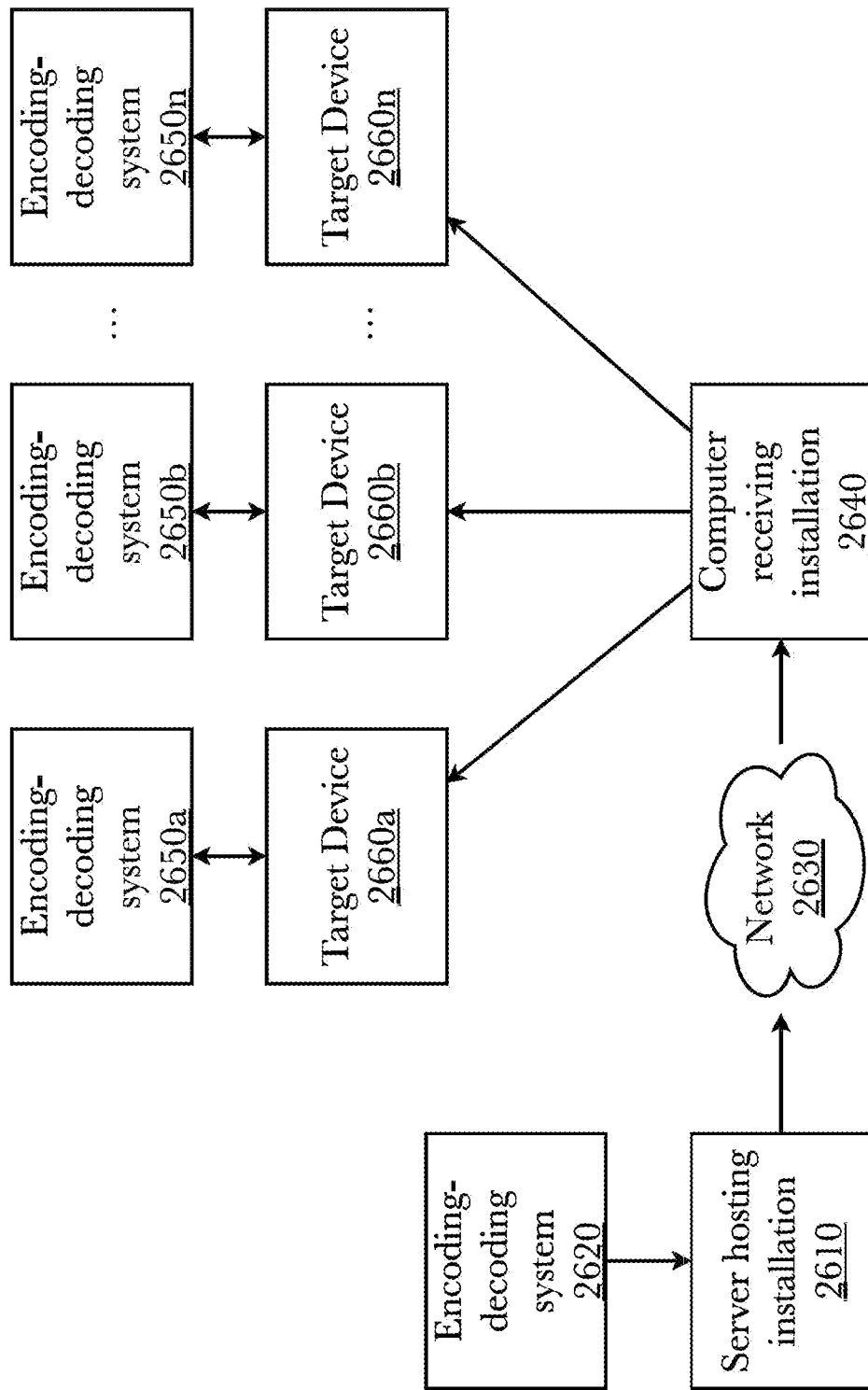
FIG. 26 is an exemplary system architecture of a data encoding system used for large-scale software installation such as operating systems.

FIG. 26 is an exemplary system architecture of a data encoding system used for large-scale software installation such as operating systems. Large-scale software installations typically require very large, but infrequent, file transfers. A server which hosts an installable software 2610 may host an encoding-decoding system 2620, allowing for data to be encoded into, and decoded from, sourceblocks or codewords, as disclosed in previous figures. The files for the large scale software installation are hosted on the server 2610, which is connected over a network 2630 to a recipient computer 2640. In this instance, the encoding and decoding system 2650*a*-*n* is stored on or connected to one or more target devices 2660*a*-*n*, along with a codebook or library of reference codes that the hosting server 2610 shares. The software is retrieved from storage at the hosting server 2610 in the form of codewords, and transferred over the network 2630 in the form of codewords to the receiving computer 2640. However, instead of being reconstructed at the receiving computer 2640, the codewords are transmitted to one or more target computing devices, and reconstructed and installed directly on the target devices 2660*a*-*n*. In this way, a far smaller file size, and smaller total update size, may be sent over a network or transferred between computing devices, even where the network 2630 between the receiving computer 2640 and target devices 2660*a*-*n* is low bandwidth, or where there are many target devices 2660*a*-*n*.

Figure 28:
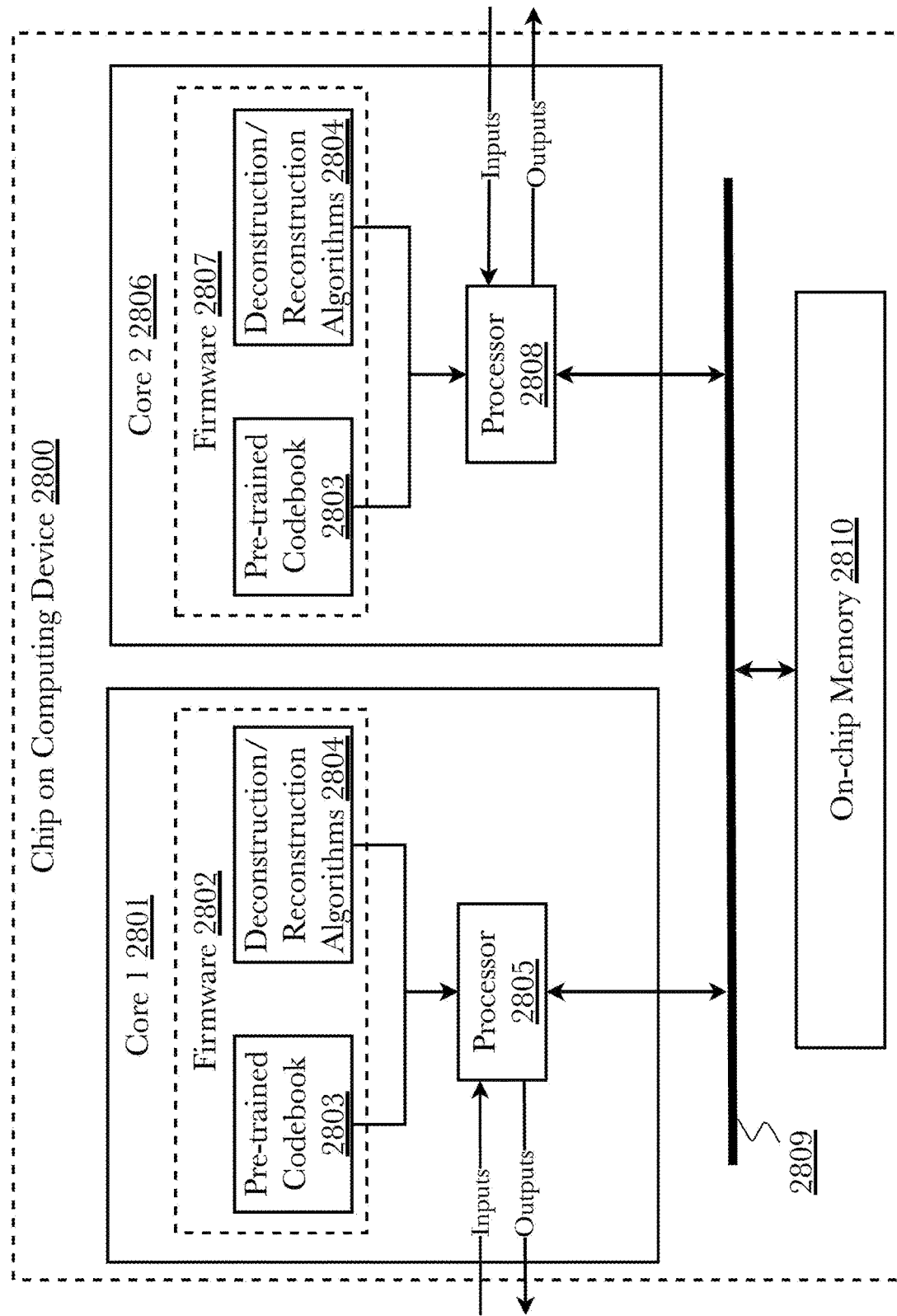
FIG. 28 is a diagram showing an embodiment in which a pre-trained version of the codebook library and associated algorithms would be encoded as firmware on an exemplary multi-core processing chip included as part of the hardware of a plurality of devices.

FIG. 28 is a diagram showing an exemplary embodiment in which a pre-trained version of the codebook library and associated algorithms would be encoded as firmware on a semiconductor multi-core processing chip 2800 included as part of the hardware of a plurality of devices. According to an embodiment, a semiconductor, such as a multi-core processing chip 2800, may have two or more processing cores 2801, 2806 which may pass data between and among the cores using a data bus 2809. As more and more processors are used to perform tasks, larger portion of the resources and cost is used to transport bits between processors. This cost is proportional to the number of bits/second that need to be transported. The cost is high for data transport between processor components where the data travels across circuit board traces. In order to reduce the cost of intra-chip (on-chip) data transportation between processing cores, a pre-trained codebook 2803 and algorithms 2804, which are lightweight code, may be embedded or programmed into firmware 2802, 2807 in a semiconductor. The system works by using training data to identify patterns in data prior to embedding code or programming firmware in a semiconductor. These patterns and their associated, smaller indices, or codewords, are stored in a codebook 2803 that is replicated on both the sending and receiving bus, along with lightweight code comprising the deconstruction and reconstruction algorithms 2804. In processing live data, only codewords, much smaller than the original data, are transferred between buses.

Data compaction is a stepless process that operates as fast as the data is created, a key component of the compaction process extreme low latency performance. As source data is generated, it is encoded by the deconstruction algorithm 2804 and the codewords are sent; at the destination (a different core), codewords are decoded via the reconstruction algorithm 2804 and the original data is instantaneously rebuilt, even as the file is still being generated at the source. The computationally intensive tasks of searching for patterns in data is performed in advance of embedding; in live semiconductor operation, the tasks involved consist primarily of lookups (e.g., codebook lookups), which are light and fast. The system and methods of compacting data disclosed may be especially suited to accelerate on-chip communications. Because the system and methods disclosed provide effective data reduction down to the scale of a few bytes and requires very limited instruction complexity to encode or decode, it can be deployed in on-chip computing environments with highly limited resources. There are various cost-saving and performance-enhancing applications when using a chip integrated with the disclosed system and method. First, it may help reduce bandwidth use of data buses/interconnects: by encoding data, the chip components send fewer bits, implying lower power demands, lower interconnect bandwidth/multiplexing requirements, and fast overall transmissions. Second, it may ameliorate data routing congestion: by increasing the information density of messages or packets in network-on-chip contexts, the delays, and pile-ups due to buffer congestion at on-chip routers can be substantially reduced, improving overall communications speed. Third, it may improve efficiency of memory resources: by compacting data that is being temporarily store during computation (e.g., registers, scratchpad, cache, etc.) the disclosed system and methods can pack more data into available on-chip memory and require fewer allocations, maker fewer accesses, and cause fewer misses. Furthermore, it may improve attenuation of crosstalk between components and interconnects/busses: the system integrated onto a chip may even be able to help with capacitive and inductive crosstalk by increasing the entropy rate of signals being transmitted on interconnection wires, thus decreasing periodicity and other patterns that contribute to coupling behavior. This use has the potential to enable denser wiring and more components per unit area.

According to an embodiment, contained on the multi-core chip 2800 for each core 2801, 2806 would be a firmware area 2802, 2807, on which would be a stored a copy of a pre-trained codebook 2803 and deconstruction/reconstruction algorithms 2804 for processing data. Processors 2805, 2808 would have both inputs and outputs to other hardware on the device. Processors 2805, 2808 would store incoming data for processing on on-chip memory 2810, process the data using the pre-trained codebook 2803 and deconstruction/reconstruction algorithms 2804, and the send the processed data to other hardware (e.g., another core) on the device. Any device equipped with this embodiment would be able to store and transmit data in a highly optimized, bandwidth-efficient format with any other device equipped with this embodiment.

Figure 29:
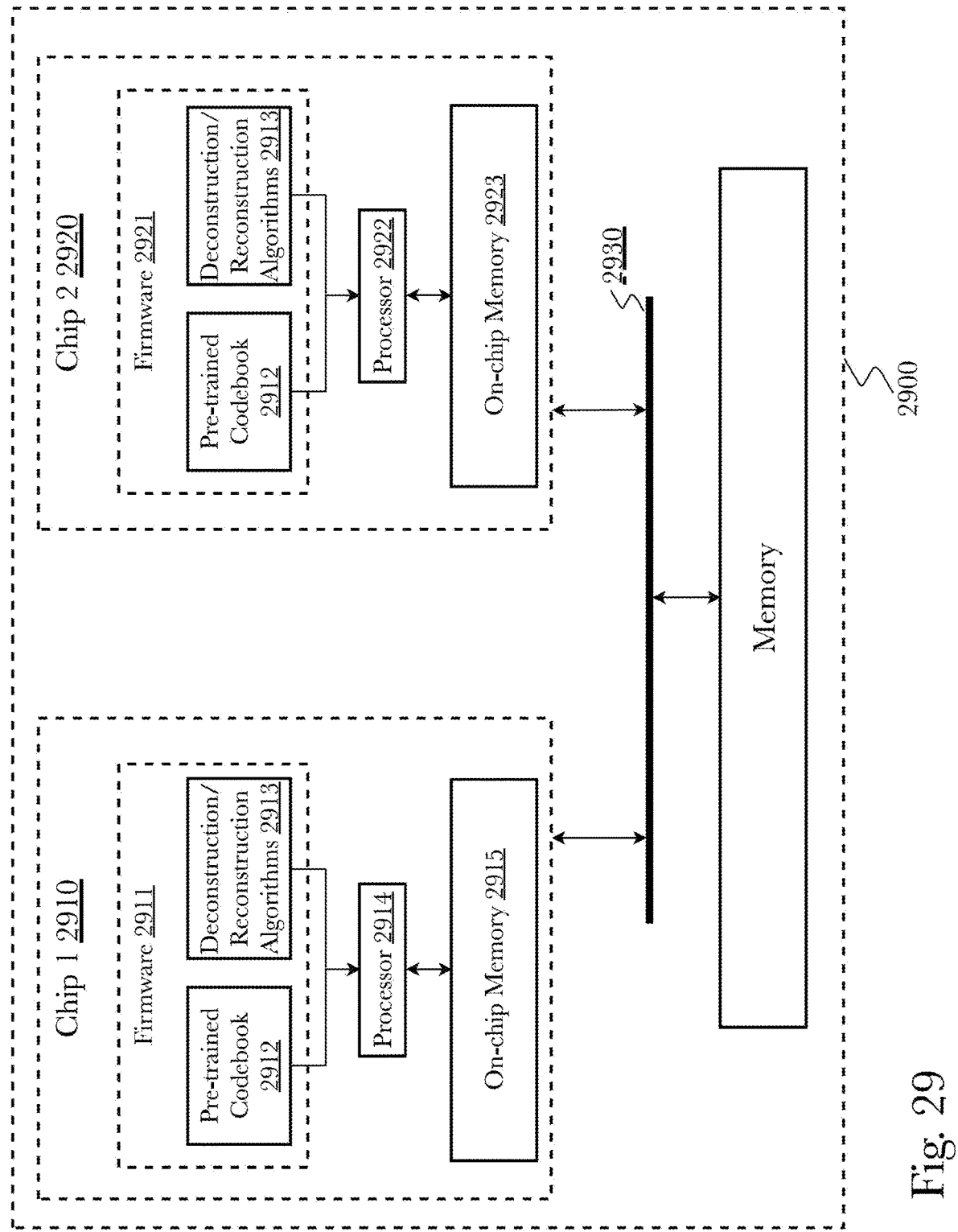
FIG. 29 is a diagram showing an embodiment in which a pre-trained version of the codebook library and associated algorithms would be encoded as firmware on an exemplary multi-chip module included as part of the hardware of a plurality of devices.

FIG. 29 is a diagram showing an embodiment in which a pre-trained version of the codebook library and associated algorithms would be encoded as firmware on an exemplary multi-chip module 2900 included as part of the hardware of a plurality of devices. A multi-chip module is generally designed by putting multiple processor semiconductor die (i.e., chips) inside very small packages. This means that processor-to-processor communication is more expensive than if all processors are on the same die. In order to reduce the cost of chip-to-chip data transportation between processing chips, a pre-trained codebook 2912 and algorithms 2913, which are lightweight code, may be embedded or programmed into firmware 2911, 2921 in a semiconductor. The system works by using training data to identify patterns in data prior to embedding code or programming firmware in a semiconductor. These patterns and their associated, smaller indices, or codewords, are stored in a codebook 2912 that is replicated on both the sending and receiving bus, along with lightweight code comprising the deconstruction and reconstruction algorithms 2913. In processing live data, only codewords, much smaller than the original data, are transferred between buses. If each processor were to encode and compact the data it receives and sends using the system and methods disclosed, then the multi-chip module components would send fewer bits, which may lead to lower power demands, lower interconnect bandwidth/multiplexing requirements, and faster overall transmissions. According to an embodiment, contained on the multi-chip module 2900 for each chip 2910, 2920 would be a firmware area 2911, 2921, on which would be a stored a copy of a pre-trained codebook 2912 and deconstruction/reconstruction algorithms 2913 for processing data. Processors 2914, 2922 would have both inputs and outputs to other hardware on the device. Processors 2914, 2922 would store incoming data for processing on on-chip memory 2915, 2923, process the data using the pre-trained codebook 2912 and deconstruction/reconstruction algorithms 2913, and then send the processed data to other hardware (e.g., another chip via a bus 2930) on the device. Any device equipped with this embodiment would be able to store and transmit data in a highly optimized, bandwidth-efficient format with any other device equipped with this embodiment.

Figure 30:
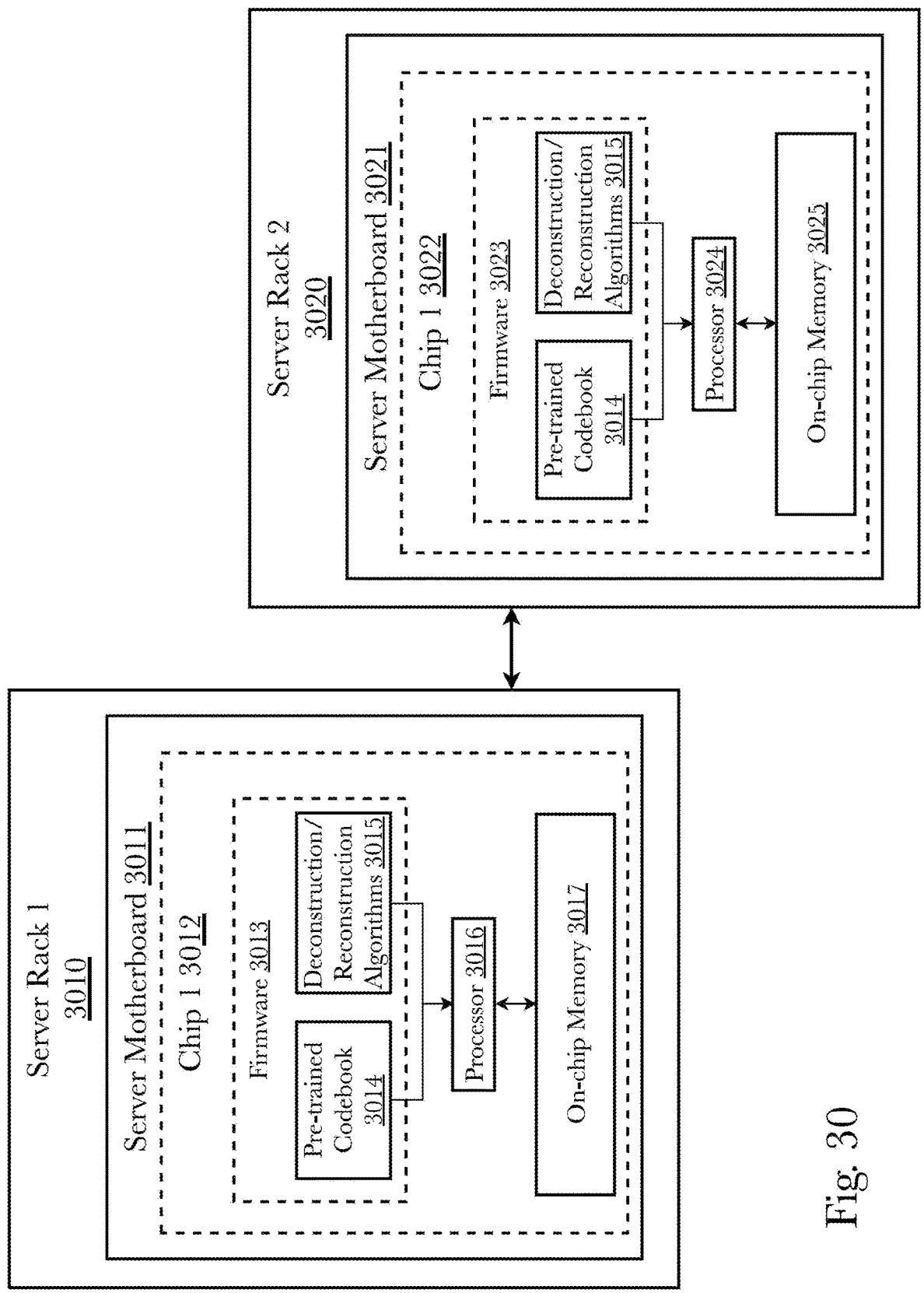
FIG. 30 is a diagram showing an embodiment in which a pre-trained version of the codebook library and associated algorithms would be encoded as firmware on an exemplary server motherboard operating within a server rack.

FIG. 30 is a diagram showing an embodiment in which a pre-trained version of the codebook library and associated algorithms would be encoded as firmware on an exemplary server motherboard 3011, 3021 operating within a server rack 3010, 3020. Enterprises or facilities that handle (e.g., receive, transmit, intercept, obtain, generate, process, etc.) large volumes of data, such as a data center, often utilize one or more servers for processing and routing data and requests. Transporting data between different boards contained within a single server rack, or from one rack to another increases the resources and cost of moving bits between the processors housed in the boards. In order to reduce the cost of intra-data center data transportation between board-to-board or rack-to-rack, a pre-trained codebook 3014 and algorithms 3015, which are lightweight code, may be embedded or programmed into firmware 3013, 3023 in a semiconductor located on the server motherboards 3011, 3021. The system works by using training data to identify patterns in data prior to embedding code or programming firmware in a semiconductor. These patterns and their associated, smaller indices, or codewords, are stored in a codebook 3014 that is replicated on both the sending and receiving bus, along with lightweight code comprising the deconstruction and reconstruction algorithms 3015. In processing live data, only codewords, much smaller than the original data, are transferred between buses. If each processor were to encode and compact the data it receives and sends using the system and methods disclosed, then the server components would send fewer bits, which may lead to lower power demands, lower interconnect bandwidth/multiplexing requirements, and faster overall transmissions.

According to an embodiment, contained on a server motherboard 3011, 3021 for each chip 3012, 3022 would be a firmware area 3013, 3023, on which would be a stored a copy of a pre-trained codebook 3014 and deconstruction/reconstruction algorithms 3015 for processing data. Processors 3016, 3024 would have both inputs and outputs to other hardware on the board 3011. Processors 3016, 3024 would store incoming data for processing on on-chip memory 3017, 3025, process the data using the pre-trained codebook 3014 and deconstruction/reconstruction algorithms 3015, and then send the processed data to other hardware (e.g., another chip on board, another board in rack, another rack). Any device equipped with this embodiment would be able to store and transmit data in a highly optimized, bandwidth-efficient format with any other device equipped with this embodiment.

Figure 32:
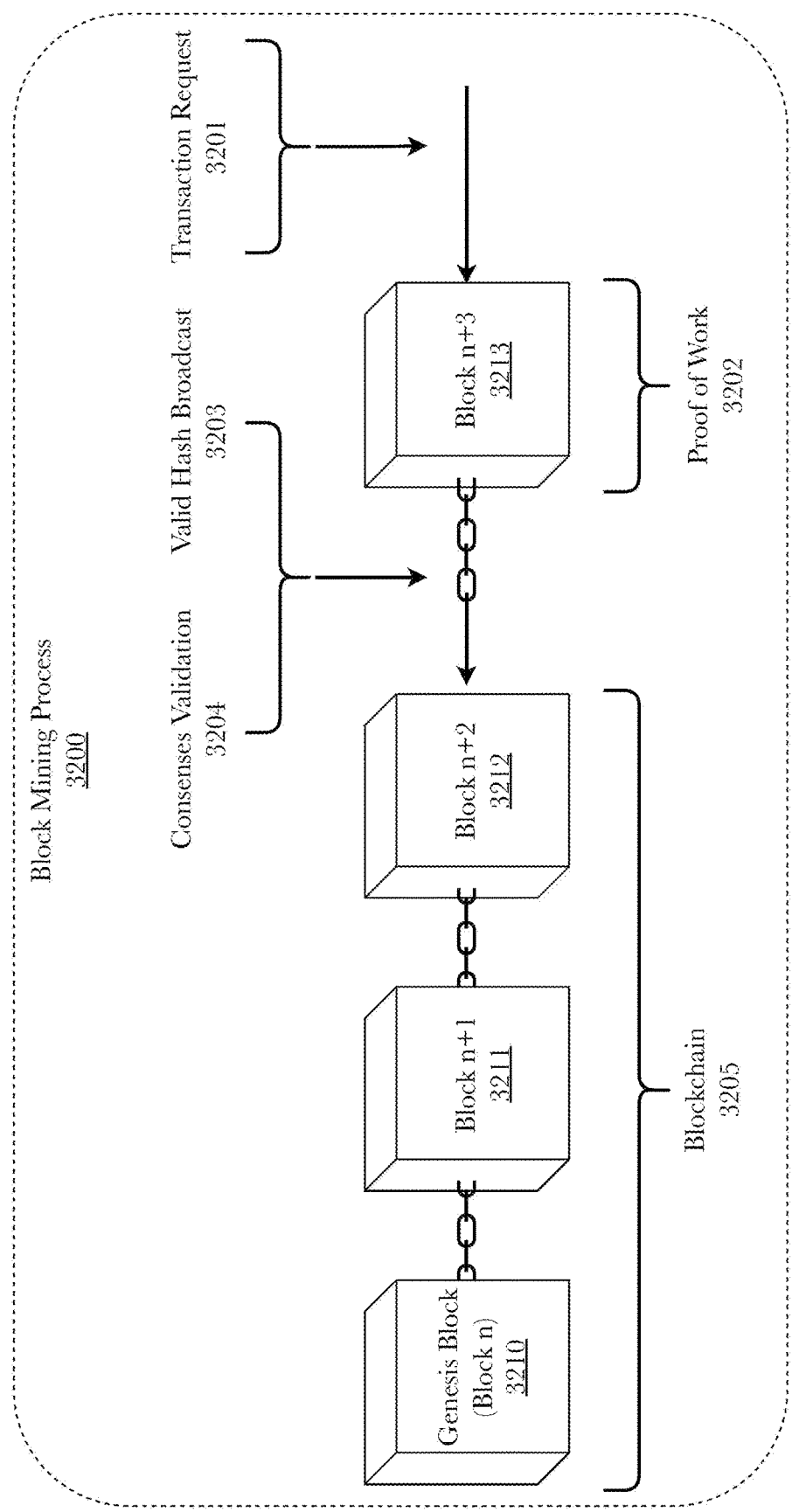
FIG. 32 (PRIOR ART) is a block diagram illustrating blockchain technology and the block mining process.

FIG. 32 (PRIOR ART) is a block diagram illustrating blockchain technology and the block mining process 3200. A blockchain 3205 is a distributed and immutable public ledger with blocks of transactions (smart contracts, etc.) 3210-3213. Adding entries into the ledger 3205 comprises forming a transaction agreement 3201 that is sent out to a peer-to-peer network of mining rigs, i.e., nodes on a network, that each work within the boundaries of a proof system (e.g., proof-of-work 3202 in the case of Bitcoin) to perform verification of the transaction. Each step in the mining process 3200 may make use of processes spanning three categories: sending, computing, and maintaining.

Sending blockchain data to the other nodes happens at least when a request is sent to verify a pending transaction 3201 by one node. Another instance is announcing the verification 3203 of a new block 3213 comprising transactions, i.e., finding the hash algorithm. Yet another instance of network transmissions is announcing the validation of the verification 3204 by a different node in the consensus pool. And yet another example is requesting a copy or stream of a blockchain 3205.

Computing processes happen when executing the computations set forth by the proof system 3202. For example, in the case of a proof-of-work system, each node is racing to guess the hash value of the new block 3213. When a node has the algorithm for the new block 3213, the algorithm is broadcast to the network where it is verified by the other nodes on the network 3204 in yet another computation step.

Nodes may maintain a full or partial copy of a blockchain 3205. Some nodes exist solely to store the blockchain 3205 for mining rigs to request. Some blockchains reduce their storage footprint by pruning the blockchain, but all blockchains still require an ever-growing need for more storage space. Some proof systems, e.g., proof-of-capacity, require large storage capacities as part of their blockchain verification.

The following embodiments contained in the figures below present systems and methods for compacting data in each of the blockchain processes 3200 of sending, computing, and maintaining.

Figure 33:
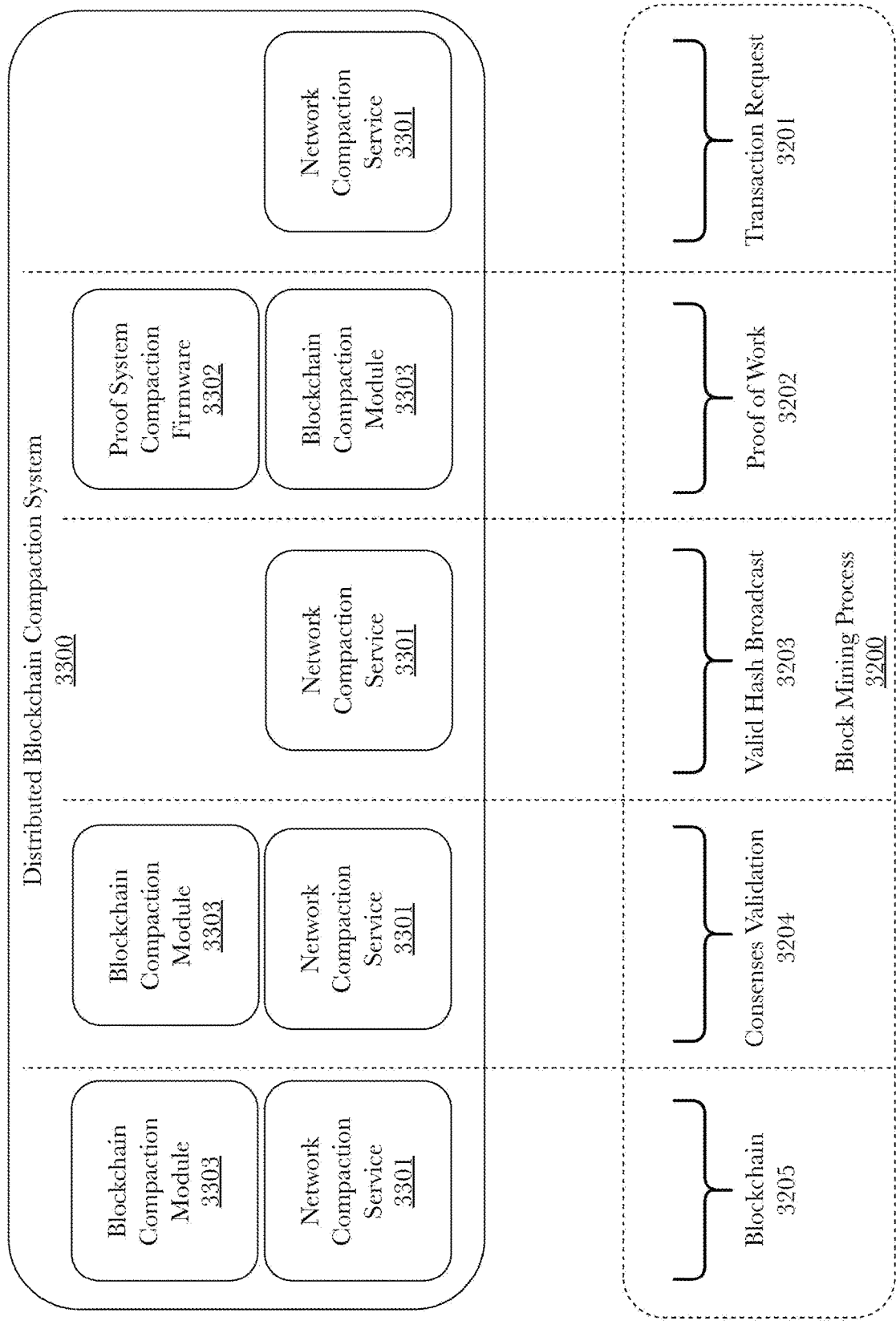
FIG. 33 is a block diagram illustrating an exemplary distributed blockchain data compaction system in reference to the blockchain mining process.

FIG. 33 is a block diagram illustrating an exemplary distributed blockchain data compaction system 3300 in reference to the blockchain mining process 3200. The system comprises three components: a network compaction service 3301, a proof system compaction firmware 3302, and a blockchain compaction module 3303.

A network compaction service 3301 may be used during any transmission 3201/3203/3204/3205 of blockchain data between the nodes on the blockchain network and resides on each node. According to some embodiments, a network compaction service 3301 may compact all network transmissions even data packets not related to blockchain. Thus the present embodiments herein also provide a system and method for a more efficient network transmission protocol.

A proof system compaction firmware 3302 resides on each core in every multi-core processer of a mining rig in the network, whether it be a CPU or GPU, according to a preferred embodiment. Although it is not required to be on every mining rig because most proof systems require each node to work in isolation from other nodes—unless they are part of a pool. Thus, it is beneficial for mining rigs to have the proof system compaction firmware 3302 because mining rigs who forgo the firmware 3302 will be slower to verify new blocks. A proof system compaction firmware 3302 compacts information between the cores thus increasing the computational speed of the multi-core processor. A proof system compaction firmware 3302 also compacts information from chip to chip and node to node.

A blockchain compaction module 3303 may exist in at least three forms: a storage container for the blockchain; a layer on top of an existing blockchain, i.e., a fork; or implemented at the start of a new blockchain/crypto protocol. In the storage container case, existing blockchains can be stored in a compacted form thus requiring less storage space. A more integrated and enforceable embodiment is a fork of an existing blockchain, whereby the data compaction of the blockchain is integrated into the protocol. Lastly, a new protocol may be developed to integrate data compaction from the genesis block, i.e., the beginning of the blockchain.

The embodiments concerning blockchain data compaction at any step—sending, computation, and maintaining—may make use of any combination of the above features. Not all embodiments use data compaction in each step, but a person having ordinary skill in the art will appreciate that the systems and methods herein may be implemented using any combination of data compaction regarding sending, computing, and maintaining a blockchain.

One or more of the three components 3301-3303 may make use of the locally operating aspects from the various embodiments within FIG. 1 and supporting details found in FIGS. 2-4 and FIGS. 7-11. One or more of the three components 3301-3303 may make use of the remote transmission of codewords found in embodiments of FIG. 5 and the data transmission aspects found in FIG. 12 with supporting FIGS. 13-18. One or more of the three components 3301-3303 may make use of the embedded firmware aspects of embodiments found in FIG. 6 and FIGS. 22-31. One or more of the three components 3301-3303 may make use of the security features of embodiments found in FIGS. 19-21.

Figure 34:
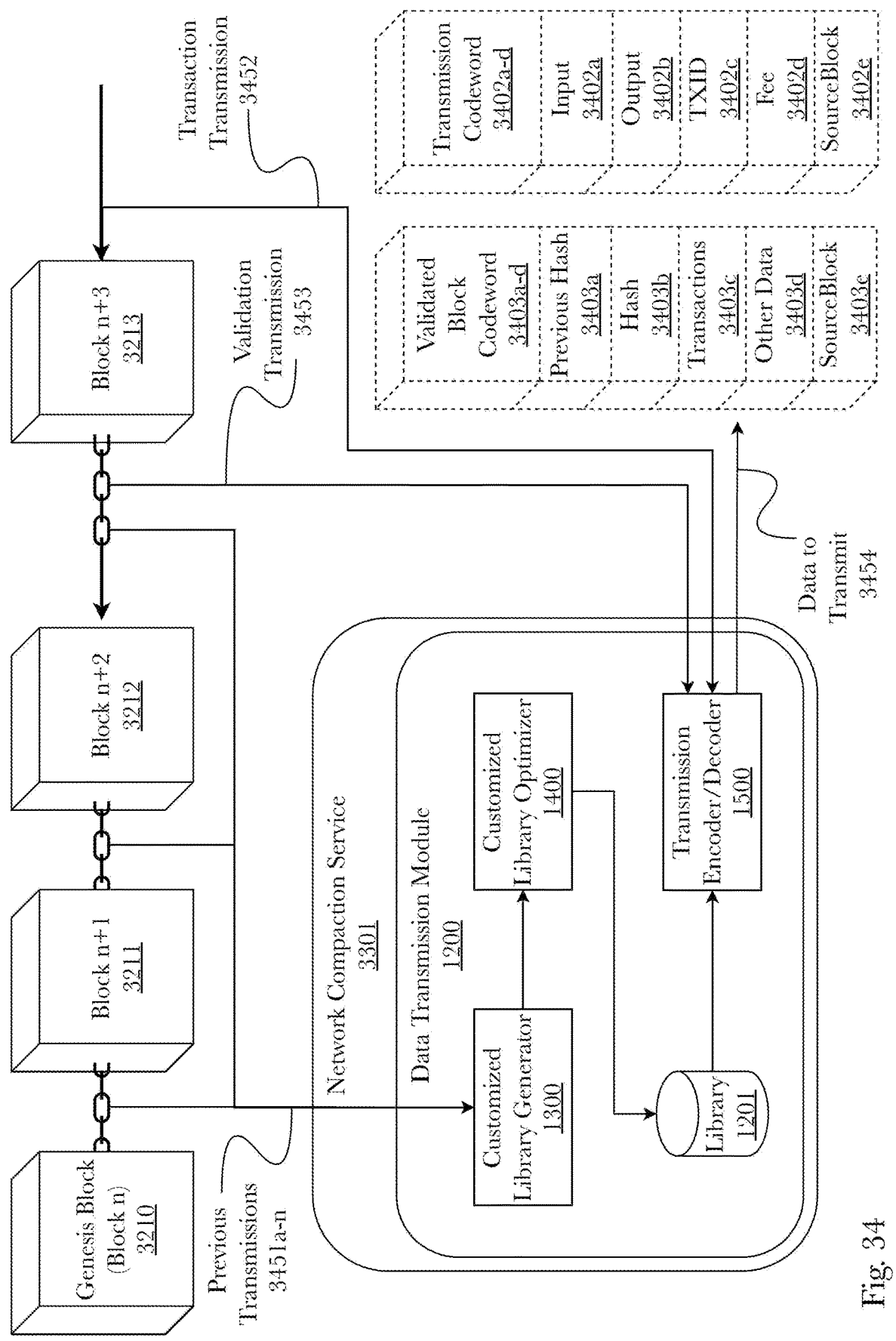
FIG. 34 is a block diagram illustrating an exemplary network compaction service for sending compacted data transmissions throughout a blockchain's peer-to-peer network.

FIG. 34 is a block diagram illustrating an exemplary network compaction service 3301 for sending compacted data transmissions throughout a blockchain's peer-to-peer network. Incoming training data in the form of previous blockchain data packets 3451*a-n* may be received at a customized library generator 1300 that processes the blockchain data packets to produce a customized word library 1201 comprising key-value pairs of data words (each comprising a string of bits) and their corresponding codewords. The resultant word library 1201 may then be processed by a library optimizer 1400 to reduce size and improve efficiency, for example by pruning low-occurrence data entries or calculating approximate codewords that may be used to match more than one data word. A transmission encoder/decoder 1500 may be used to receive incoming data 3452/3453 intended for storage or transmission 3454, process the data using a word library 1201 to retrieve codewords for the words in the incoming data, and then append the codewords (rather than the original data) to an outbound data stream. Each of these components is described in greater detail above, illustrating the particulars of their respective processing and other functions, referring to FIGS. 2-4.

Two exemplary transmissions are a transaction transmission 3452 and a validation transmission 3453. A transaction transmission 3452 happens when a pending transaction is broadcast to the network in order for nodes to validate the transaction in a new block 3213. The transmission transaction not yet in a block itself, comprises a transmission codeword 3402*a-d* and if needed, a sourceblock 3402*e* (in the case of new key-value pair). A validation transmission 3453 may be either the first node to verify the new block 3213 sending the derived hash from the proof of work to other nodes to validate the hash, or another of the network nodes broadcasting that the node has verified the hash sent from the first node. This codeword 3403*a-d* comprising the new block 3213, and a sourceblock 3403*e*—if necessary.

Figure 35:
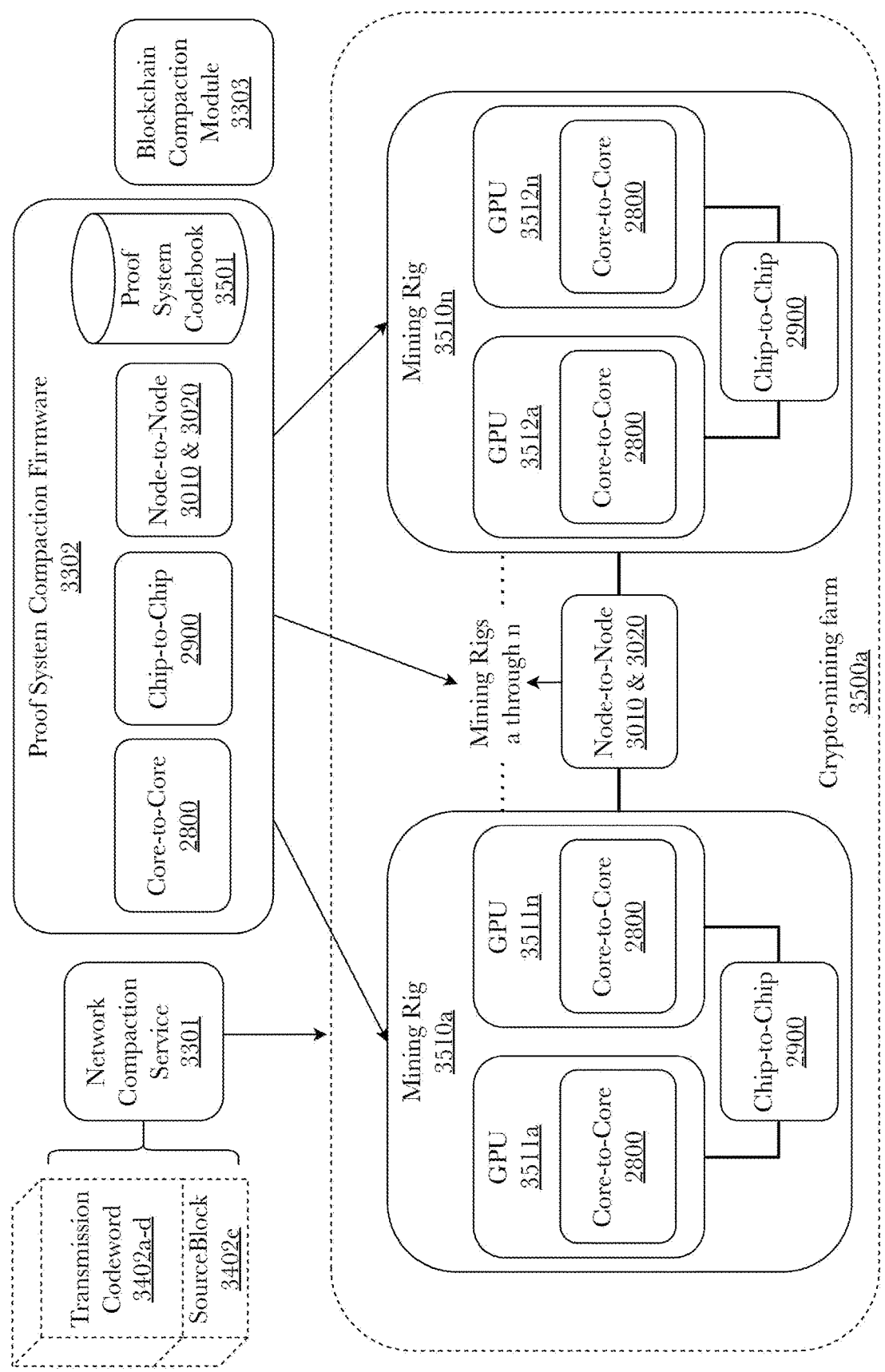
FIG. 35 is a block diagram illustrating an exemplary proof system compaction firmware embedded into the multi-core processors of a blockchain's consensus pool mining rigs.

FIG. 35 is a block diagram illustrating an exemplary proof system compaction firmware 3302 embedded into the multi-core processors of a blockchain's consensus pool mining rigs. This diagram also illustrates the process of mining a new block for a blockchain. Crypto-mining farms 3500*a* may scale from the smallest of mining operations—e.g., a sole computer at someone's home 3510*a*—to a large scale operation—a warehouse of hundreds or thousands of interconnected and pooled mining rigs 3510*a-n*. In this example, the mining rigs 3510*a-n* have a multi-core CPU or GPU 3511*a-n*/3512*a-n*, at least one being used to mine a blockchain, and the data compaction firmware 3302 is installed/embedded into the CPUs/GPUs to more expeditiously solve for the new block hash, as is the case in a proof-of-work system.

In the case of a large scale operation, there may be stacks of mining rigs 3510*a-n*, each mining rig comprising multiple CPUs or GPUs 3511*a-n*/3512*a-n*, and where each mining rig 3510*a-n* is set up to mine one block, together as a pool. Thus, the core-to-core compaction firmware 2800 may be used within each CPU/GPU.

The chip-to-chip aspect 2900 may be used between each CPU/GPU within a mining rig. The system works by using training data to identify patterns in data prior to embedding code or programming firmware in a semiconductor. These patterns and their associated, smaller indices, or codewords, are stored in a codebook that is replicated on both the sending and receiving bus, along with lightweight code comprising the deconstruction and reconstruction algorithms. In processing live data, only codewords, much smaller than the original data, are transferred between buses. If each processor were to encode and compact the data it receives and sends using the system and methods disclosed, then the multi-chip module components would send fewer bits, which may lead to lower power demands, lower interconnect bandwidth/multiplexing requirements, and faster overall transmissions.

The node-to-node aspect 3010/3020 enables the multi-rig pool to transfer compacted information. In order to reduce the cost of intra-rig data transportation between rig-to-rig, a pre-trained codebook and algorithms, which are lightweight code, may be embedded or programmed into firmware in a semiconductor located on the mining rig motherboards.

These three firmware aspects 2800, 2900, 3010, 3020 allows data compaction throughout the entire data flow process of blockchain mining on a small or large scale.

According to one aspect, the data relating to the mining of a new block may employ a single proof system codebook 3501 that is applicable to each data transfer 2800, 2900, 3010, 3020. If mining rigs pooled together utilize internet protocols (IP) for data transfer, such as a disperse mining pool, than a network compaction service 3301 may work in tandem to compact the IP header data, which may have other key-value pairs not present in the firmware reference codebook. It should be noted that a network compaction service 3301 may typically decide the transmission codeword 3402*a-d* before it is received by the proof system compaction firmware 3302. When a new block hash is found, a blockchain compaction module 3303 may encode—i.e., compact—the new block into the blockchain format (i.e., the blockchain reference codebook).

Figure 36:
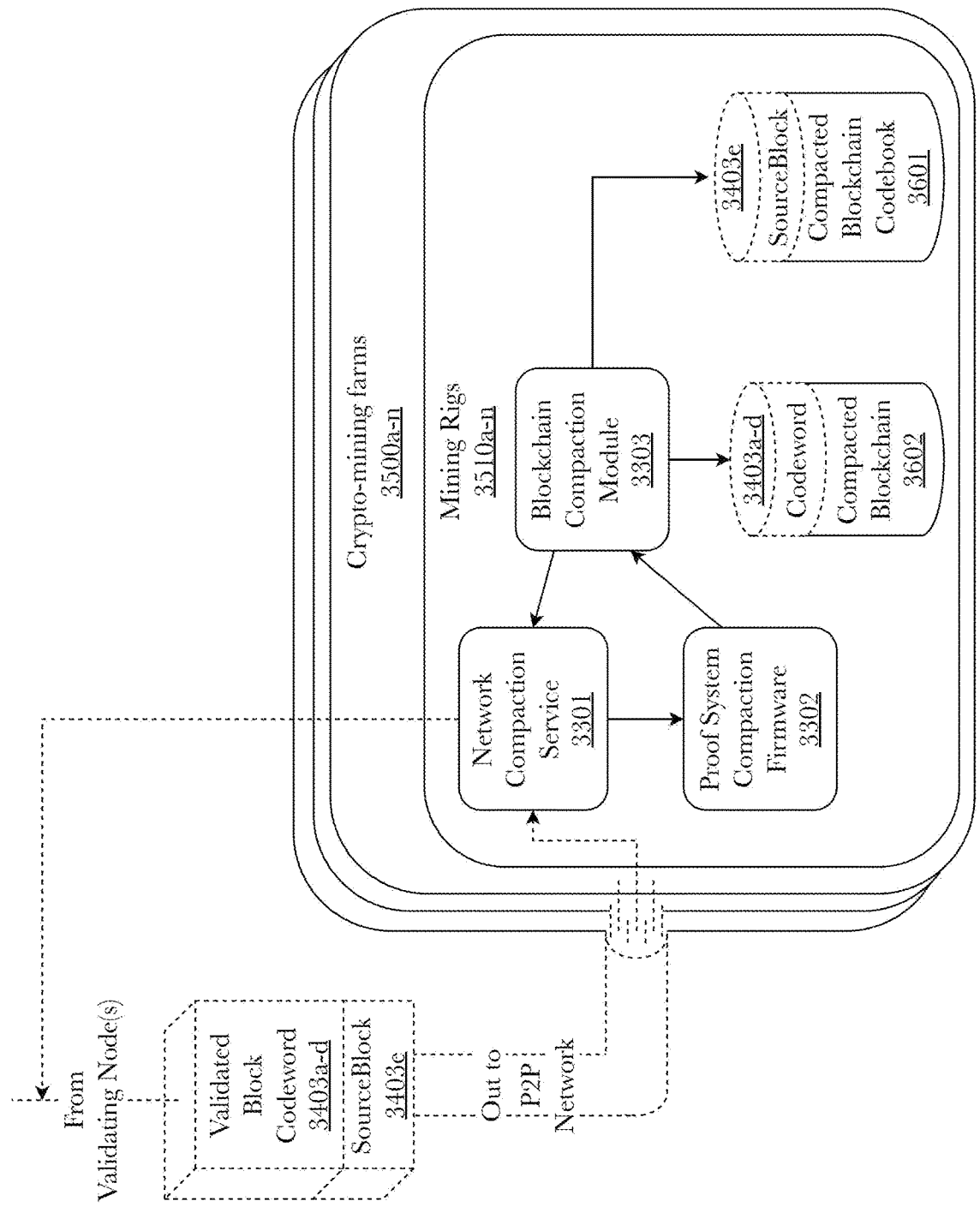
FIG. 36 is a block diagram illustrating an exemplary system implementation and process for validating blocks on a blockchain peer-to-peer network.

FIG. 36 is a block diagram illustrating an exemplary system implementation and process for validating blocks on a blockchain peer-to-peer network. After a new block is validated by a node, the validating node sends a validated block codeword 3403*a-d*—and sourceblock 3403*e* if necessary—to the other nodes of the network 35000*a-n*. The network compaction service 3301 decodes the validated block codeword 3403*a-d, e*, and the reconstructed blockchain block is validated by other nodes—using proof compaction firmware 3302, if available. Nodes need not have proof compaction firmware 3302 because the new block is already reconstructed, however it is preferred that nodes have the firmware 3302 to expedite the process of validation. If valid, that node also adds the block to its blockchain—preferably stored as a compacted blockchain 3602 with reference codebook 3601. That node then sends the validation results back out to the network. Of note, it is common practice users of blockchain-based technologies to allow time from transaction request to validation from the consensus pool that way it is certain that the transaction is legitimate. For example, Bitcoin recommends that at least ten nodes verify the block containing a user's transaction before the user completes the trade of goods or services relating to that transaction. This time-to-wait is now reduced thanks to the systems and methods provide herein.

Additionally, and according to some embodiments, there may be three separate codebooks. One for LAN/WAN network transmission 1201, one for inter-core/chip/node 3501, and one for the actual blockchain 3601. It is anticipated however that one or more of the preceding reference codebooks may be combined into one or two reference codebooks.

Figure 37:
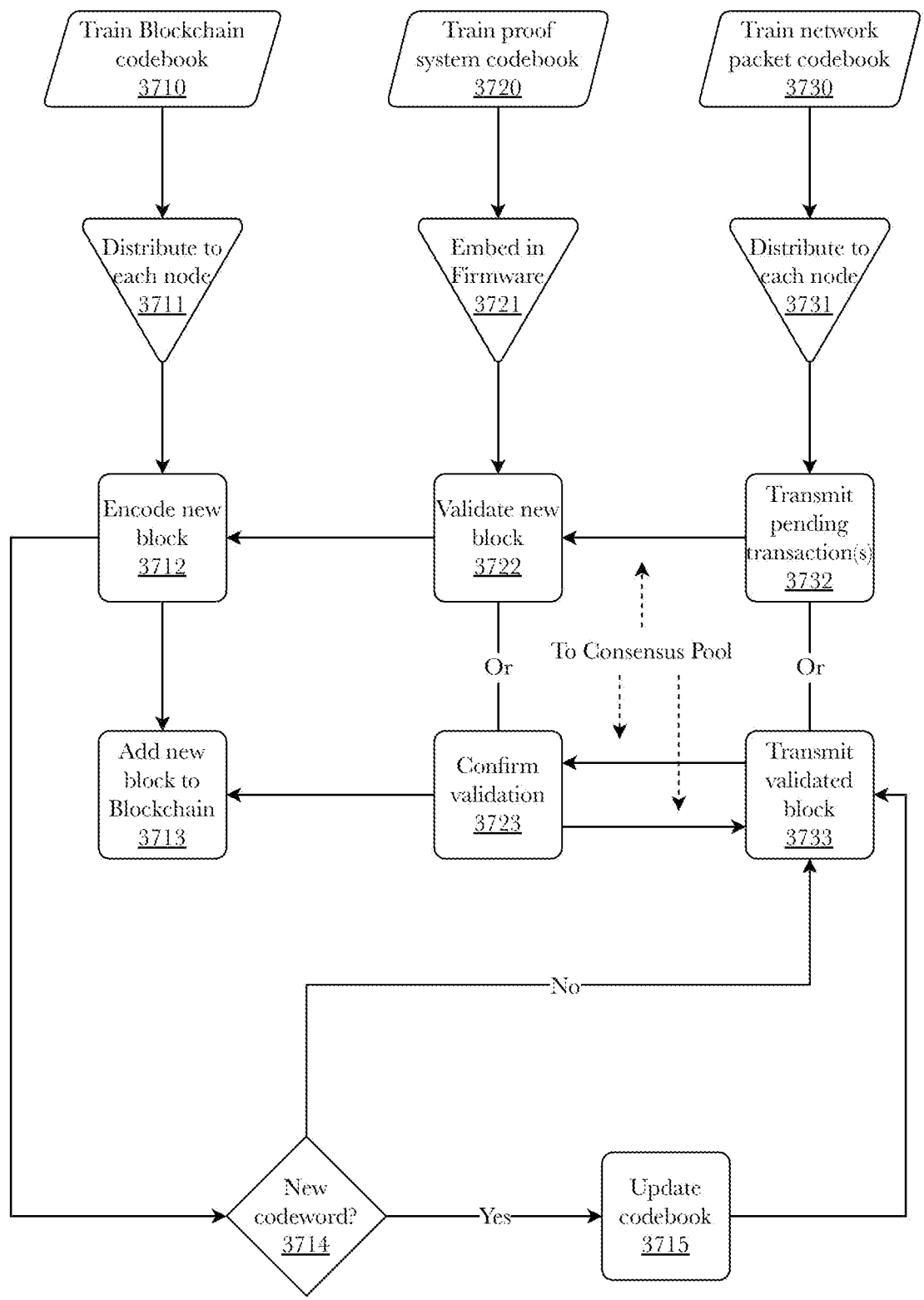
FIG. 37 is a flow diagram illustrating an exemplary method for compacting blockchains and blockchain related data on mining rigs and across the peer-to-peer network.

FIG. 37 is a flow diagram illustrating an exemplary method for compacting blockchains and blockchain related data on mining rigs and across the peer-to-peer network. According to one embodiment, a series of first steps for the method for blockchain data compaction comprises the steps of training a codebook for a blockchain 3710, a proof system 3720, and for network transmission 3730. Codebooks may be pretrained using training data or existing blockchain data either before the implementation of a new blockchain/crypto protocol or on an existing blockchain/crypto protocol.

In a series of second steps, deploy the system components comprising the codebooks and supporting elements to the appropriate location 3711/3731/3721. More specifically, distributing the network compaction service and codebook to each node 3731 and using it comprises the steps of storing the network packet reference codebook, referred to also as a first reference codebook, in the memory of a blockchain computing node that is communicatively coupled to a plurality of other blockchain computing nodes, each blockchain computing node comprising a memory and at least one multi-core processor. The network of blockchain computing nodes creating a consensus pool for the blockchain.

Also store a first deconstruction algorithm in the memory of each of the blockchain computing nodes. The first deconstruction algorithm configured to receive network data intended for the consensus pool 3732/3733; deconstruct the network data intended for the consensus pool into a plurality of sourceblocks; encode the first plurality of sourceblocks into a first codeword using the first reference codebook; and send the first codeword to the consensus pool.

Nodes receiving the first codeword may use a first reconstruction algorithm stored in the memory of each of the blockchain computing nodes that causes the nodes to receive the first codeword and reconstruct the network data by decoding the first plurality of sourceblocks using the first reference codebook.

Distributing and executing the compacted blockchain and codebook 3711 comprises the steps of storing a second reference codebook—a proof system codebook—in the memory of each of the blockchain computing nodes, the second reference codebook pretrained by machine learning to determine sourceblocks and associated codewords of the blockchain 3710. Additionally, store a second deconstruction and second reconstruction algorithm in the memory of each of the blockchain computing nodes.

The first deconstruction algorithm receives a blockchain block 3722/3723; deconstructs the blockchain block into a second plurality of sourceblocks; encodes the second plurality of sourceblocks into a second codeword using the second reference codebook 3712; and appends the second codeword to a compacted blockchain 3713. The compacted blockchain comprises codewords for each block on the blockchain. To reconstruct the blockchain blocks, the second reconstruction algorithm reconstructs the blockchain block by decoding the second plurality of sourceblocks using the second reference codebook. The compacted blockchain and the blockchain codebook allow for less data to be sent over the network when transferring parts of or an entire blockchain.

The embedding of a proof system compaction firmware 3721 and the use thereof comprises the steps of storing a third reference codebook—a proof system codebook—embedded as firmware in the memory of each core in each of the multi-core processors of the mining rigs on the network. The third reference codebook pretrained by machine learning to determine sourceblocks and to associate codewords to each sourceblock 3720.

A third deconstruction algorithm when operating on each core causes the multi-core processors to receive data intended for a different core 3722/3723; deconstruct the data intended for a different core into a third plurality of sourceblocks; encode the third plurality of sourceblocks into a third codeword using the third reference codebook; and send the third codeword to the intended core.

Additionally, also store a third reconstruction algorithm embedded as firmware in the memory of each core in each of the multi-core processors. The third reconstruction algorithm is configured to receive the third codeword at the intended core and reconstruct the data intended for a different core by decoding the third plurality of sourceblocks using the third reference codebook.

According to one aspect, when the deconstruction of the various data generates a sourceblock and association not in the associated reference codebook 3714, update the appropriate reference codebook 3715.

Detailed Description of Exemplary Aspects

Since the library consists of re-usable building sourceblocks, and the actual data is represented by reference codes to the library, the total storage space of a single set of data would be much smaller than conventional methods, wherein the data is stored in its entirety. The more data sets that are stored, the larger the library becomes, and the more data can be stored in reference code form.

As an analogy, imagine each data set as a collection of printed books that are only occasionally accessed. The amount of physical shelf space required to store many collections would be quite large, and is analogous to conventional methods of storing every single bit of data in every data set. Consider, however, storing all common elements within and across books in a single library, and storing the books as references codes to those common elements in that library. As a single book is added to the library, it will contain many repetitions of words and phrases. Instead of storing the whole words and phrases, they are added to a library, and given a reference code, and stored as reference codes. At this scale, some space savings may be achieved, but the reference codes will be on the order of the same size as the words themselves. As more books are added to the library, larger phrases, quotations, and other words patterns will become common among the books. The larger the word patterns, the smaller the reference codes will be in relation to them as not all possible word patterns will be used. As entire collections of books are added to the library, sentences, paragraphs, pages, or even whole books will become repetitive. There may be many duplicates of books within a collection and across multiple collections, many references and quotations from one book to another, and much common phraseology within books on particular subjects. If each unique page of a book is stored only once in a common library and given a reference code, then a book of 1,000 pages or more could be stored on a few printed pages as a string of codes referencing the proper full-sized pages in the common library. The physical space taken up by the books would be dramatically reduced. The more collections that are added, the greater the likelihood that phrases, paragraphs, pages, or entire books will already be in the library, and the more information in each collection of books can be stored in reference form. Accessing entire collections of books is then limited not by physical shelf space, but by the ability to reprint and recycle the books as needed for use.

The projected increase in storage capacity using the method herein described is primarily dependent on two factors: 1) the ratio of the number of bits in a block to the number of bits in the reference code, and 2) the amount of repetition in data being stored by the system.

With respect to the first factor, the number of bits used in the reference codes to the sourceblocks must be smaller than the number of bits in the sourceblocks themselves in order for any additional data storage capacity to be obtained. As a simple example, 16-bit sourceblocks would require $2^{16}$, or 65,536, unique reference codes to represent all possible patterns of bits. If all possible 65,536 blocks patterns are utilized, then the reference code itself would also need to contain sixteen bits in order to refer to all possible 65,536 blocks patterns. In such case, there would be no storage savings. However, if only 16 of those block patterns are utilized, the reference code can be reduced to 4 bits in size, representing an effective compression of 4 times (16 bits/4 bits=4) versus conventional storage. Using a typical block size of 512 bytes, or 4,096 bits, the number of possible block patterns is $2^{4,096}$, which for all practical purposes is unlimited. A typical hard drive contains one terabyte (TB) of physical storage capacity, which represents 1,953,125,000, or roughly $2^{31}$, 512 byte blocks. Assuming that 1 TB of unique 512-byte sourceblocks were contained in the library, and that the reference code would thus need to be 31 bits long, the effective compression ratio for stored data would be on the order of 132 times (4,096/31≈132) that of conventional storage.

With respect to the second factor, in most cases it could be assumed that there would be sufficient repetition within a data set such that, when the data set is broken down into sourceblocks, its size within the library would be smaller than the original data. However, it is conceivable that the initial copy of a data set could require somewhat more storage space than the data stored in a conventional manner, if all or nearly all sourceblocks in that set were unique. For example, assuming that the reference codes are $\frac{1}{10}^{th}$ the size of a full-sized copy, the first copy stored as sourceblocks in the library would need to be 1.1 megabytes (MB), (1 MB for the complete set of full-sized sourceblocks in the library and 0.1 MB for the reference codes). However, since the sourceblocks stored in the library are universal, the more duplicate copies of something you save, the greater efficiency versus conventional storage methods. Conventionally, storing 10 copies of the same data requires 10 times the storage space of a single copy. For example, ten copies of a 1 MB file would take up 10 MB of storage space. However, using the method described herein, only a single full-sized copy is stored, and subsequent copies are stored as reference codes. Each additional copy takes up only a fraction of the space of the full-sized copy. For example, again assuming that the reference codes are $\frac{1}{10}^{th}$ the size of the full-size copy, ten copies of a 1 MB file would take up only 2 MB of space (1 MB for the full-sized copy, and 0.1 MB each for ten sets of reference codes). The larger the library, the more likely that part or all of incoming data will duplicate sourceblocks already existing in the library.

The size of the library could be reduced in a manner similar to storage of data. Where sourceblocks differ from each other only by a certain number of bits, instead of storing a new sourceblock that is very similar to one already existing in the library, the new sourceblock could be represented as a reference code to the existing sourceblock, plus information about which bits in the new block differ from the existing block. For example, in the case where 512 byte sourceblocks are being used, if the system receives a new sourceblock that differs by only one bit from a sourceblock already existing in the library, instead of storing a new 512 byte sourceblock, the new sourceblock could be stored as a reference code to the existing sourceblock, plus a reference to the bit that differs. Storing the new sourceblock as a reference code plus changes would require only a few bytes of physical storage space versus the 512 bytes that a full sourceblock would require. The algorithm could be optimized to store new sourceblocks in this reference code plus changes form unless the changes portion is large enough that it is more efficient to store a new, full sourceblock.

It will be understood by one skilled in the art that transfer and synchronization of data would be increased to the same extent as for storage. By transferring or synchronizing reference codes instead of full-sized data, the bandwidth requirements for both types of operations are dramatically reduced.

In addition, the method described herein is inherently a form of encryption. When the data is converted from its full form to reference codes, none of the original data is contained in the reference codes. Without access to the library of sourceblocks, it would be impossible to re-construct any portion of the data from the reference codes. This inherent property of the method described herein could obviate the need for traditional encryption algorithms, thereby offsetting most or all of the computational cost of conversion of data back and forth to reference codes. In theory, the method described herein should not utilize any additional computing power beyond traditional storage using encryption algorithms. Alternatively, the method described herein could be in addition to other encryption algorithms to increase data security even further.

In other embodiments, additional security features could be added, such as: creating a proprietary library of sourceblocks for proprietary networks, physical separation of the reference codes from the library of sourceblocks, storage of the library of sourceblocks on a removable device to enable easy physical separation of the library and reference codes from any network, and incorporation of proprietary sequences of how sourceblocks are read and the data reassembled.

Figure 7:
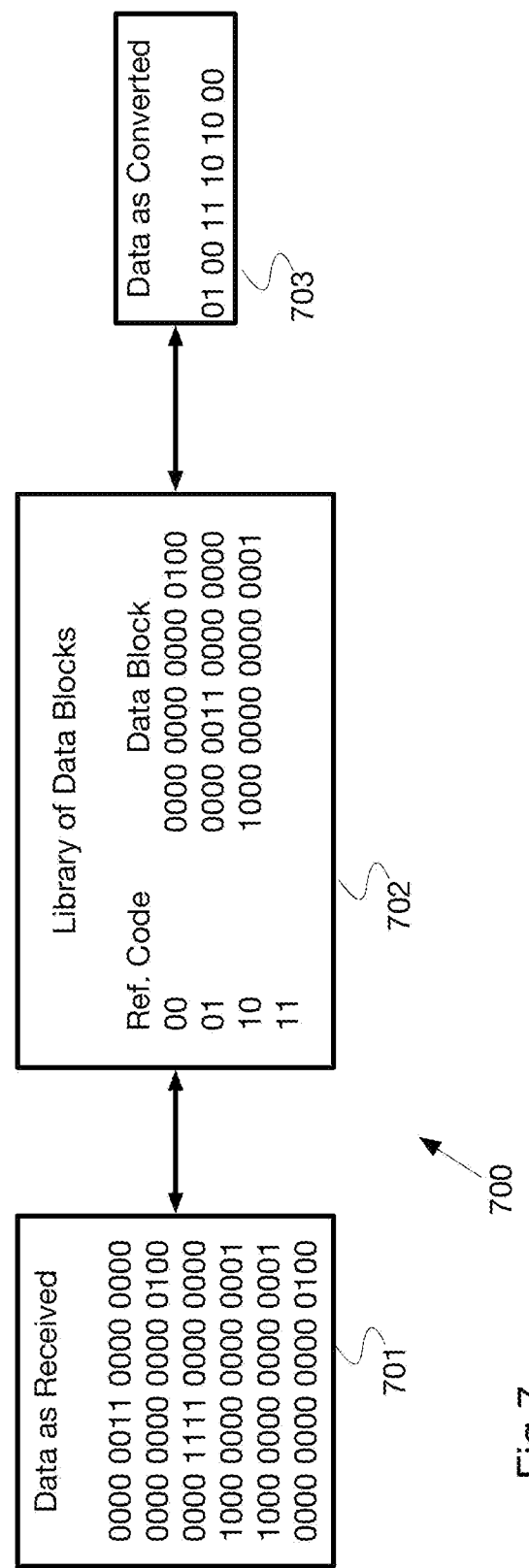
FIG. 7 is a diagram showing an example of how data might be converted into reference codes using an aspect of an embodiment.

FIG. 7 is a diagram showing an example of how data might be converted into reference codes using an aspect of an embodiment 700. As data is received 701, it is read by the processor in sourceblocks of a size dynamically determined by the previously disclosed sourceblock size optimizer 410. In this example, each sourceblock is 16 bits in length, and the library 702 initially contains three sourceblocks with reference codes 00, 01, and 10. The entry for reference code 11 is initially empty. As each 16 bit sourceblock is received, it is compared with the library. If that sourceblock is already contained in the library, it is assigned the corresponding reference code. So, for example, as the first line of data (0000 0011 0000 0000) is received, it is assigned the reference code (01) associated with that sourceblock in the library. If that sourceblock is not already contained in the library, as is the case with the third line of data (0000 1111 0000 0000) received in the example, that sourceblock is added to the library and assigned a reference code, in this case 11. The data is thus converted 703 to a series of reference codes to sourceblocks in the library. The data is stored as a collection of codewords, each of which contains the reference code to a sourceblock and information about the location of the sourceblocks in the data set. Reconstructing the data is performed by reversing the process. Each stored reference code in a data collection is compared with the reference codes in the library, the corresponding sourceblock is read from the library, and the data is reconstructed into its original form.

Figure 8:
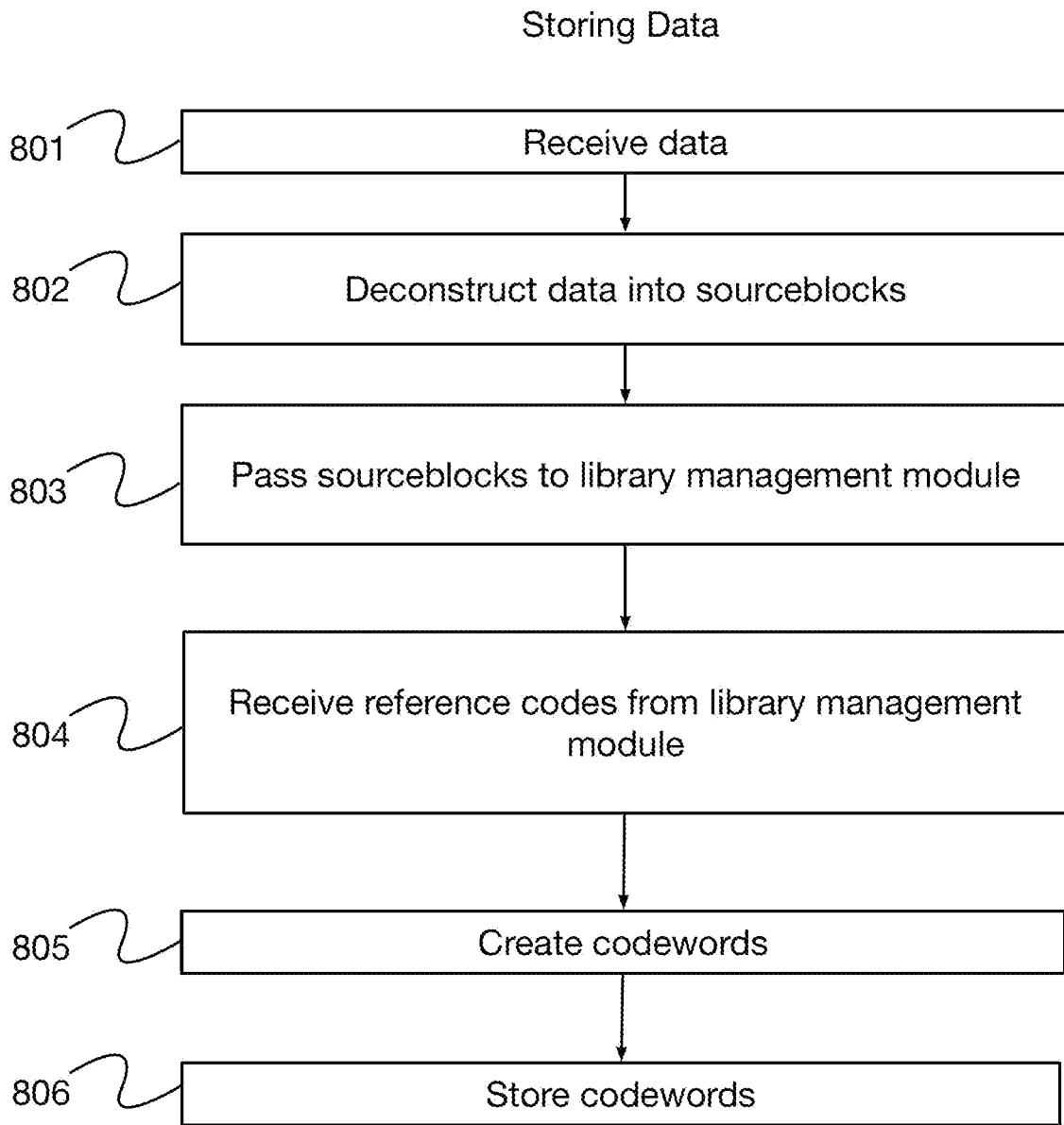
FIG. 8 is a method diagram showing the steps involved in using an embodiment to store data.

FIG. 8 is a method diagram showing the steps involved in using an embodiment 800 to store data. As data is received 801, it would be deconstructed into sourceblocks 802, and passed 803 to the library management module for processing. Reference codes would be received back 804 from the library management module, and could be combined with location information to create codewords 805, which would then be stored 806 as representations of the original data.

Figure 9:
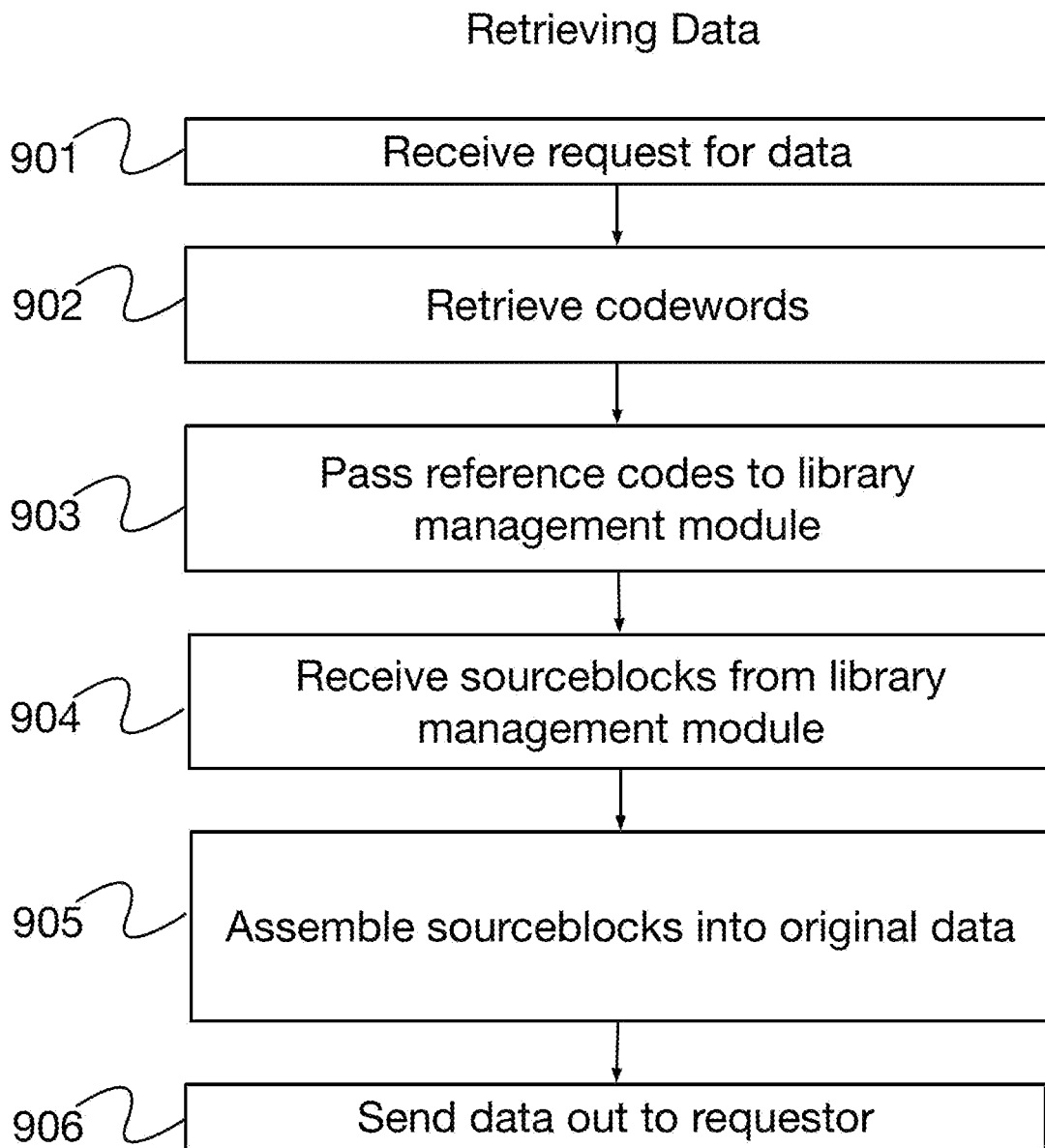
FIG. 9 is a method diagram showing the steps involved in using an embodiment to retrieve data.

FIG. 9 is a method diagram showing the steps involved in using an embodiment 900 to retrieve data. When a request for data is received 901, the associated codewords would be retrieved 902 from the library. The codewords would be passed 903 to the library management module, and the associated sourceblocks would be received back 904. Upon receipt, the sourceblocks would be assembled 905 into the original data using the location data contained in the codewords, and the reconstructed data would be sent out 906 to the requestor.

Figure 10:
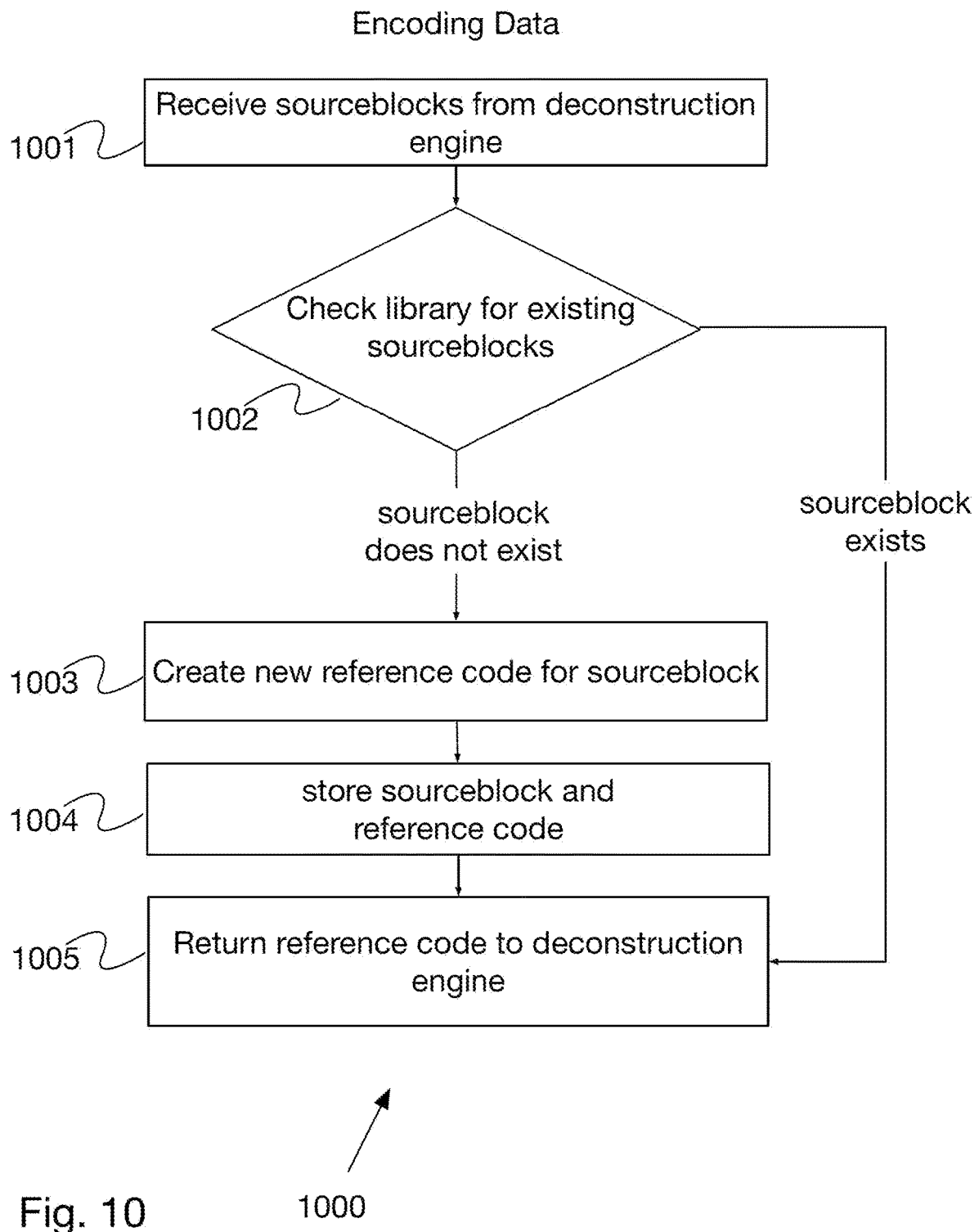
FIG. 10 is a method diagram showing the steps involved in using an embodiment to encode data.

FIG. 10 is a method diagram showing the steps involved in using an embodiment 1000 to encode data. As sourceblocks are received 1001 from the deconstruction engine, they would be compared 1002 with the sourceblocks already contained in the library. If that sourceblock already exists in the library, the associated reference code would be returned 1005 to the deconstruction engine. If the sourceblock does not already exist in the library, a new reference code would be created 1003 for the sourceblock. The new reference code and its associated sourceblock would be stored 1004 in the library, and the reference code would be returned to the deconstruction engine.

Figure 11:
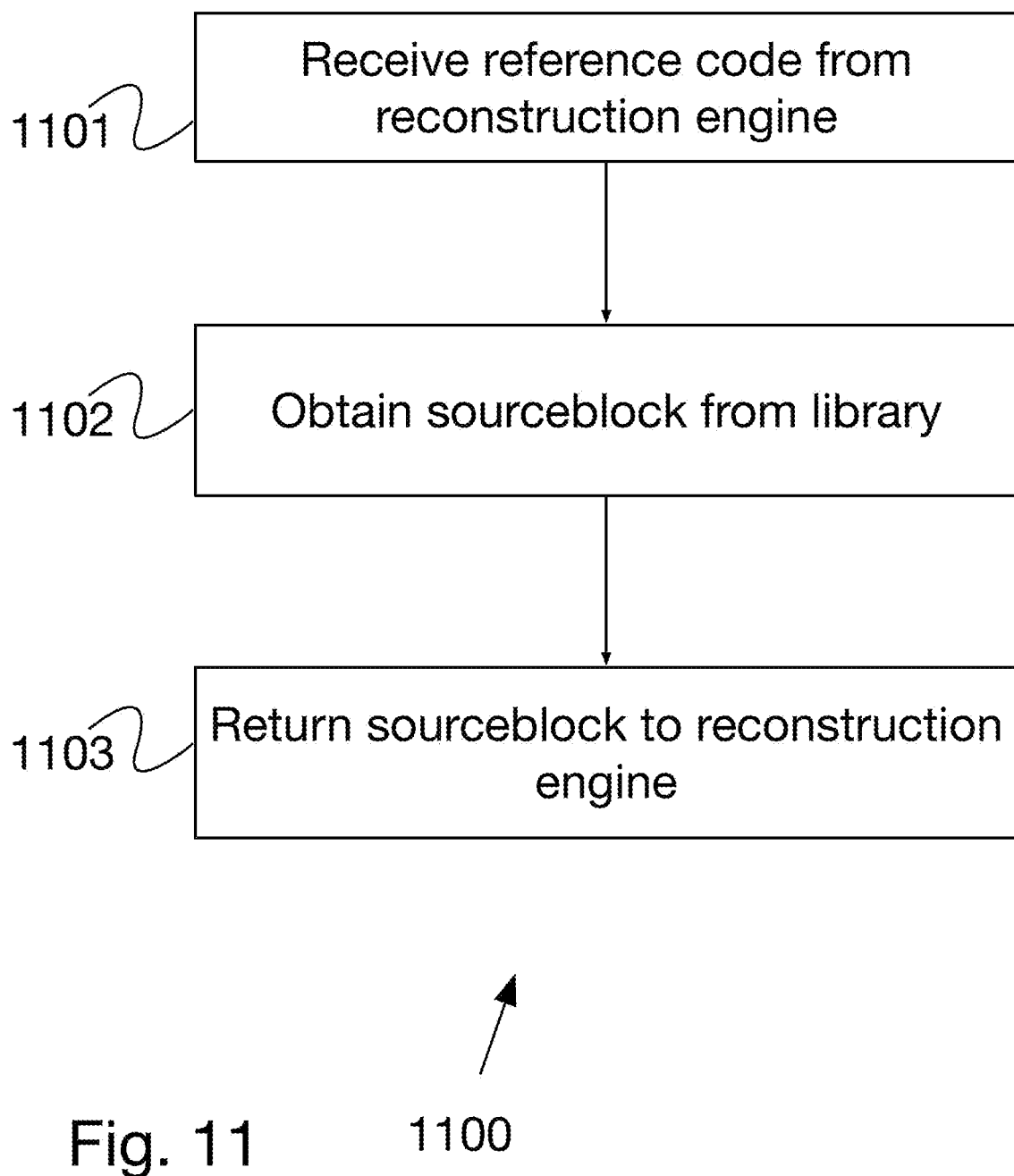
FIG. 11 is a method diagram showing the steps involved in using an embodiment to decode data.

FIG. 11 is a method diagram showing the steps involved in using an embodiment 1100 to decode data. As reference codes are received 1101 from the reconstruction engine, the associated sourceblocks are retrieved 1102 from the library, and returned 1103 to the reconstruction engine.

Figure 16:
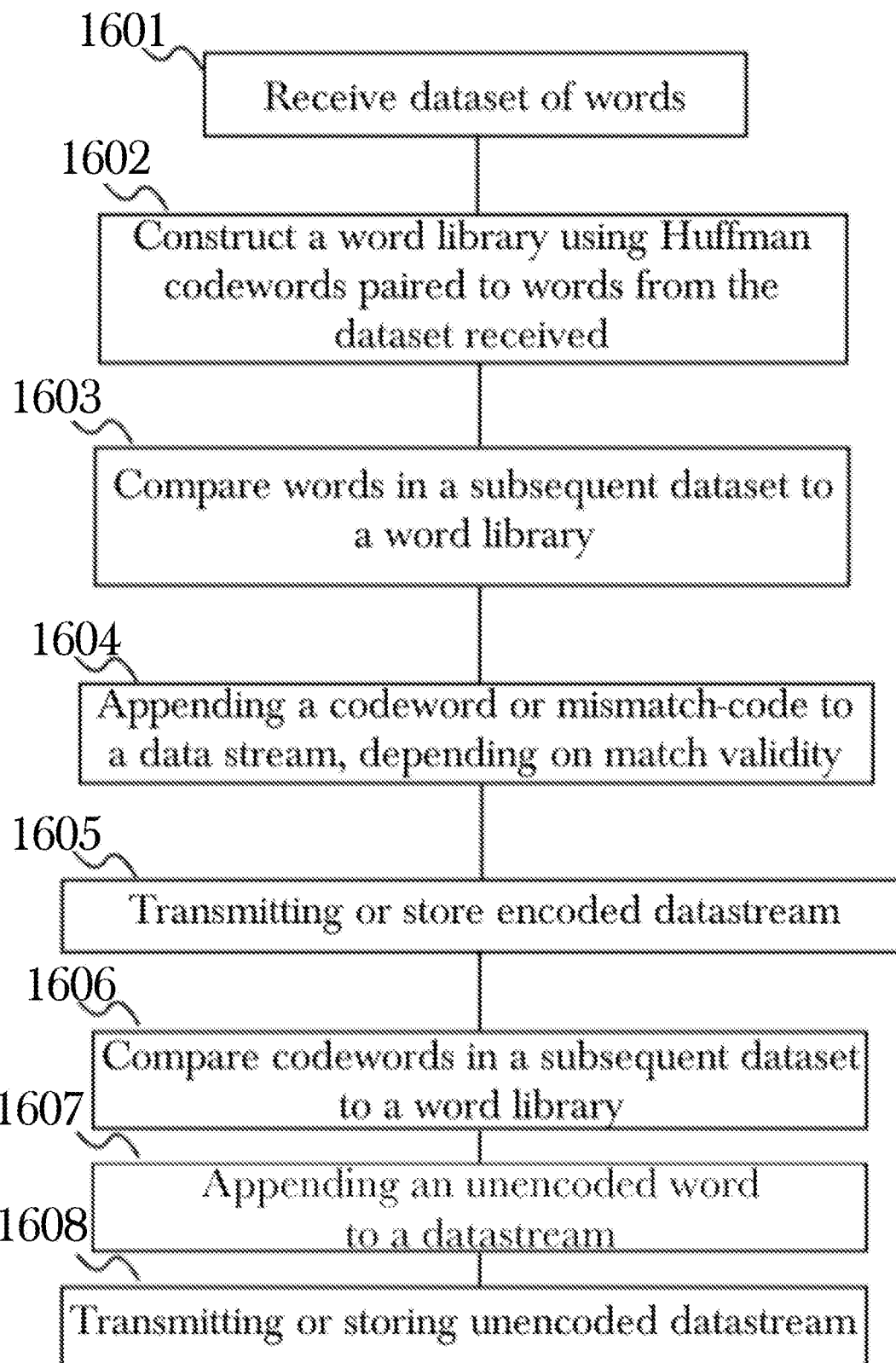
FIG. 16 is a method diagram illustrating key system functionality utilizing an encoder and decoder pair.

FIG. 16 is a method diagram illustrating key system functionality utilizing an encoder and decoder pair, according to a preferred embodiment. In a first step 1601, at least one incoming data set may be received at a customized library generator 1300 that then 1602 processes data to produce a customized word library 1201 comprising key-value pairs of data words (each comprising a string of bits) and their corresponding calculated binary Huffman codewords. A subsequent dataset may be received, and compared to the word library 1603 to determine the proper codewords to use in order to encode the dataset. Words in the dataset are checked against the word library and appropriate encodings are appended to a data stream 1604. If a word is mismatched within the word library and the dataset, meaning that it is present in the dataset but not the word library, then a mismatched code is appended, followed by the unencoded original word. If a word has a match within the word library, then the appropriate codeword in the word library is appended to the data stream. Such a data stream may then be stored or transmitted 1605 to a destination as desired. For the purposes of decoding, an already-encoded data stream may be received and compared 1606, and un-encoded words may be appended to a new data stream 1607 depending on word matches found between the encoded data stream and the word library that is present. A matching codeword that is found in a word library is replaced with the matching word and appended to a data stream, and a mismatch code found in a data stream is deleted and the following unencoded word is re-appended to a new data stream, the inverse of the process of encoding described earlier. Such a data stream may then be stored or transmitted 1608 as desired.

Figure 17:
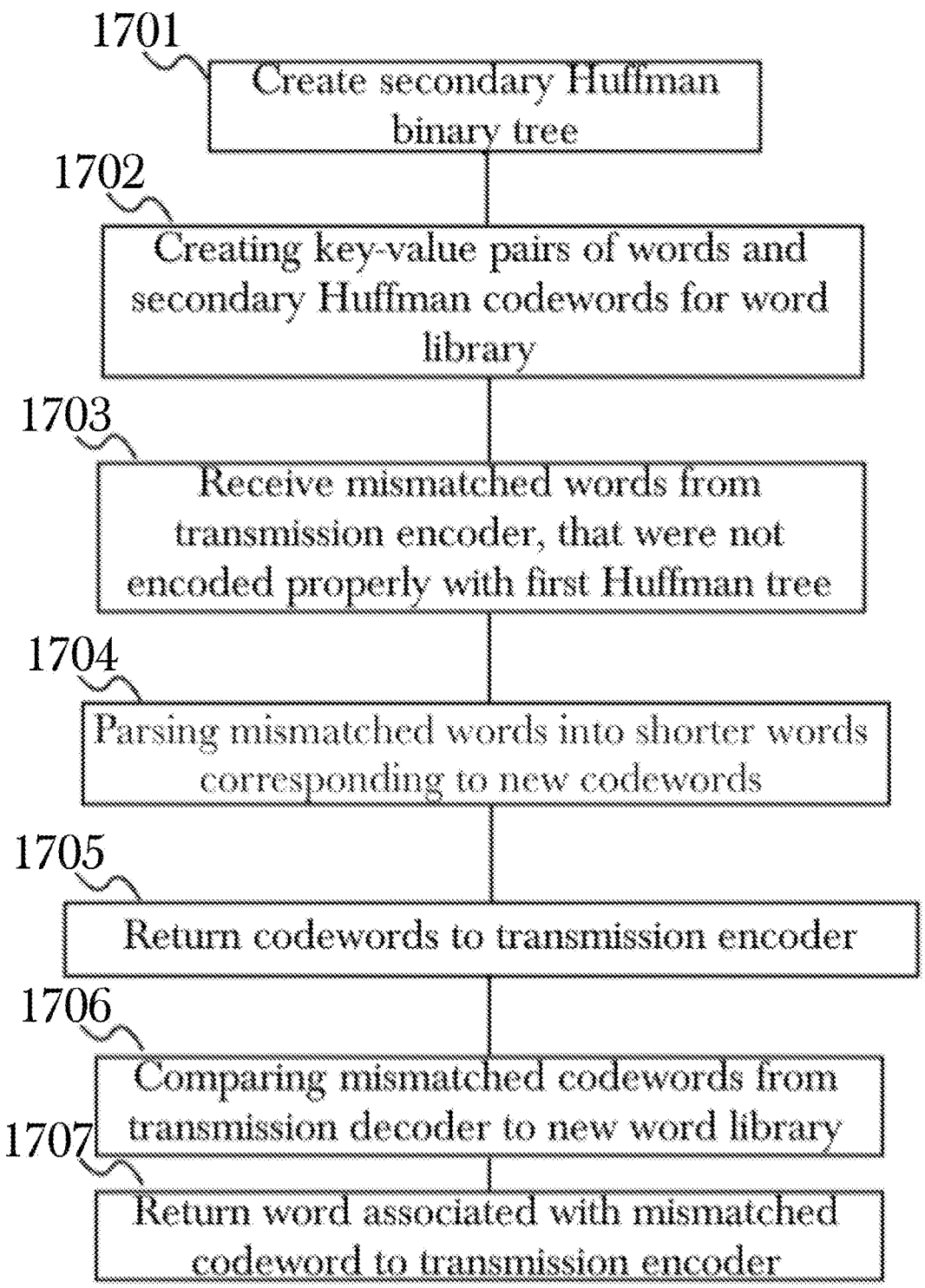
FIG. 17 is a method diagram illustrating possible use of a hybrid encoder/decoder to improve the compression ratio.

FIG. 17 is a method diagram illustrating possible use of a hybrid encoder/decoder to improve the compression ratio, according to a preferred aspect. A second Huffman binary tree may be created 1701, having a shorter maximum length of codewords than a first Huffman binary tree 1602, allowing a word library to be filled with every combination of codeword possible in this shorter Huffman binary tree 1702. A word library may be filled with these Huffman codewords and words from a dataset 1702, such that a hybrid encoder/decoder 1304, 1503 may receive any mismatched words from a dataset for which encoding has been attempted with a first Huffman binary tree 1703, 1604 and parse previously mismatched words into new partial codewords (that is, codewords that are each a substring of an original mismatched codeword) using the second Huffman binary tree 1704. In this way, an incomplete word library may be supplemented by a second word library. New codewords attained in this way may then be returned to a transmission encoder 1705, 1500. In the event that an encoded dataset is received for decoding, and there is a mismatch code indicating that additional coding is needed, a mismatch code may be removed and the unencoded word used to generate a new codeword as before 1706, so that a transmission encoder 1500 may have the word and newly generated codeword added to its word library 1707, to prevent further mismatching and errors in encoding and decoding.

It will be recognized by a person skilled in the art that the methods described herein can be applied to data in any form. For example, the method described herein could be used to store genetic data, which has four data units: C, G, A, and T. Those four data units can be represented as 2 bit sequences: 00, 01, 10, and 11, which can be processed and stored using the method described herein.

It will be recognized by a person skilled in the art that certain embodiments of the methods described herein may have uses other than data storage. For example, because the data is stored in reference code form, it cannot be reconstructed without the availability of the library of sourceblocks. This is effectively a form of encryption, which could be used for cyber security purposes. As another example, an embodiment of the method described herein could be used to store backup copies of data, provide for redundancy in the event of server failure, or provide additional security against cyberattacks by distributing multiple partial copies of the library among computers are various locations, ensuring that at least two copies of each sourceblock exist in different locations within the network.

Figure 18:
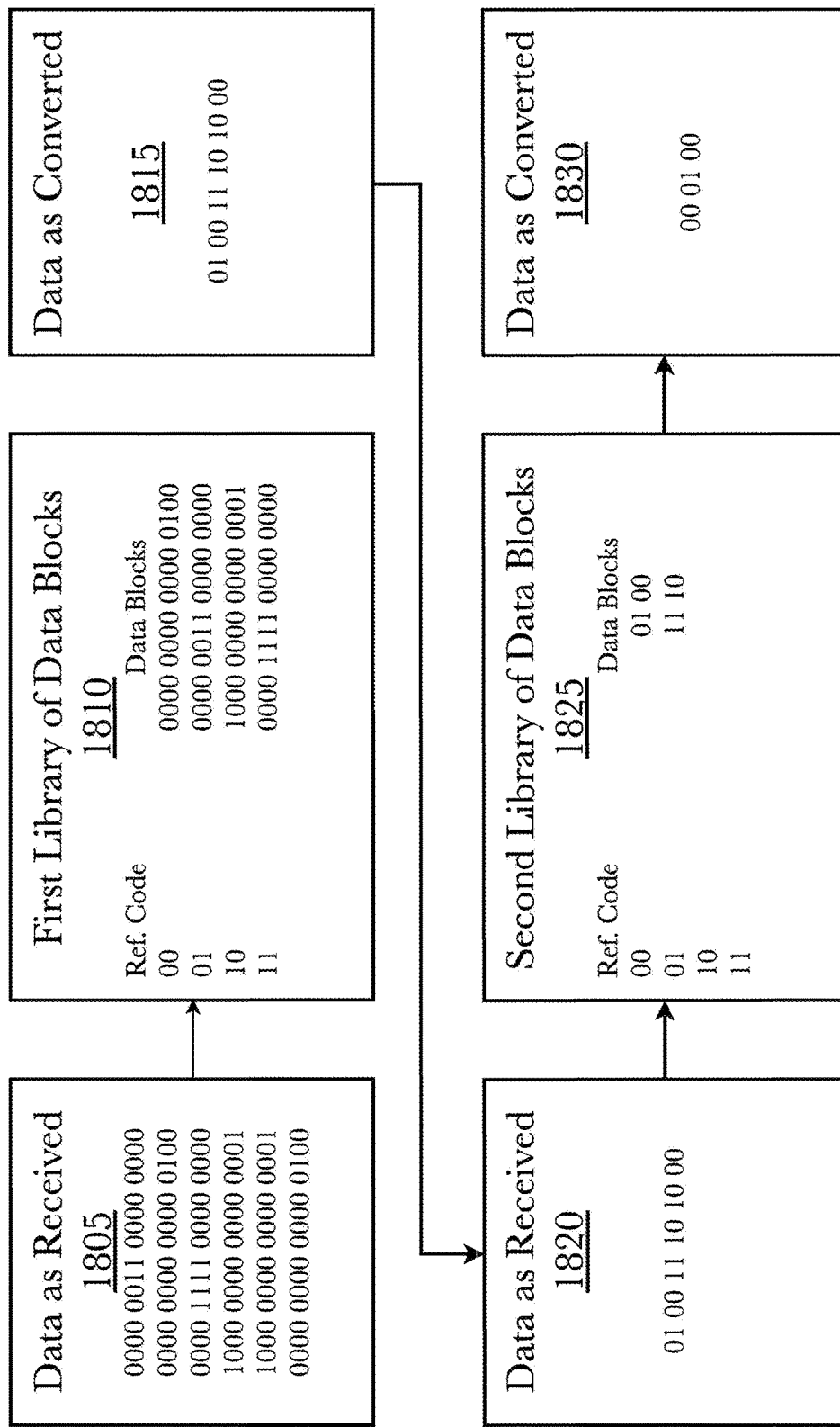
FIG. 18 is a flow diagram illustrating the use of a data encoding system used to recursively encode data to further reduce data size.

FIG. 18 is a flow diagram illustrating the use of a data encoding system used to recursively encode data to further reduce data size. Data may be input 1805 into a data deconstruction engine 102 to be deconstructed into code references, using a library of code references based on the input 1810. Such example data is shown in a converted, encoded format 1815, highly compressed, reducing the example data from 96 bits of data to 12 bits of data, before sending this newly encoded data through the process again 1820, to be encoded by a second library 1825, reducing it even further. The newly converted data 1830 is shown as only 6 bits in this example, thus a size of 6.25% of the original data packet. With recursive encoding, then, it is possible and implemented in the system to achieve increasing compression ratios, using multi-layered encoding, through recursively encoding data. Both initial encoding libraries 1810 and subsequent libraries 1825 may be achieved through machine learning techniques to find optimal encoding patterns to reduce size, with the libraries being distributed to recipients prior to transfer of the actual encoded data, such that only the compressed data 1830 must be transferred or stored, allowing for smaller data footprints and bandwidth requirements. This process can be reversed to reconstruct the data. While this example shows only two levels of encoding, recursive encoding may be repeated any number of times. The number of levels of recursive encoding will depend on many factors, a non-exhaustive list of which includes the type of data being encoded, the size of the original data, the intended usage of the data, the number of instances of data being stored, and available storage space for codebooks and libraries. Additionally, recursive encoding can be applied not only to data to be stored or transmitted, but also to the codebooks and/or libraries, themselves. For example, many installations of different libraries could take up a substantial amount of storage space. Recursively encoding those different libraries to a single, universal library would dramatically reduce the amount of storage space required, and each different library could be reconstructed as necessary to reconstruct incoming streams of data.

Figure 20:
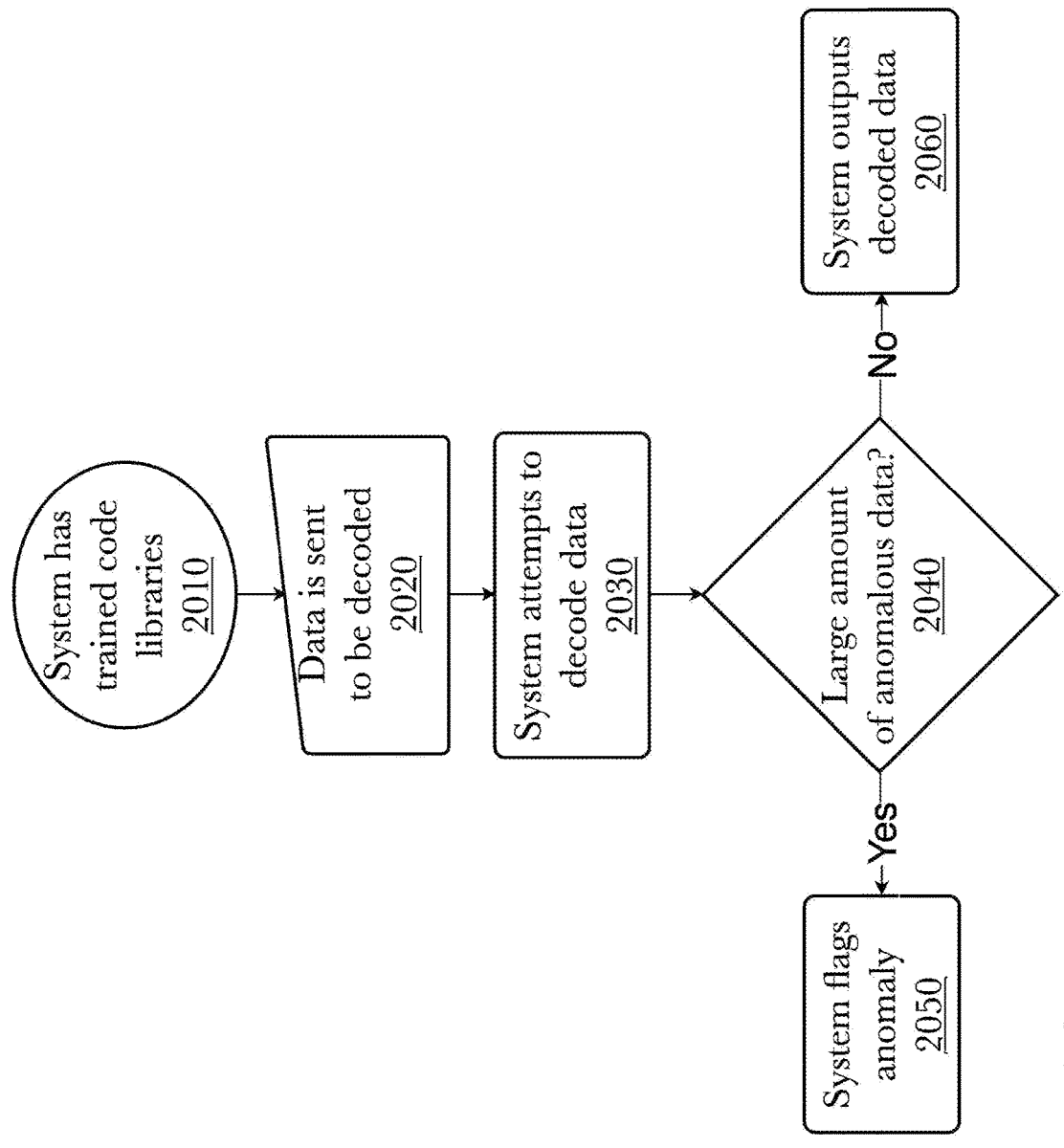
FIG. 20 is a flow diagram of an exemplary method used to detect anomalies in received encoded data and producing a warning.

FIG. 20 is a flow diagram of an exemplary method used to detect anomalies in received encoded data and producing a warning. A system may have trained encoding libraries 2010, before data is received from some source such as a network connected device or a locally connected device including USB connected devices, to be decoded 2020. Decoding in this context refers to the process of using the encoding libraries to take the received data and attempt to use encoded references to decode the data into its original source 2030, potentially more than once if recursive encoding was used, but not necessarily more than once. An anomaly detector 1910 may be configured to detect a large amount of un-encoded data 2040 in the midst of encoded data, by locating data or references that do not appear in the encoding libraries, indicating at least an anomaly, and potentially data tampering or faulty encoding libraries. A flag or warning is set by the system 2050, allowing a user to be warned at least of the presence of the anomaly and the characteristics of the anomaly. However, if a large number of invalid references or unencoded data are not present in the encoded data that is attempting to be decoded, the data may be decoded and output as normal 2060, indicating no anomaly has been detected.

Figure 21:
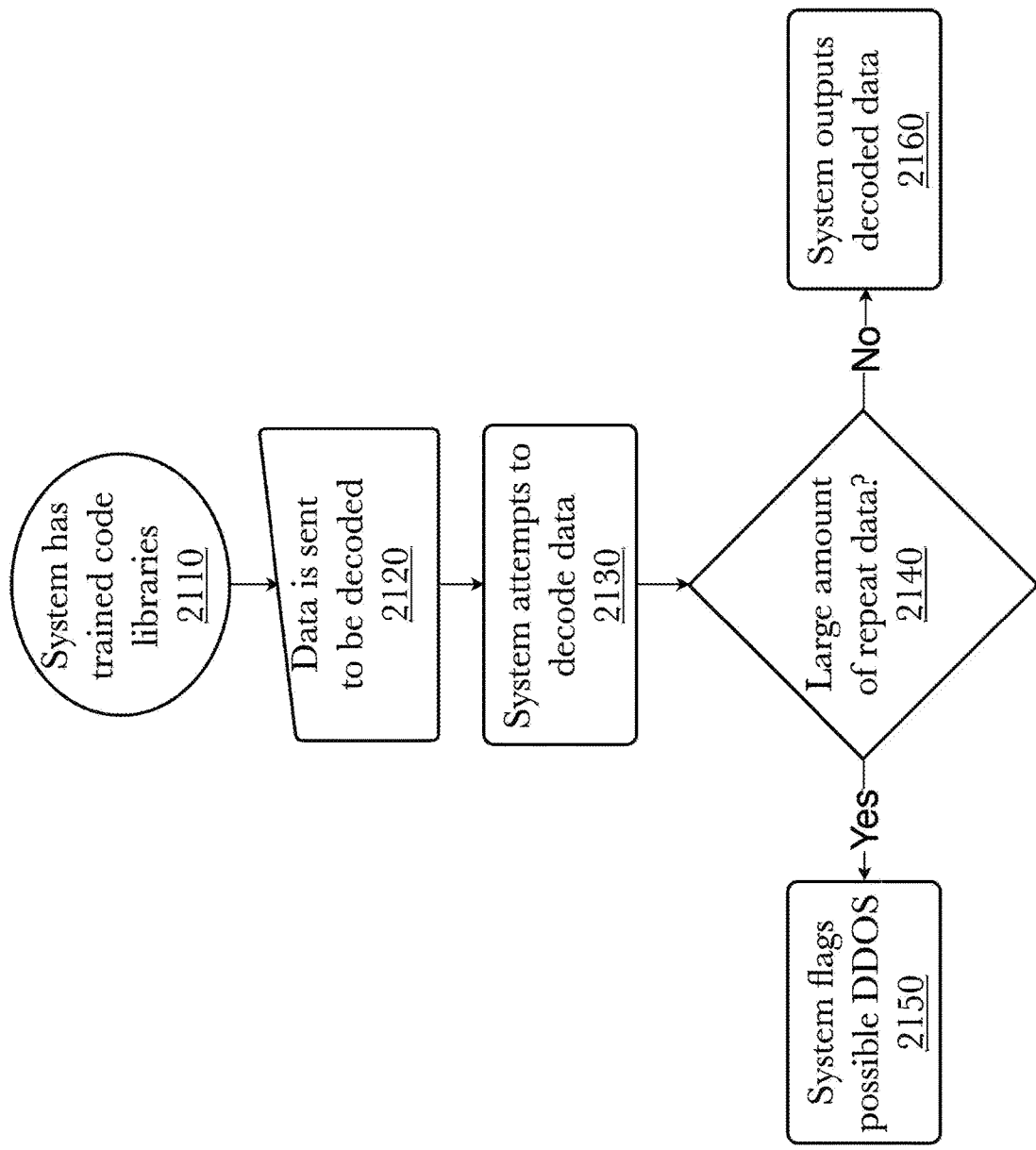
FIG. 21 is a flow diagram of a data encoding system used for Distributed Denial of Service (DDoS) attack denial.

FIG. 21 is a flow diagram of a method used for Distributed Denial of Service (DDoS) attack denial. A system may have trained encoding libraries 2110, before data is received from some source such as a network connected device or a locally connected device including USB connected devices, to be decoded 2120. Decoding in this context refers to the process of using the encoding libraries to take the received data and attempt to use encoded references to decode the data into its original source 2130, potentially more than once if recursive encoding was used, but not necessarily more than once. A DDoS detector 1920 may be configured to detect a large amount of repeating data 2140 in the encoded data, by locating data or references that repeat many times over (the number of which can be configured by a user or administrator as need be), indicating a possible DDoS attack. A flag or warning is set by the system 2150, allowing a user to be warned at least of the presence of a possible DDoS attack, including characteristics about the data and source that initiated the flag, allowing a user to then block incoming data from that source. However, if a large amount of repeat data in a short span of time is not detected, the data may be decoded and output as normal 2160, indicating no DDoS attack has been detected.

Figure 23:
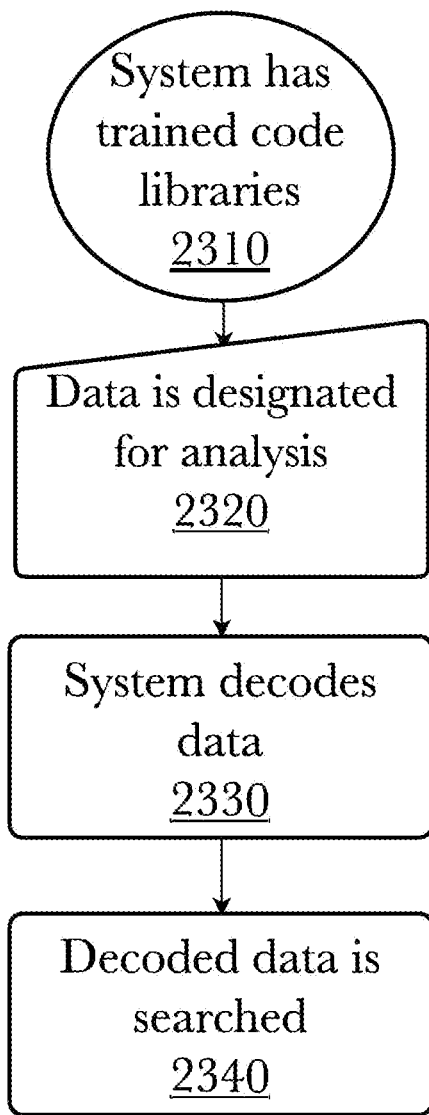
FIG. 23 is a flow diagram of an exemplary method used to enable high-speed data mining of repetitive data.

FIG. 23 is a flow diagram of an exemplary method used to enable high-speed data mining of repetitive data. A system may have trained encoding libraries 2310, before data is received from some source such as a network connected device or a locally connected device including USB connected devices, to be analyzed 2320 and decoded 2330. When determining data for analysis, users may select specific data to designate for decoding 2330, before running any data mining or analytics functions or software on the decoded data 2340. Rather than having traditional decryption and decompression operate over distributed drives, data can be regenerated immediately using the encoding libraries disclosed herein, as it is being searched. Using methods described in FIG. 9 and FIG. 11, data can be stored, retrieved, and decoded swiftly for searching, even across multiple devices, because the encoding library may be on each device. For example, if a group of servers host codewords relevant for data mining purposes, a single computer can request these codewords, and the codewords can be sent to the recipient swiftly over the bandwidth of their connection, allowing the recipient to locally decode the data for immediate evaluation and searching, rather than running slow, traditional decompression algorithms on data stored across multiple devices or transfer larger sums of data across limited bandwidth.

Figure 25:
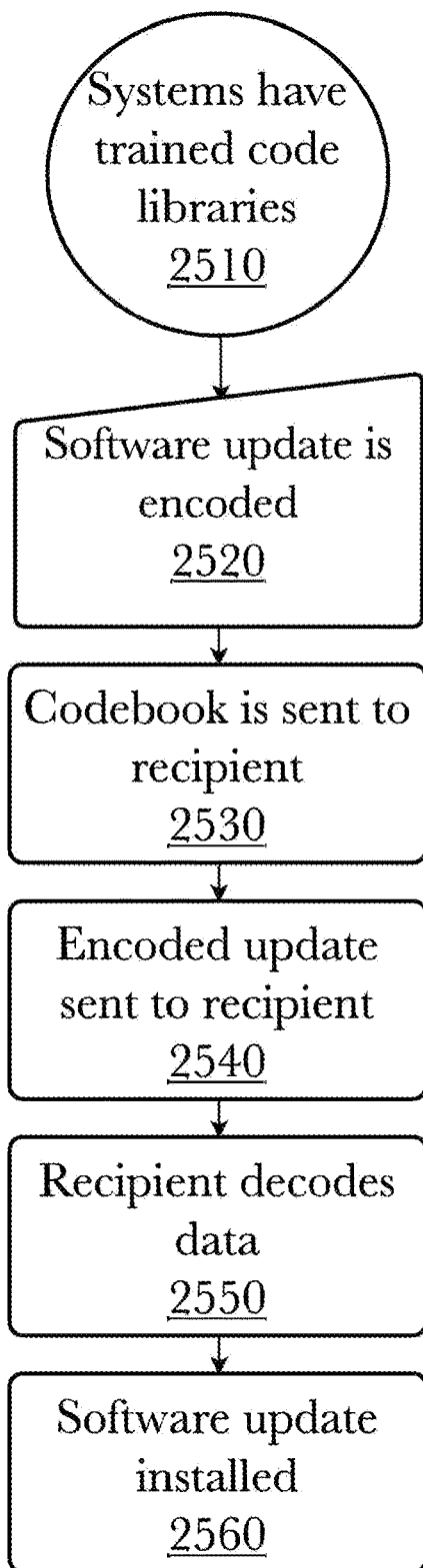
FIG. 25 is a flow diagram of an exemplary method used to encode and transfer software and firmware updates to a device for installation, for the purposes of reduced bandwidth consumption.

FIG. 25 is a flow diagram of an exemplary method used to encode and transfer software and firmware updates to a device for installation, for the purposes of reduced bandwidth consumption. A first system may have trained code libraries or "codebooks" present 2510, allowing for a software update of some manner to be encoded 2520. Such a software update may be a firmware update, operating system update, security patch, application patch or upgrade, or any other type of software update, patch, modification, or upgrade, affecting any computer system. A codebook for the patch must be distributed to a recipient 2530, which may be done beforehand and either over a network or through a local or physical connection, but must be accomplished at some point in the process before the update may be installed on the recipient device 2560. An update may then be distributed to a recipient device 2540, allowing a recipient with a codebook distributed to them 2530 to decode the update 2550 before installation 2560. In this way, an encoded and thus heavily compressed update may be sent to a recipient far quicker and with less bandwidth usage than traditional lossless compression methods for data, or when sending data in uncompressed formats. This especially may benefit large distributions of software and software updates, as with enterprises updating large numbers of devices at once.

Figure 27:
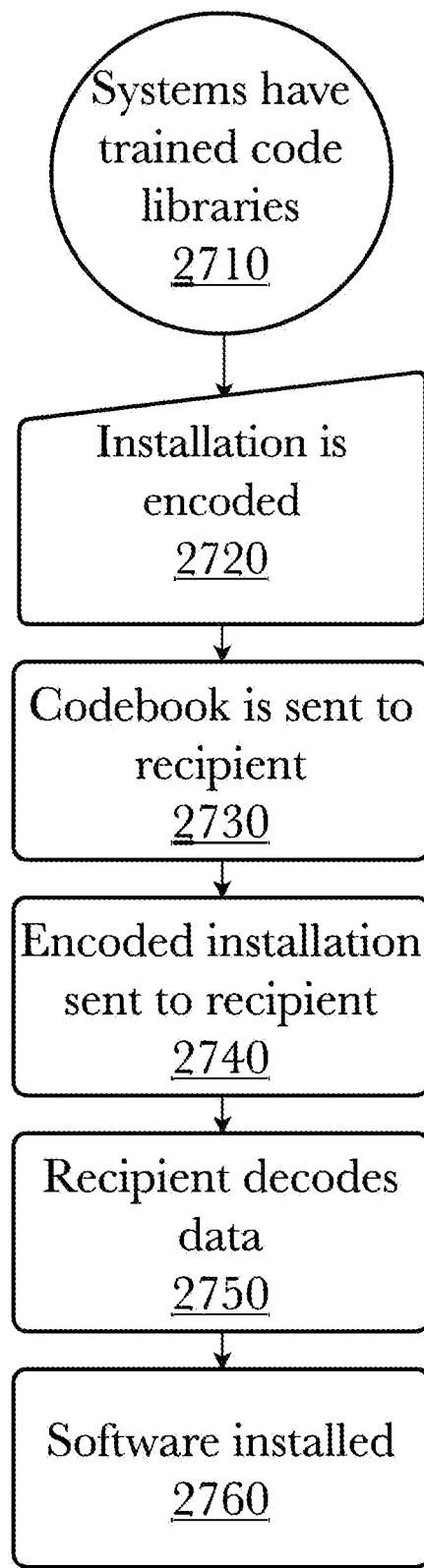
FIG. 27 is a flow diagram of an exemplary method used to encode new software and operating system installations for reduced bandwidth required for transference.

FIG. 27 is a flow diagram of an exemplary method used to encode new software and operating system installations for reduced bandwidth required for transference. A first system may have trained code libraries or "codebooks" present 2710, allowing for a software installation of some manner to be encoded 2720. Such a software installation may be a software update, operating system, security system, application, or any other type of software installation, execution, or acquisition, affecting a computer system. An encoding library or "codebook" for the installation must be distributed to a recipient 2730, which may be done beforehand and either over a network or through a local or physical connection, but must be accomplished at some point in the process before the installation can begin on the recipient device 2760. An installation may then be distributed to a recipient device 2740, allowing a recipient with a codebook distributed to them 2730 to decode the installation 2750 before executing the installation 2760. In this way, an encoded and thus heavily compressed software installation may be sent to a recipient far quicker and with less bandwidth usage than traditional lossless compression methods for data, or when sending data in uncompressed formats. This especially may benefit large distributions of software and software updates, as with enterprises updating large numbers of devices at once.

Figure 31:
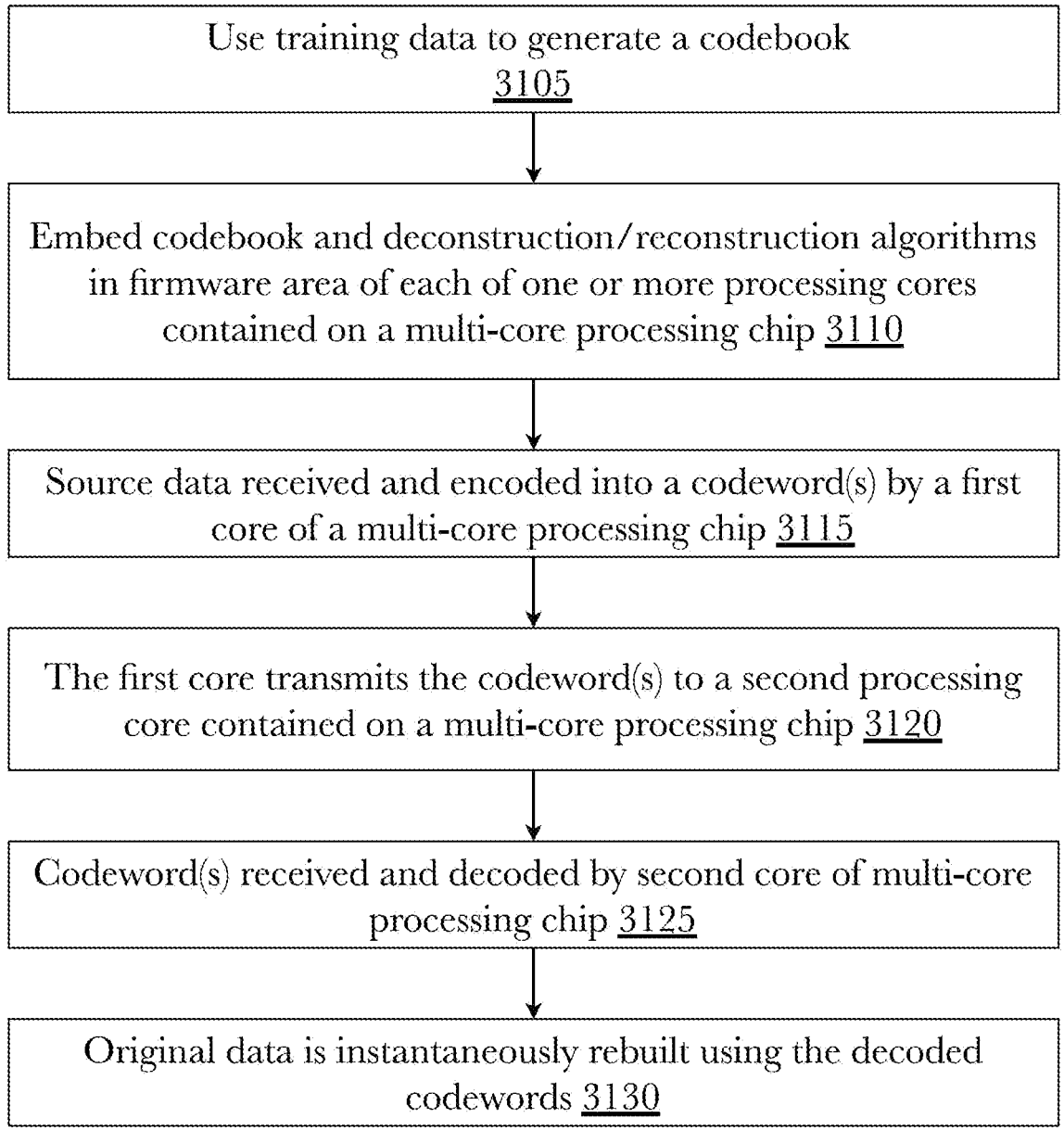
FIG. 31 is a flow diagram of an exemplary method used to transmit encoded data between one or more processing cores of a multi-core processing chip for increased bandwidth required for transmittance.

FIG. 31 is a flow diagram of an exemplary method used to transmit encoded data between one or more processing cores of a multi-core processing chip for increased bandwidth required for transmittance. According to an embodiment, the use of training data to generate a codebook 3105 is the first step taken. The training data is used to identify patterns in data prior to embedding code or programming firmware in a semiconductor (e.g., a processing chip with one or more processing cores). These patterns and their associated, smaller indices, or codewords, may be stored in a codebook that is replicated in the sending and receiving bus for each core contained on the chip. In addition to the codebook, lightweight code housing reconstruction and deconstruction algorithms may be embedded in the firmware area of each processing core contained on the multi-core chip 3110. A first processing core may receive source data and encode it into codeword(s) as it is received 3115 using the deconstruction algorithm stored in the firmware of the first core. Then, the first core may transmit the codeword(s) to a second processing core contained on the same multi-core processing chip 3120. The second processing core may receive and decode the codeword(s) 3125 from the first processing core using the reconstruction algorithm stored in the firmware of the second core. Once the codewords have been decoded, the original data is instantaneously rebuilt 3130 by the second processing core. The rebuilt original data may then be sent as output to a given location.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 38:
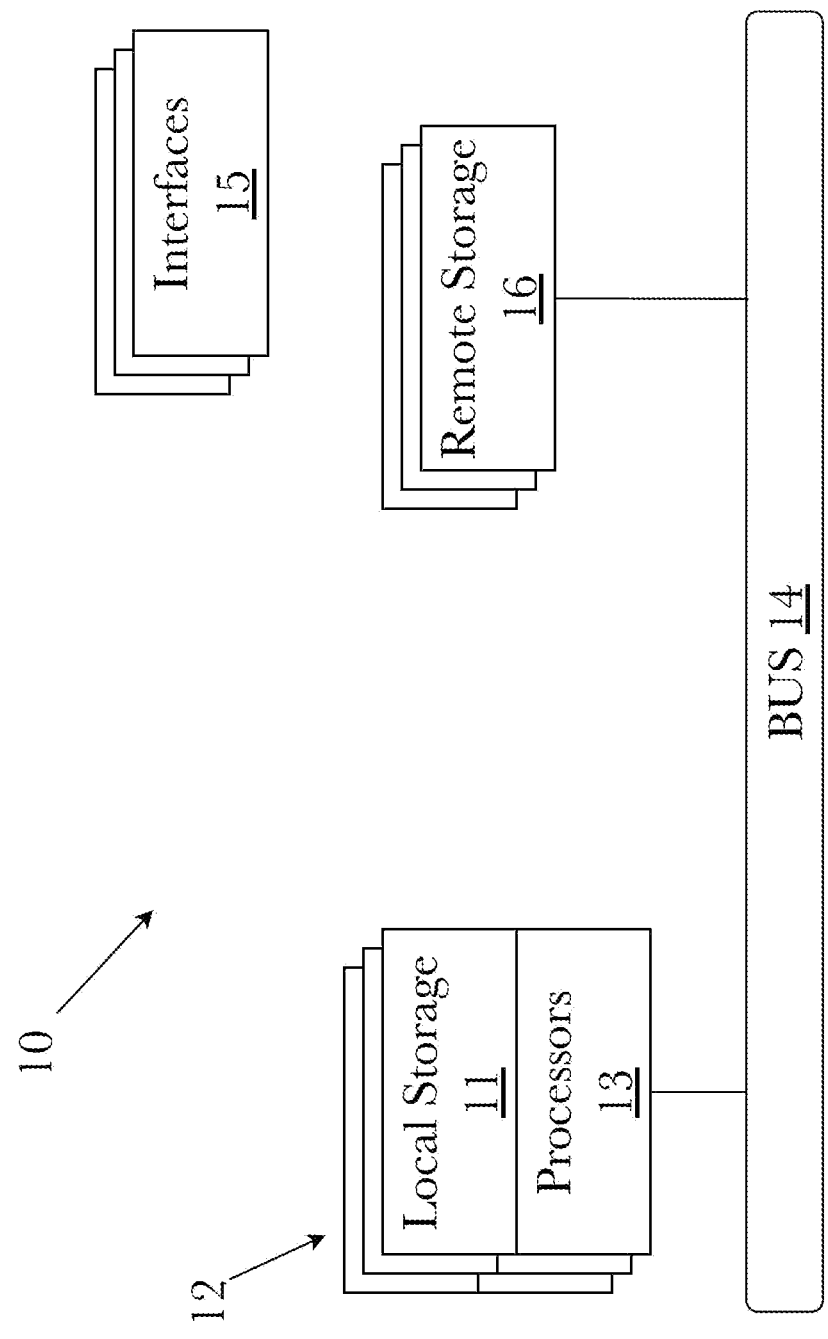
FIG. 38 is a block diagram illustrating an exemplary hardware architecture of a computing device.

Referring now to FIG. 38, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™ THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 38 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 39:
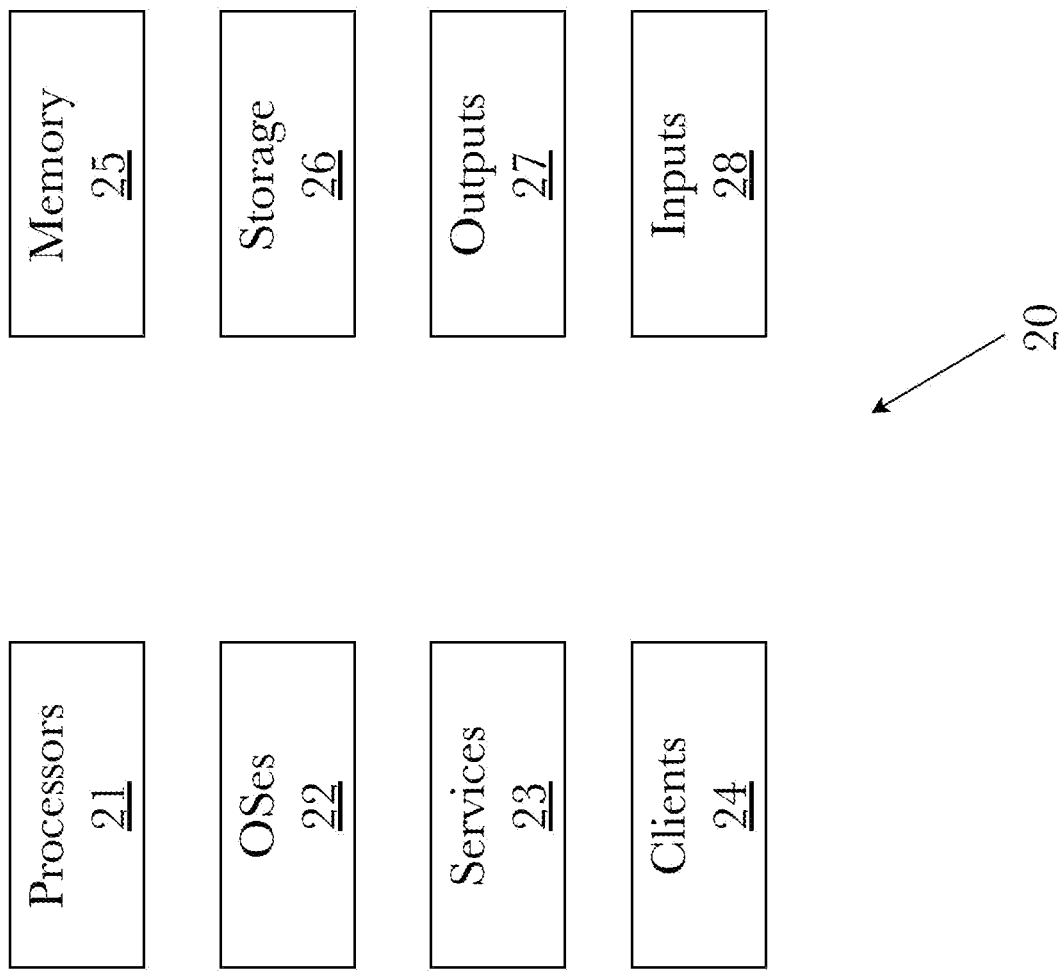
FIG. 39 is a block diagram illustrating an exemplary logical architecture for a client device.

In some aspects, systems may be implemented on a standalone computing system. Referring now to FIG. 39, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 38). Examples of storage devices 26 include flash memory, magnetic hard drive, CD-ROM, and/or the like.

Figure 40:
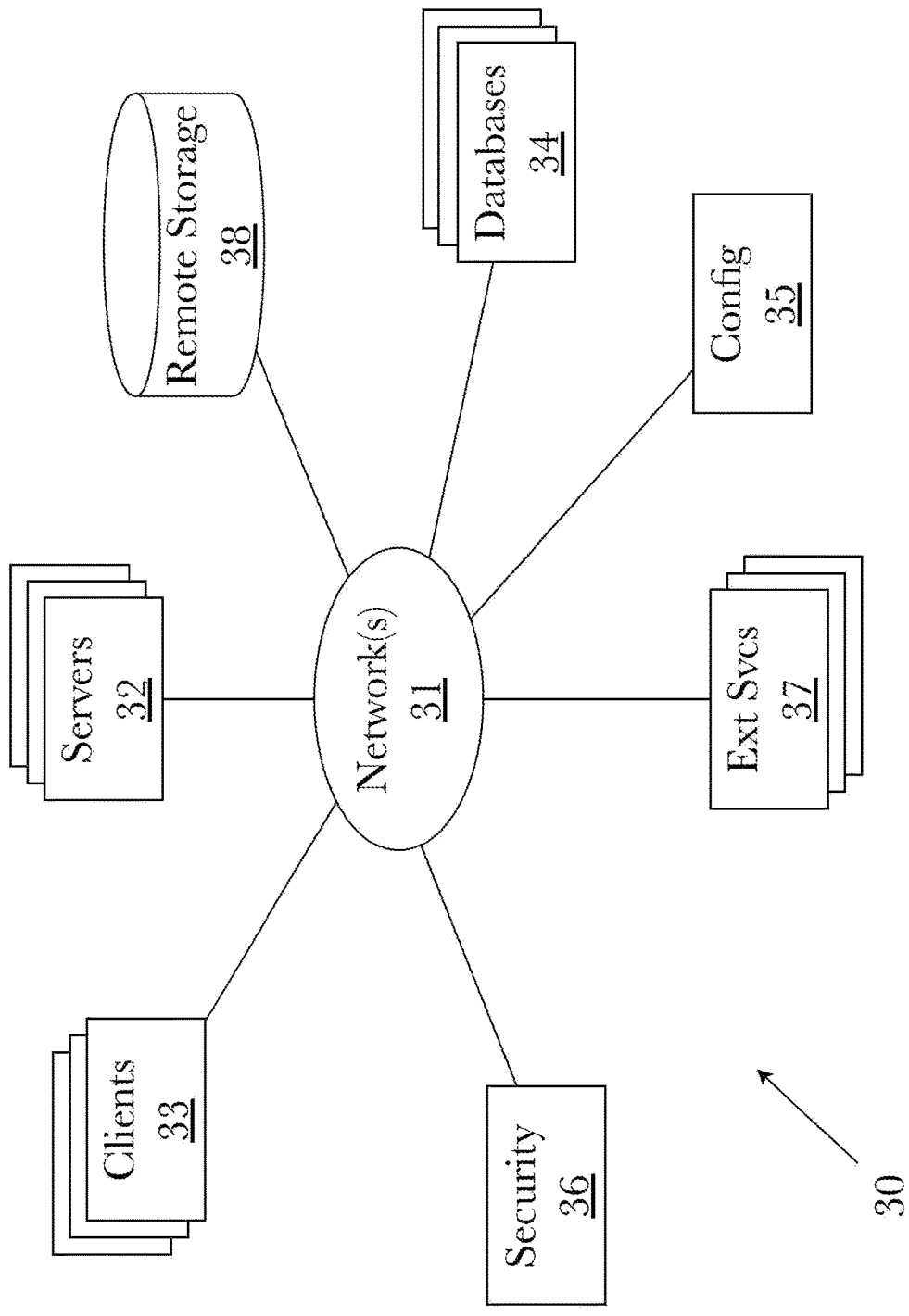
FIG. 40 is a block diagram showing an exemplary architectural arrangement of clients, servers, and external services.

In some aspects, systems may be implemented on a distributed computing network, such as one having any number of clients and/or servers. Referring now to FIG. 40, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 39. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as Wi-Fi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database," it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 41:
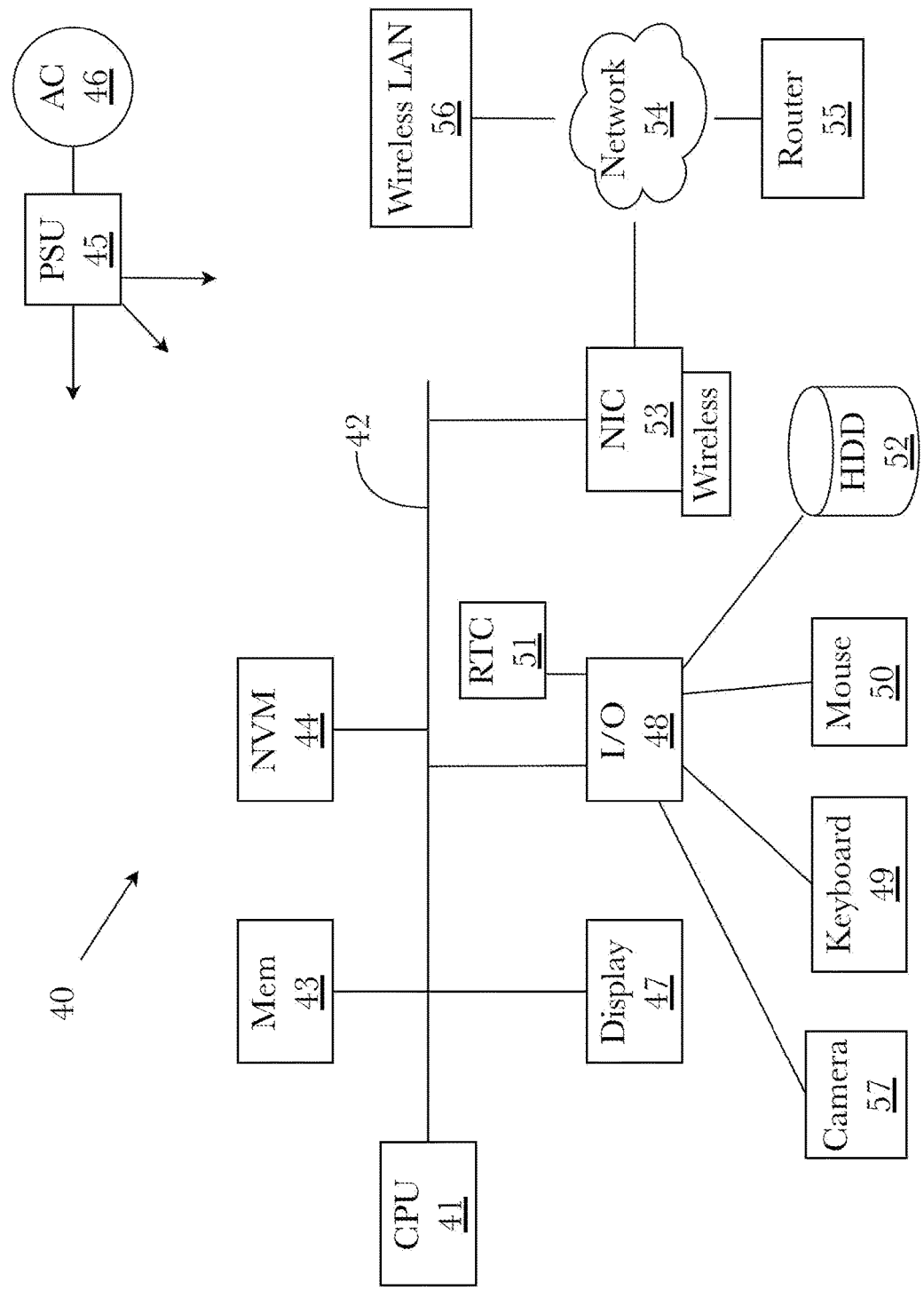
FIG. 41 is another block diagram illustrating an exemplary hardware architecture of a computing device.

FIG. 41 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

For chip-to-chip communications, or communications between processors or other components within a single chip, an enhanced processor-to-processor communication technique, according to an aspect, may be used. In order to deal with the need for more processing power, but unable to scale processing speeds sufficiently due to heat limitations, computer designers have moved to multiprocessor architectures. This multi-processor architecture occurs at three levels: processor components from companies like Intel, AMD, Cavium, and Nvidia put more and more processors onto the same semiconductor die; companies such as AMD and others are putting multiple processor semiconductor die inside very small packages so that customers can treat the packaged solution as they would any other packaged processor (multichip modules); and software architecture has advanced so that jobs can split across a large number of processors on a single board, on multiple boards within a server rack, and across server racks.

As more and more processors are used to perform tasks, a larger and larger portion of the resources and cost is used to transport the bits between processors. This cost is proportional to the number of bits/second that need to be transported. The cost is highest for data transport between processor components where the data travels across circuit board traces, or even more expensively across high speed copper or fiber connections within data centers. For processor companies, a current technical trend is to have multiple processor dies inside components. This means that processor to processor communication is more expensive than if all the processors are on the same die. Finally, even within the same semiconductor die, with very large number of processors, a large number of resources are used to move bits between the various processors.

According to an aspect, one solution is a major breakthrough is changing the economics of moving large amounts of high speed data. By using extremely low latency artificial intelligence-(AI-) driven encoding techniques, one may achieve large decreases in the number of bits that need to be transported in order to move the same data. The economic effect is greatest when encoding data that needs to move outside of a processor component onto other boards or racks, but even within a component, between die, or within the chip itself the economic effects are appreciable. According to various aspects, machine learning/AI data compaction technology provides a radically new way to dramatically and securely reduce the size of data; its architecture, lightweight code, speed and high efficiency make it potentially useful for application to semiconductors. According to an aspect, the latency bound is 400× faster than the speed of the fastest compression algorithms, and encoded machine-generated data is typically 60-80% smaller than the original. Unlike compression, the invention according to an aspect may operate on very small data units of a few bytes, and the technology is instant-on; data files generated by the source are virtually simultaneously encoded, transported and regenerated at the destination.

According to an aspect, training data is used to identify patterns in data prior to embedding code or programming firmware in a semiconductor. These patterns and their associated, smaller indices, or codewords, are stored in a codebook that is replicated on both the sending and receiving bus, along with a light code according to an aspect. In processing live data, only codewords, much smaller than the original data, are transferred between buses. Compaction is a stepless process that operates as fast as the data is created, a key component of its extreme low latency performance. As source data is generated, it is encoded and the codewords are sent; at the destination, codewords are decoded and the original data is instantaneously rebuilt, even as the file is still being generated at the source. The computationally-intensive tasks of searching for patterns in data is performed in advance of embedding; in live semiconductor operation, the tasks involved consist primarily of lookups, which are light and fast.

Because the invention provides effective data reduction down to the scale of a few bytes and requires very limited instruction complexity to encode or decode, it can be deployed in on-chip computing environments with highly limited resources. Among the cost-saving and performance-enhancing applications: reducing bandwidth use of data buses/interconnects. By encoding data according to an aspect of the invention, chip components send fewer bits, implying lower power demands, lower interconnect bandwidth/multiplexing requirements, and faster overall transmissions. Data routing congestion is reduced by increasing the information density of messages or packets in network-on-chip contexts, the delays, and pile-ups due to buffer congestion at on-chip routers can be substantially reduced, improving overall communications speed. Efficiency of memory resources is improved by compacting data that is being temporarily stored during computation (registers, scratchpad, cache, etc.). The invention can pack more data into available on-chip memory and require fewer allocations, make fewer accesses, and cause fewer misses. Crosstalk may be attenuated, according to an aspect; capacitive or inductive crosstalk may be reduced by increasing the entropy rate of signals being transmitted on interconnection wires, thus decreasing periodicity and other patterns that contribute to coupling behavior. This use has the potential to enable denser wiring and more components per unit area.

The skilled person will be aware of a range of possible modifications of the various aspects described above. Accordingly, the present invention is defined by the claims and their equivalents.

What is claimed is:

1. A blockchain data compaction system, comprising:
   a blockchain computing node communicatively coupled to a plurality of other blockchain computing nodes, each blockchain computing node comprising a memory and a processor, and wherein the sum of blockchain computing nodes creates a consensus pool for a blockchain;
   a network compaction service, comprising a first plurality of programming instructions stored in the memory and operating on the multi-core processor on each of the blockchain computing nodes, wherein the first plurality of programming instructions, when operating on the processor, cause the processor to:
      store a first reference codebook in the memory of each of the blockchain computing nodes, the first reference codebook pretrained by machine learning to determine sourceblocks and to associate codewords to each sourceblock;
      store a first deconstruction algorithm in the memory of each of the blockchain computing nodes, wherein the first deconstruction algorithm, when operating on the processor, causes the processor to:
         receive network data intended for the consensus pool;
         deconstruct the network data intended for the consensus pool into a plurality of sourceblocks;
         encode the first plurality of sourceblocks into a first codeword using the first reference codebook; and
         send the first codeword to the consensus pool; and
      store a first reconstruction algorithm in the memory of each of the blockchain computing nodes, wherein the first reconstruction algorithm, when operating on the processor, causes the processor to:
         receive the first codeword; and
         reconstruct the network data by decoding the first plurality of sourceblocks using the first reference codebook; and
   a blockchain compaction module, comprising a second plurality of programming instructions stored in the memory and operating on the processor, wherein the second plurality of programming instructions, when operating on the processor, cause the processor to:
      store a second reference codebook in the memory of each of the blockchain computing nodes, the second reference codebook pretrained by machine learning to determine sourceblocks and associated codewords of the blockchain; and
      store a second deconstruction algorithm in the memory of each of the blockchain computing nodes, wherein the first deconstruction algorithm, when operating on the processor, causes the processor to:
         receive a blockchain block;
         deconstruct the blockchain block into a second plurality of sourceblocks;

encode the second plurality of sourceblocks into a second codeword using the second reference codebook; and append the second codeword to a compacted blockchain, the compacted blockchain comprising codewords for each block on the blockchain.

2. The system of claim 1, wherein the deconstruction of the network data intended for the consensus pool generates a sourceblock and association not in the first reference codebook, attach the sourceblock and association to the first codeword, the first reconstruction algorithm updating the first reference codebook.

3. The system of claim 1, wherein the deconstruction of the blockchain block generates a sourceblock and association not in the second reference codebook, add the sourceblock and association to the second reference codebook.

4. The system of claim 1, wherein the blockchain compaction module further causes the processor to store a second reconstruction algorithm in the memory of each of the blockchain computing nodes, wherein the second reconstruction algorithm, when operating on the processor, causes the processor to reconstruct the blockchain block by decoding the second plurality of sourceblocks using the second reference codebook.

5. The system of claim 1, further comprising a proof system compaction firmware and wherein the processor is a multi-core processor, comprising a third plurality of programming instructions stored in the memory and operating on the multi-core processor, wherein the third plurality of programming instructions, when operating on the multi-core processor, cause each the multi-core processor to:
store a third reference codebook embedded as firmware in the memory of each core in the multi-core processor, the third reference codebook pretrained by machine learning to determine sourceblocks and to associate codewords to each sourceblock;
store a third deconstruction algorithm embedded as firmware in the memory of each core in the multi-core processor, wherein the third deconstruction algorithm, when operating on each core, cause the multi-core processor to:
receive data intended for a different core;
deconstruct the data intended for a different core into a third plurality of sourceblocks;
encode the third plurality of sourceblocks into a third codeword using the third reference codebook; and
send the third codeword to the intended core; and
store a third reconstruction algorithm embedded as firmware in the memory of each core in the multi-core processor, wherein the third reconstruction algorithm, when operating on each core, cause the multi-core processor to:
receive the third codeword at the intended core; and
reconstruct the data intended for a different core by decoding the third plurality of sourceblocks using the third reference codebook.

6. The system of claim 5, wherein the deconstruction of data intended for a different core generates a sourceblock and association not in the third reference codebook, attach the sourceblock and association to the third codeword, the third reconstruction algorithm updating the third reference codebook.

7. The system of claim 1, wherein each reference codebook is stored as a blockchain.

8. The system of claim 1, wherein the blockchain data compaction system is implemented as a unique blockchain protocol.

9. The system of claim 1, wherein the blockchain data compaction system is implemented in a fork of an existing blockchain protocol.

10. The system of claim 1, wherein the blockchain compaction module permanently deletes a portion from one or more reference codebooks to redact information on the blockchain.

11. A method for blockchain data compaction, comprising the steps of:
storing a first reference codebook in the memory of a blockchain computing node communicatively coupled to a plurality of other blockchain computing nodes, each blockchain computing node comprising a memory and a processor, and wherein the sum of blockchain computing nodes creates a consensus pool for a blockchain, and wherein the first reference codebook is pretrained by machine learning to determine sourceblocks and to associate codewords to each sourceblock;
storing a first deconstruction algorithm in the memory of each of the blockchain computing nodes, wherein the first deconstruction algorithm, when operating on the processor, cause the processor to:
receive network data intended for the consensus pool;
deconstruct the network data intended for the consensus pool into a plurality of sourceblocks;
encode the first plurality of sourceblocks into a first codeword using the first reference codebook; and
send the first codeword to the consensus pool;
storing a first reconstruction algorithm in the memory of each of the blockchain computing nodes, wherein the first reconstruction algorithm, when operating on the processor, causes the processor to:
receive the first codeword; and
reconstruct the network data by decoding the first plurality of sourceblocks using the first reference codebook;
storing a second reference codebook in the memory of each of the blockchain computing nodes, the second reference codebook pretrained by machine learning to determine sourceblocks and associated codewords of the blockchain; and
storing a second deconstruction algorithm in the memory of each of the blockchain computing nodes, wherein the first deconstruction algorithm, when operating on each of the processor, cause the multi-core processors to:
receive a blockchain block;
deconstruct the blockchain block into a second plurality of sourceblocks;
encode the second plurality of sourceblocks into a second codeword using the second reference codebook; and
append the second codeword to a compacted blockchain, the compacted blockchain comprising codewords for each block on the blockchain.

12. The method of claim 11, wherein the deconstruction of the network data intended for the consensus pool generates a sourceblock and association not in the first reference codebook, attach the sourceblock and association to the first codeword, the first reconstruction algorithm updating the first reference codebook.

13. The method of claim 11, wherein the deconstruction of the blockchain block generates a sourceblock and association not in the second reference codebook, add the sourceblock and association to the second reference codebook.

14. The method of claim 11, further comprising the steps of storing a second reconstruction algorithm in the memory of each of the blockchain computing nodes, wherein the second reconstruction algorithm, when operating on each of the processor, causes the processor to reconstruct the blockchain block by decoding the second plurality of sourceblocks using the second reference codebook.

15. The method of claim 11, wherein the processor is a multi-core processor, further comprising the steps of storing a third reference codebook embedded as firmware in the memory of each core in each of the multi-core processors, the third reference codebook pretrained by machine learning to determine sourceblocks and to associate codewords to each sourceblock;

storing a third deconstruction algorithm embedded as firmware in the memory of each core in each of the multi-core processors, wherein the third deconstruction algorithm, when operating on each core, cause the multi-core processors to:

receive data intended for a different core;
    deconstruct the data intended for a different core into a third plurality of sourceblocks;
    encode the third plurality of sourceblocks into a third codeword using the third reference codebook; and
    send the third codeword to the intended core; and storing a third reconstruction algorithm embedded as firmware in the memory of each core in each of the multi-core processors, wherein the third reconstruction algorithm, when operating on each core, cause the multi-core processors to:

receive the third codeword at the intended core; and
    reconstruct the data intended for a different core by decoding the third plurality of sourceblocks using the third reference codebook.

16. The method of claim 15, wherein the deconstruction of data intended for a different core generates a sourceblock and association not in the third reference codebook, attach the sourceblock and association to the third codeword, the third reconstruction algorithm updating the third reference codebook.

17. The method of claim 11, wherein each reference codebook is stored as a blockchain.

18. The method of claim 11, wherein the blockchain data compaction method is implemented in a unique blockchain protocol.

19. The method of claim 11, wherein the blockchain data compaction method is implemented in a fork of an existing blockchain protocol.

20. The method of claim 11, further comprising the step of permanently deleting a portion from one or more reference codebooks to redact information on the blockchain.

\* \* \* \* \*